（12) United States Patent
Youngblood et al.

(10) Patent No.: US 7,919,770 B2
(45) Date of Patent: Apr. 5, 2011

(54) SUBSTITUTED BENZAZOLOPORPHYRAZINES FOR POLYMERIZATION AND SURFACE ATTACHMENT AND ARTICLES FORMED THEREFROM

(75) Inventors: W. Justin Youngblood, State College, PA (US); Jonathan S. Lindsey, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 1003 days.

(21) Appl. No.: 11/447,219

(22) Filed: Jun. 5, 2006

(65) Prior Publication Data

US 2011/0015388 A1   Jan. 20, 2011

Related U.S. Application Data

(60) Provisional application No. 60/687,288, filed on Jun. 3, 2005.

(51) Int. Cl.
*H01L 35/24* (2006.01)
(52) U.S. Cl. .................. 257/40; 257/E51.041
(58) Field of Classification Search .................. 136/252; 257/40, E51.041
See application file for complete search history.

(56) References Cited

U.S. PATENT DOCUMENTS

| 4,061,654 | A | 12/1977 | Idelson | |
|---|---|---|---|---|
| 6,777,516 | B2 | 8/2004 | Li et al. | |
| 2003/0104229 | A1* | 6/2003 | Li et al. | 428/457 |
| 2005/0277770 | A1 | 12/2005 | Balakumar et al. | |

FOREIGN PATENT DOCUMENTS

WO    WO 2006-089122 A2    8/2006

OTHER PUBLICATIONS

Balakirev AE et al. Synthesis and properties of copper(II) tetra(2-alkyl-4.5-benzimidazolo)- and tetra(2,2'-dimethyl-4,5-benzodiazepino)porphyrazines. Russian Journal of General Chemistry (2002), vol. 72, No. 10, pp. 1616-1619.
Elvidge JA and Linstead RP. Heterocyclic imines. Part I. Imino-derivatives of isoindoline and their reaction with primary bases. J. Chem. Soc. (1952), pp. 5000-5007.
Elvidge JA and Linstead RP. Heterocyclic imines and amines. Part III. Succinimidine. J. Chem. Soc. (1954), pp. 442-448.
Elvidge JA et al. Conjugated microcycles. Part XXIX. Tribenzotetrazaporphin metal derivatives and dibromotribenzotetrazaporphin. J. Chem. Soc. (1957) pp. 2466-2472.
Kudrik EV and Shaposhnikov GP. Symmetrical tetrasubstituted phthalocyanines containing condensed 2-alkylimidazole units. Mendeleev Communications (1999), pp. 85-86.

(Continued)

*Primary Examiner* — Michael Barr
*Assistant Examiner* — Robert S Walters, Jr.
(74) *Attorney, Agent, or Firm* — Myers Bigel Sibley & Sajovec, P.A.

(57) ABSTRACT

The present invention provides an article of manufacture formed from a substrate and a benzazoloporphyrazine bound to the substrate. The article may take a variety of different forms and may be for example an electrochromic display, a molecular capacitor, a battery, a solar cell, or a molecular memory device. Methods of making such articles, along with compounds, methods and intermediates useful for making such benzazoloporphyrazines, are also described.

33 Claims, 6 Drawing Sheets

OTHER PUBLICATIONS

Kudrik EV et al. Synthesis and properties of 5,6-dicyanobenzimidazole and porphyrazines derived from it. Russian Journal of General Chemistry (1999), vol. 69, No. 8, pp. 1321-1324.

Levy LF and Stephen H. The preparation of 4-nitrophthalimide and derivatives. J. Chem. Soc. (1931) pp. 79-82.

Pardo C et al. Tetraimidazophthalocyanines. J. Porphyrins Phthalocyanines (2000), vol. 4, pp. 505-509.

Shishkina OV et al. Halonitrophthalimides and phthalodinitriles derived from the. Russian Journal of General Chemistry (1997) vol. 67, No. 5, pp. 789-792.

Zharnikova MA et al. Nucleophilic substitution in naphthalodinitrile: II. Synthesis and properties of 4-Amino-5-nitrophthalodinitrile and its N-acyl derivatives. Russian Journal of General Chemistry (1999) vol. 69, No. 11, pp. 1791-1792.

* cited by examiner 2,17-di-[R]-Pc 2,16-di-[R]-Pc type a type b type c

SUBSTITUTED BENZAZOLOPORPHYRAZINES FOR POLYMERIZATION AND SURFACE ATTACHMENT AND ARTICLES FORMED THEREFROM

RELATED APPLICATIONS

This application claims the benefit of U.S. Provisional Patent Application Ser. No. 60/687,288, filed Jun. 3, 2005, the disclosure of which is incorporated by reference herein in its entirety.

STATEMENT OF GOVERNMENT SUPPORT

This invention was made with government support under a grant from the Center for Nanoscience Innovation for Defense and DARPA/DMEA award number H94003-04-2-0404. The US Government has certain rights to this invention.

FIELD OF THE INVENTION

The present invention concerns articles of manufacture formed from substrates having benzazoloporphyrazine compounds coupled thereto, useful as among other things molecular memory devices, as well as compounds, methods and intermediates useful for making such articles.

BACKGROUND OF THE INVENTION

Phthalocyanine dyes are widely explored for use in such diverse applications as textile colorants (Christie, R. M. *Colour Chemistry*, Royal Society of Chemistry: Cambridge, UK, 2001), nonlinear optical generation and limiting (de la Tone, G. et al., *J. Mater. Chem.* 1998, 8, 1671-1683; Calvete, M. et al., *Synth. Met.* 2004, 141, 231-243), photodynamic therapy (Allen, C. M. et al., *J. Porphyrins Phthalocyanines* 2001, 5, 161-169), photovoltaics (Nazeeruddin, M. et al., *J. Porphyrins Phthalocyanines* 1999, 3, 230-237; Petritsch, K. et al., *Synth. Met.* 1999, 102, 1776-1777), sensors (Zhou, R. et al., *Appl. Organomet. Chem.* 1996, 10, 557-577), electrochromic displays (Jiang, J. et al., In *Supramolecular Photosensitive and Electroactive Materials*, Nalwa, H. S. Ed., Academic Press: San Diego, Calif., 2001, 188-189), and information storage (Li, J. et al., *J. Org. Chem.* 2000, 65, 7379-7390; Gryko, et al., *J. Mater. Chem.* 2001, 11, 1162-1180; Gross, T. et al., *Inorg. Chem.* 2001, 40, 4762-4774; Schweikart, K.-H. et al., *J. Mater. Chem.* 2002, 12, 808-828; Schweikart, K.-H. et al., *Inorg. Chem.* 2003, 42, 7431-7446; Wei, L. et al., *J. Org. Chem.* 2004, 69, 1461-1469)

In molecular electronics, ordered phthalocyanine materials are generally sought over disordered materials, and the routes to ordered materials can vary widely from sublimation of phthalocyanines into crystalline layers, Langmuir-Blodgett film formation, mesomorphism, and backbone polymerization (Achar, B. N. et al., *J. Polym. Sci. Polym. Chem. Ed.* 1982, 20, 1785-1790; Venkatachalam, S. et al., *J. Polym. Sci. Part B* 1994, 32, 37-52; Gürek, A. G. et al., *J. Porphyrins Phthalocyanines* 1997, 1, 67-76; Gürek, A. G.; Bekaroglu, O. *J. Porphyrins Phthalocyanines* 1997, 1, 227-237; Wörhle, D. et al., *J. Porphyrins Phthalocyanines* 2000, 4, 491-497; Kingsborough, R. P.; Swager, T. M. *Angew. Chem. Int. Ed.* 2000, 39, 2897-2900).

Backbone polymerization of phthalocyanines is distinguished from the axially connected or "shish-kebab" phthalocyanines (Hanack, M. et al., In *Handbook of Conducting Polymers*, Skotheim, T. A., Elsenbaumer, R. L., and Reynolds, J. R., Eds., Marcel Dekker, New York, 1998, 381). Backbone polymerization of phthalocyanines is difficult, owing partly to the limited solubility of most phthalocyanines and partly to limitations of the geometry of phthalocyanines. The advantages of backbone polymers of phthalocyanines relative to non-covalently assembled phthalocyanines are (1) improved thermal and chemical stability of the short and long range structure, (2) reproducible preparation of materials without the use of expensive or delicate instrumentation, and sometimes (3) the addition of through-bond mechanisms of electronic communication between the component monomers as a complement to through-space mechanisms of energy transfer and/or conductivity.

Most efforts at preparing phthalocyanine polymers have utilized the phthalocyanine macrocyclization reaction as the material-forming step, with bridged or bilateral building blocks such as 1,2,4,5-tetracyanobenzene or dicyanobenzenes linked by alkyl chains or other intermediary groups. This strategy typically results in two-dimensional sheets of fused or linked pigments. Another approach is to prepare oligomers of fused phthalocyanines with polymerizable end groups, which also gives two-dimensional products. The ladder oligomers prepared by Hanack and coworkers are the best example of a linear one dimensional phthalocyanine material (Hauschel, B. et al., *J. Chem. Soc., Chem. Commun.* 1995, 2449-2451; Hanack, M.; Stihler, P. *Eur. J. Org. Chem.* 2000, 303-311). However, the stepwise synthesis used for such oligomers is not well suited to the preparation of polymers bearing many phthalocyanine macrocycles. Kingsborough and Swager prepared a thiophene-linked metallophthalocyanine polymer via electropolymerization of thiophene end groups. The resulting material is described as "nearly linear", but this polymer allows for rotation of the phthalocyanines and is not likely to be shape-persistent. The electroactive linking groups play a large role in the character of the resulting polymer. The fused linkages in the ladder oligomers and the phthalocyanine sheets also have a significant effect on the photochemical and electrochemical properties of the individual chromophores of the resulting material. In many cases this perturbation may be beneficial and intentional. However, these perturbation effects are not easily predicted and therefore complicate the design of electronic materials. Accordingly, there is a need for new compounds and methods for preparing linear (non-fused) materials.

SUMMARY OF THE INVENTION

A first aspect of the present invention is an article of manufacture comprising a substrate and a benzazoloporphyrazine bound to the substrate. The benzazoloporphyrazine is preferably bound to the substrate by a bond (e.g. a covalent bond) to the 2 position of an azolo group thereof. The article may take a variety of different forms and may be for example an electrochromic display, a molecular capacitor, a battery, a solar cell, or a molecular memory device.

In some embodiments the benzazoloporphyrazine is a member of a sandwich coordination compound such as a double-decker sandwich or triple-decker sandwich coordination compound.

In some embodiments the benzazoloporphyrazine is a member of a polymer of at least two linked benzazoloporphyrazines (e.g., 2, 3 or 5 to 20, 50 or 100 or more), with each of the benzazoloporphyrazines preferably linked to an adjacent benzazoloporphyrazine by a bond (directly or by an intervening linker) to the 2 position of an azolo group thereof. In some such embodiments, some or all of the benzazoloporphyrazines in the polymer may in turn be sandwich coordination compounds to provide a polymer of sandwich coordination compounds bound to the substrate.

A second aspect of the invention is a benzazoloporphyrazine compound having at least one independently selected substituent R at a 2 position of an azolo group thereof, wherein R is preferably a surface attachment group or cross-coupling group. In some embodiments the compound is a trans-bis(2-R-benzazolo)porphyrazine having a pair of substituents R at each 2 position of each of the pair of oppositely facing azolo groups thereof; in some embodiments the compound is a 2-R-benzazoloporphyrazine compound having a single substituent R at the 2 position of the azolo group thereof; in some embodiments the compound is a tetrakis(2-R-benzazolo)porphyrazine compound having an independently selected substituent R at each 2 position of each of the four azolo groups thereof.

A further aspect of the invention is a method of making an article of manufacture, comprising the steps of: (a) providing a substrate; and then (b) coupling a first benzazoloporphyrazine as described above to the substrate. The method may further comprise the step of (c) coupling at least one additional benzazoloporphyrazine as described above to the first benzazoloporphyrazine, such as in a gradient polymerization.

A further aspect of the present invention is a sandwich coordination compound, wherein at least one member thereof is a benzazoloporphyrazine as described herein.

A further aspect of the present invention is a method of making an article of manufacture, comprising the steps of: (a) providing a substrate; and then (b) coupling a first sandwich coordination compound as described herein to the substrate. The method may optionally comprise the step of (c) coupling at least one additional sandwich coordination compound containing a benzazoloporphyrazine to the benzazoloporphyrazine of the first sandwich coordination compound, as in a gradient polymerization.

A further aspect of the present invention is a polymer comprising from 2 to 50 or 100 or more benzazoloporphyrazines covalently coupled to one another.

A further aspect of the present invention is a polymer of from 2 to 50 or 100 or more linked sandwich coordination compounds, wherein each of the sandwich coordination compounds comprises a benzazoloporphyrazine as described herein linked to a benzazoloporphyrazine of an adjacent sandwich coordination compound.

A further aspect of the present invention is a method of making an article of manufacture, comprising the steps of: (a) providing a substrate; and then (b) coupling a polymer as described above to the substrate.

The foregoing and other objects and aspects of the present invention are explained in greater detail in the drawings herein and the specification set forth below.

DETAILED DESCRIPTION OF THE PREFERRED EMBODIMENTS

A. Definitions

Figure 1:
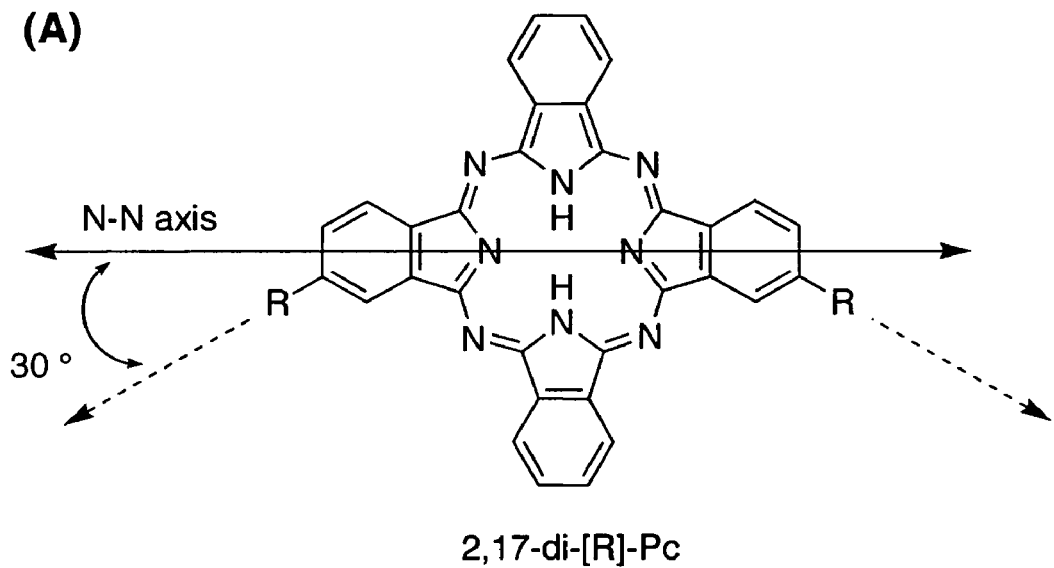
FIG. 1. Structures of two disubstituted phthalocyanines. The N—N axis bisects two inner nitrogen atoms and two opposing benzo rings. The axis equally can be displayed bisecting the NH—NH atoms. (A) A 2,17-disubstituted phthalocyanine, with substituents of a non-parallel alignment. (B) A 2,16-disubstituted phthalocyanine, with parallel but not collinear substituents.
Figure 1:
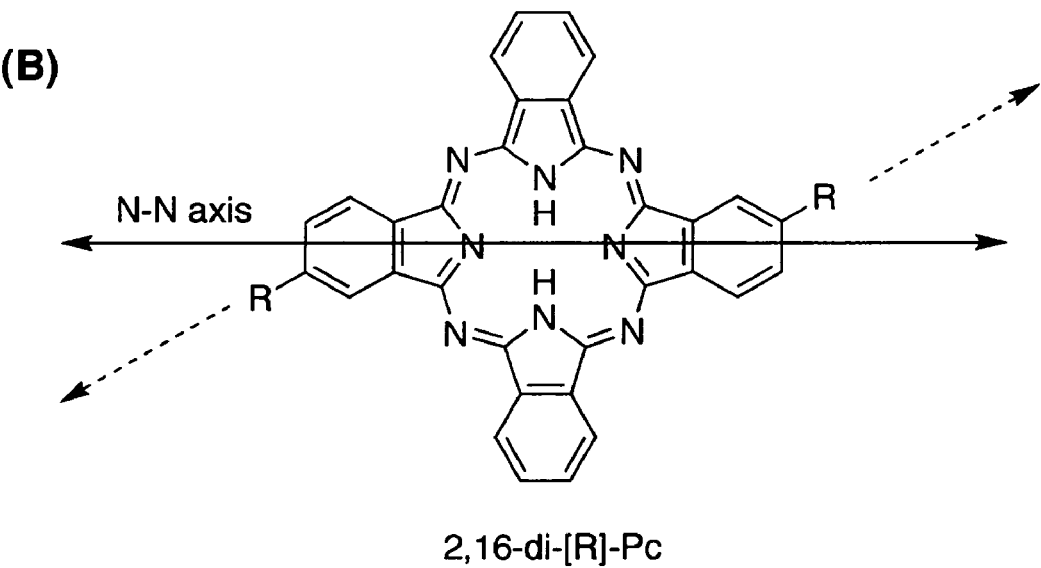

"Halo" as used herein refers to any suitable halogen, including —F, —Cl, —Br, and —I.

"Cyano" as used herein refers to a —CN group.

"Hydroxyl" as used herein refers to an —OH group.

"Nitro" as used herein refers to an —$NO_2$ group.

"Alkyl" as used herein alone or as part of another group, refers to a straight or branched chain hydrocarbon containing from 1 to 10, 20 or 40 or more carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Loweralkyl" as used herein, is a subset of alkyl, in some embodiments preferred, and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. The term "alkyl" or "loweralkyl" is intended to include both substituted and unsubstituted alkyl or loweralkyl unless otherwise indicated and these groups may be substituted with groups selected from halo, alkyl, haloalkyl, alkenyl, alkynyl, cycloalkyl, cycloalkylalkyl, aryl, arylalkyl, heterocyclo, heterocycloalkyl, hydroxyl, alkoxy, alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)$_m$, haloalkyl-S(O)$_m$, alkenyl-S(O)$_m$, alkynyl-S(O)$_m$, cycloalkyl-S(O)$_m$, cycloalkylalkyl-S(O)$_m$, aryl-S(O)$_m$, arylalkyl-S(O)$_m$, heterocyclo-S(O)$_m$, heterocycloalkyl-S(O)$_m$, amino, alkylamino, alkenylamino, alkynylamino, haloalkylamino, cycloalkylamino, cycloalkylalkylamino, arylamino, arylalkylamino, heterocycloamino, heterocycloalkylamino, disubstitutedamino, acylamino, acyloxy, ester, amide, sulfonamide, urea, alkoxyacylamino, aminoacyloxy, nitro or cyano where m=0, 1 or 2.

"Alkenyl" as used herein alone or as part of another group, refers to a straight or branched chain hydrocarbon containing from 1 to 10, 20, or 40 or more carbon atoms (or in loweralkenyl 1 to 4 carbon atoms) which include 1 to 4 double bonds in the normal chain. Representative examples of alkenyl include, but are not limited to, vinyl, 2-propenyl, 3-butenyl, 2-butenyl, 4-pentenyl, 3-pentenyl, 2-hexenyl, 3-hexenyl, 2,4-heptadiene, and the like. The term "alkenyl" or "loweralkenyl" is intended to include both substituted and unsubstituted alkenyl or loweralkenyl unless otherwise indicated and these groups may be substituted with groups as described in connection with alkyl and loweralkyl above.

"Alkynyl" as used herein alone or as part of another group, refers to a straight or branched chain hydrocarbon containing from 1 to 10, 20 or 40 or more carbon atoms (or in loweralkynyl 1 to 4 carbon atoms) which include 1 triple bond in the normal chain. Representative examples of alkynyl include, but are not limited to, 2-propynyl, 3-butynyl, 2-butynyl, 4-pentynyl, 3-pentynyl, and the like. The term "alkynyl" or "loweralkynyl" is intended to include both substituted and unsubstituted alkynyl or loweralknynyl unless otherwise indicated and these groups may be substituted with the same groups as set forth in connection with alkyl and loweralkyl above.

"Alkoxy," as used herein alone or as part of another group, refers to an alkyl or loweralkyl group, as defined herein, appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like.

"Acyl" as used herein alone or as part of another group refers to a —C(O)R radical, where R is any suitable substituent such as aryl, alkyl, alkenyl, alkynyl, cycloalkyl or other suitable substituent as described herein.

"Haloalkyl," as used herein alone or as part of another group, refers to at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, 2-chloro-3-fluoropentyl, and the like.

"Alkylthio," as used herein alone or as part of another group, refers to an alkyl group, as defined herein, appended to the parent molecular moiety through a thio moiety, as defined herein. Representative examples of alkylthio include, but are not limited, methylthio, ethylthio, tert-butylthio, hexylthio, and the like.

"Aryl," as used herein alone or as part of another group, refers to a monocyclic carbocyclic ring system or a bicyclic carbocyclic fused ring system having one or more aromatic rings. Representative examples of aryl include, azulenyl, indanyl, indenyl, naphthyl, phenyl, tetrahydronaphthyl, and the like. The term "aryl" is intended to include both substituted and unsubstituted aryl unless otherwise indicated and these groups may be substituted with the same groups as set forth in connection with alkyl and loweralkyl above.

"Amino" as used herein means the radical —NH$_2$.

"Alkylamino" as used herein alone or as part of another group means the radical —NHR, where R is an alkyl group.

"Cycloalkyl," as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include, cyclopropyl, cyclobutyl, cyclopentyl, cyclohexyl, cycloheptyl, and cyclooctyl. These rings may be optionally substituted with additional substituents as described herein such as halo or loweralkyl.

"Thiocyanato" refers to an —SCN group.

"Sulfoxyl" is —S(=O)R$^1$R$^2$, where R$^1$ and R$^2$ are alkyl or aryl.

"Sulfonyl" is —R$^1$—S(=O)$_2$R$^2$, where R$^1$ and R$^2$ are alkyl or aryl.

"Amido" is —RC(=O)NR$^1$R$^2$, where R alkyl or aryl, and R$^1$ and R$^2$ are H, alkyl or aryl.

"Carbamoyl" —ROC(=O)NR$^1$R$^2$, where R alkyl or aryl, and R$^1$ and R$^2$ are H, alkyl or aryl.

"Linkers" (linking group, linker group, etc.) that may be used to form covalent conjugates of two functional moieties are known in the art. The particular linking group employed in carrying out the present invention is not critical, and linking groups that may be used include, but are not limited to, those disclosed in U.S. Pat. No. 6,624,317 to Lee et al., U.S. Pat. No. 5,650,399 to Rokita et al., and U.S. Pat. No. 5,122,368 to Greenfield et al. In general, the linking group may comprise an aliphatic, aromatic, or mixed aliphatic and aromatic group (e.g., alkyl, aryl, alkylaryl, etc.) and contain one or more hetero atoms such as N, O, S, etc.

"Porphyrazine" is used generically herein to refer to compounds having a general core structure as follows:

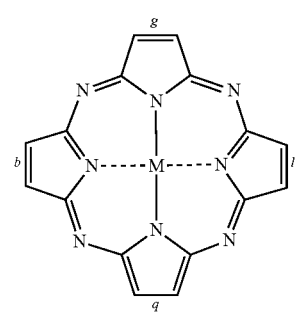

in unsubstituted form, as well as such compounds with substitutions thereon, (e.g., compounds as shown below with various substituents thereon). Porphyrazines may be substituted with any suitable group, including ring systems and fused ring systems such as benzazolo groups as discussed further below. Substituents on non-linking positions of the porphyrazines (or on benzo or naphtho or other annulated rings) include, but are not limited to, alkyl, alkenyl, alkynyl, cycloalkyl, aryl (including phenyl), halo, hydroxy, alkoxy, alkylthio, pyridyl, cyano, thiocyanato, nitro, amino, alkylamino, acyl, sulfoxyl, sulfonyl, amido, and carbamoyl (all of which may be substituted or unsubstituted). More preferred substituents are aryl (including phenyl), cycloalkyl, alkyl, halogen, alkoxy, alkylthio, perfluoroalkyl, perfluoroaryl, pyridyl, cyano, thiocyanato, nitro, amino, alkylamino, acyl, sulfoxyl, sulfonyl, amido, and carbamoyl. Most preferred substituents include methyl, t-butyl, butoxy, fluoro, and H (no substituent).

"Sub-porphyrazine" as used herein, refers to a structure like a porphyrazine as given above, except with one less pyrrole ring therein. The tribenzo analogue of a sub-porphyrazine is "sub-phthalocyanine".

"Benzazoloporphyrazine" as used herein includes substituted or unsubstituted porphyrazines as described above, particularly with one, two three or four benzazolo groups fused thereto at the b, g, l and/or q bond positions, which benzazolo groups may be substituted or unsubstituted as noted above. Examples include: 2-R-5,6-benzazoloporphyrazines such as:

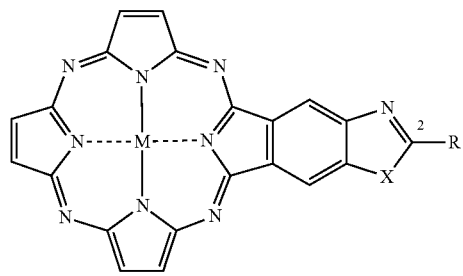

trans-bis(2-R-5,6-benzazolo)porphyrazines such as:

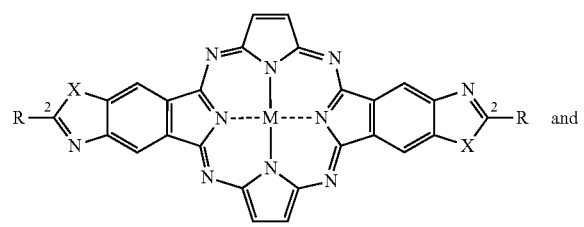

and

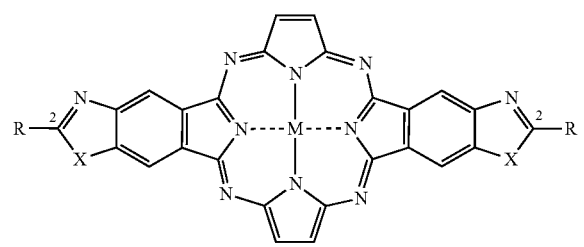

and tetrakis(2-R-5,6-benzazolo)porphyrazines such as:

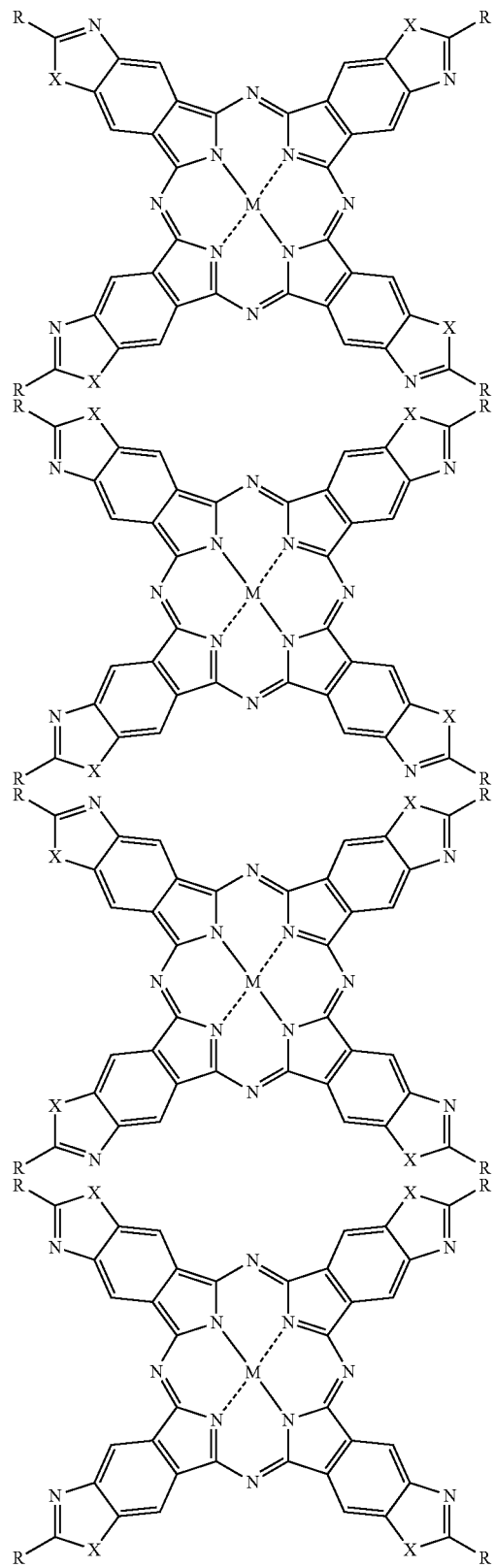

where X in all of the foregoing is for example $NR^1$ (for benzimidazoporphyrazines), O (for benzoxazoporphyrazines), S (for benzthiazoporphyrazines), and Se (for benzselenazoporphyrazines), $R^1$ is for example H or alkyl, and the 2 position of the azolo groups are numbered, M is a metal or a pair of hydrogen atoms, and the rings may be unsubstituted as shown or further substituted as described above and below (e.g., hydrogens on the benzazolo groups may be replaced with like substituents as noted above in connection with porphyrazines). Note that certain compounds may exist as different regioisomers, depending upon the position of the ring substituent X therein.

Particular examples of all of the foregoing are:
2-R-5,6-benzimidazoporphyrazines;
trans-bis(2-R-5,6-benzimidazo)porphyrazines;
tribenzo(2-R-5,6-benzimidazo)porphyrazines;
trans-dibenzo-bis(2-R-5,6-benzimidazo)porphyrazines;
tetrakis(2-R-5,6-benzimidazo)porphyrazines;
2-R-5,6-benzoxazoporphyrazines;
trans-bis(2-R-5,6-benzoxazo)porphyrazines;
tribenzo(2-R-5,6-benzoxazo)porphyrazines;
trans-dibenzo-bis(2-R-5,6-benzoxazo)porphyrazines;
tetrakis(2-R-5,6-benzoxazo)porphyrazines;
2-R-5,6-benzthiazoporphyrazines;
trans-bis(2-R-5,6-benzthiazo)porphyrazines;
tribenzo(2-R-5,6-benzthiazo)porphyrazines;
trans-dibenzo-bis(2-R-5,6-benzthiazo)porphyrazines;
tetrakis(2-R-5,6-benzthiazo)porphyrazines;
2-R-5,6-benzselenazoporphyrazines;
trans-bis(2-R-5,6-benzselenazo)porphyrazines;
tribenzo(2-R-5,6-benzselenazo)porphyrazines;
trans-dibenzo-bis(2-R-5,6-benzselenazo)porphyrazines; and
tetrakis(2-R-5,6-benzselenazo)porphyrazines.

All of which may be substituted or unsubstituted as described further above and below. The terms "sandwich coordination compound" or "sandwich coordination complex" refer to a compound of the formula $L''M^{n-1}$, where each L is a heterocyclic ligand (as described below), each M is a metal, n is 2 or more, most preferably 2 (as for a double-decker sandwich coordination compound) or 3 (as for a triple decker sandwich coordination compound), and each metal is positioned between a pair of ligands and bonded to one or more heteroatom (and typically a plurality of heteroatoms, e.g., 2, 3, 4, 5) in each ligand (depending upon the oxidation state of the metal). Thus sandwich coordination compounds are not organometallic compounds such as ferrocene, in which the metal is bonded to carbon atoms. The ligands in the sandwich coordination compound are generally arranged in a stacked orientation (i.e., are generally cofacially oriented and axially aligned with one another, although they may or may not be rotated about that axis with respect to one another). See, e.g., D. Ng and J. Jiang, Sandwich-type heteroleptic phthalocyaninato and porphyrinato metal complexes, *Chemical Society Reviews* 26, 433-442 (1997). The metals M are generally comprised of the lanthanide series (Ce, Pr, Nd, Pm, Sm, Eu, Gd, Tb, Dy, Ho, Er, Tm, Yb, Lu) as well as Y, In, La, Bi, and the actinides. In fact the only lanthanide that has not been incorporated into a sandwich complex is the radioactive element Pm. Double-decker and triple-decker sandwich coordination compounds are preferred.

The term "homoleptic sandwich coordination compound" refers to a sandwich coordination compound as described above wherein all of the ligands L are the same.

The term "heteroleptic sandwich coordination compound" refers to a sandwich coordination compound as described above wherein at least one ligand L is different from the other ligands therein.

A linker is a molecule used to couple two different molecules, two subunits of a molecule, or a molecule to a substrate. When all are covalently linked, they form units of a single molecule.

A substrate is a, preferably solid, material suitable for the attachment of one or more molecules. Substrates can be formed of materials including, but not limited to glass, plastic, silicon, minerals (e.g. quartz), semiconducting materials, ceramics, metals, etc.

"Surface attachment group" as used herein refers to a functional group having a protected or unprotected reactive site or group thereon, such as a carboxylic acid, alcohol, thiol, selenol or tellurol group, or a phosphono (e.g. dihydroxyphosphoryl), alkenyl (e.g., ethenyl) and alkynyl (e.g., ethynyl) group. "Surface attachment groups" as used herein may be monodentate or monopodal, but also encompasses multidentate or multipodal (e.g., bipod, tripod, quadrupod, etc.) surface attachment groups unless specified to the contrary. While encompassing a variety of substituents as discussed below, a surface attachment group is not H, and is not an unsubstituted and saturated alkyl (e.g., $-(CH_2)_n CH_3$ where n is 1 to 7). The surface attachment group may be unprotected or protected with a suitable protecting group in accordance with known techniques. Examples of surface attachment groups include but are not limited to carboxy, phosphono, iodo, bromo, chloro, cyano, amino, alkenyl, alkynyl, hydroxy, mercapto, selenyl, telluro, S-acetylthio, Se-acetylseleno, Te-acetyltelluro. The surface attachment group may be substituted directly on the compound or linked by means of an intervening linker group (e.g., the groups can be attached at the terminus of an alkyl or aryl tether). The tethers can comprise single or polypodal tethers. Preferred polypodal tethers include 4-(4-allylhepta-1,6-dien-4-yl)phenyl, 4-[4-(3-phosphonopropyl)-1,7-diphosphonohept-4-yl]phenyl, 4-(3-vinylpenta-1,4-dien-3-yl)biphen-4'-yl, 4-[2-(carboxymethyl)-1,3-dicarboxyprop-2-yl]phenyl, and 3-ethynylpenta-1,4-diyn-3-yl.

"Cross-coupling group" as used herein refers to a group on one molecule which can be utilized in conjunction with a corresponding group on another molecule to covalently couple the two molecules under appropriate reaction conditions. The groups used in a given coupling reaction may be different with respect to each other or may be identical, as in a homocoupling reaction. The group(s) and reaction conditions will depend upon the particular technique employed. Examples include but are not limited to groups utilized in Glaser (or Eglinton) coupling, Cadiot-Chodkiewicz coupling, Sonogashira coupling, Heck or Witting reactions, Suzuki coupling, etc. of two different triple deckers (generating a phenylene or biphenyl linker joining a block copolymer). While encompassing a variety of substituents as discussed below, a cross-coupling group is not H, and is not an unsubstituted and saturated alkyl (e.g., $-(CH_2)_n CH_3$ where n is 1 to 7). The cross-coupling group may be unprotected or protected with a suitable protecting group in accordance with known techniques. The cross-coupling group may be substituted directly on the molecule or linked by means of a linker group. Examples of cross-coupling groups include halo, alkenyl, alkynyl, amine, etc.

The disclosures of all United States patent references cited herein are to be incorporated herein in their entirety.

B. Compounds and Methods of Synthesis

The present invention provides a method of making a trans-bis(2-R-benzazoloporphyrazine) having at pair of substituents R at each 2 position of a pair of oppositely facing azolo groups thereof, wherein R is a surface attachment group or cross-coupling group Examples of such compounds include but are not limited to compounds of Formula IIa or IIb:

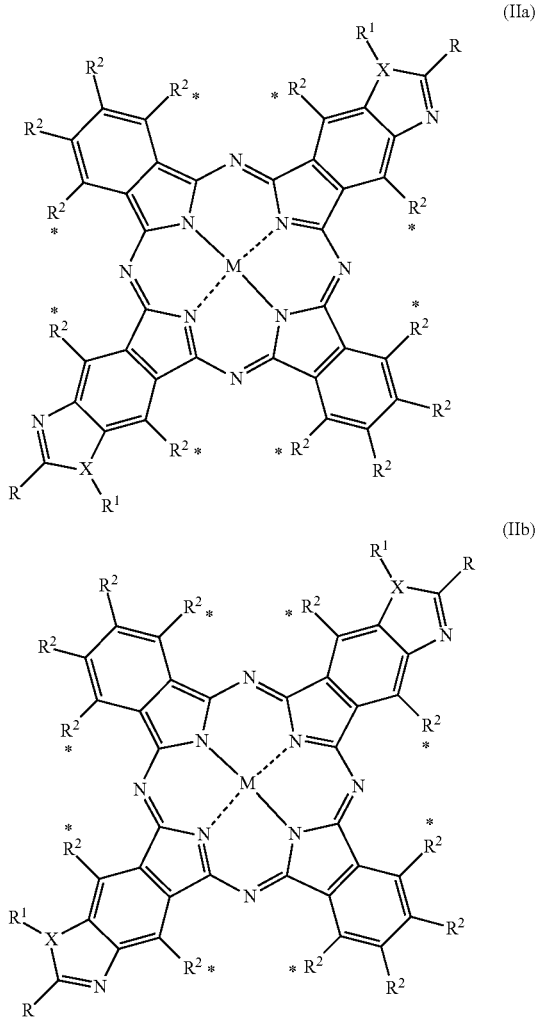

wherein:

M is a metal or a pair of hydrogens;

X is selected from the group consisting of NR¹, O and S, and Se;

R is a surface attachment group or cross-coupling group; and

R¹ is absent or when X is N is H, C1-C40 linear or branched, substituted or unsubstituted alkyl; and R² is any suitable substituent as described above for non-linking positions of the porphyrazines including, but are not limited to, alkyl, alkenyl, alkynyl, cycloalkyl, aryl (including phenyl), halo, hydroxy, alkoxy, alkylthio, pyridyl, cyano, thiocyanato, nitro, amino, alkylamino, acyl, sulfoxyl, sulfonyl, amido, and carbamoyl (all of which may be substituted or unsubstituted). More preferred substituents are aryl (including phenyl), cycloalkyl, alkyl, halogen, alkoxy, alkylthio, perfluoroalkyl, perfluoroaryl, pyridyl, cyano, thiocyanato, nitro, amino, alkylamino, acyl, sulfoxyl, sulfonyl, amido, and carbamoyl. Most preferred substituents include methyl, t-butyl, butoxy, fluoro, and H (no substituent).

Or, an adjacent pair of R² groups on the same ring may form a fused or annulated ring or ring system (including unsubstituted ring systems and ring systems substituted one or more times, (e.g., 1, 2, 4, 6, 8 times) with a suitable substituent, such as independently selected R² substituents as described above (for example as described in U.S. Pat. No. 6,420,648 to Lindsey at columns 24-27).

Or, an adjacent pair of R² groups on separate proximal benzo rings (for example, the eight pairs of adjacent R² groups identified by asterisks in IIa and IIb above) may be linked by a linker group (as discussed further below).

A method of making compounds of Formulas IIa-b (one embodiment of which is exemplified by Scheme 7 below) involves reacting a compound of Formula III:

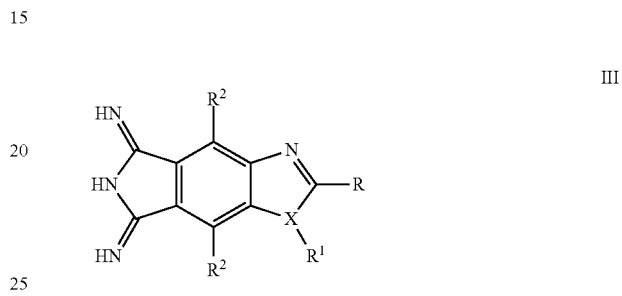

with a trihaloisoindolenine to produce said trans-bis(2-R-benzazoloporphyrazine) compound. The reaction can be carried out in accordance with known techniques, such as described in U.S. Pat. No. 4,061,654 to Idelson. In some embodiments R² may represent another compound of formula III linked by a linker group as described above, which linkage may be carried out in accordance with known techniques (See, e.g., Kobayashi, N.; Kobayashi, Y.; Osa T. J. *Am. Chem. Soc.* 1993, 115, 10994-10995; Kobayashi, N. *Chem. Commun.* 1998, 487-488; Drew, D. M.; Leznoff, *Chem. Commun.* 1994, 623). The reaction conditions are not critical and in general the reaction may be carried out at room temperature in any suitable solvent. Typically the reaction is carried out in the presence of an acid acceptor and a hydroquinone compound which can donate hydrogen atoms. The trihaloisoindolenine may be as described in U.S. Pat. No. 4,061,654, such as a compound of Formula IV:

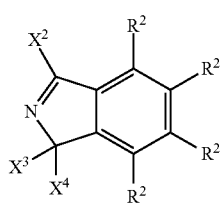

wherein X², X³, and X⁴ are each halo, preferably chloro and each R² is as given above.

The present invention also provides 2-R-benzazoloporphyrazine compounds having at least one (e.g., one, two, three, four) independently selected substituent R at a 2 position of an azolo group thereof, wherein R is a surface attachment group or cross-coupling group. Such compounds include but are not limited to compounds of Formula V:

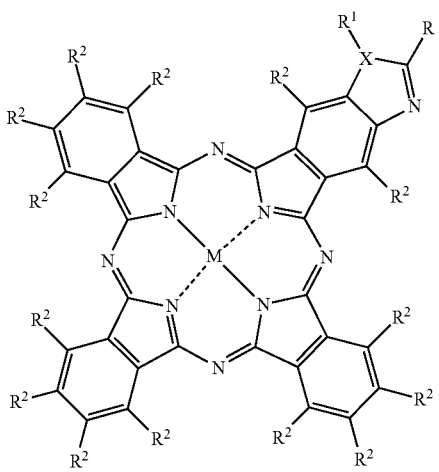

(V)

wherein each of M, X, R, $R^1$ and $R^2$ are as given above. Methods of making such compounds (one embodiment of which is exemplified by Scheme 6 below) generally involve reacting a compound of Formula III:

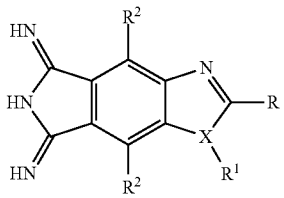

III wherein each of X, R, $R^1$ and $R^2$ are as given above with a substituted or unsubstituted boron-subporphyrazine such as a boron-subphthalocyanine (e.g., as illustrated by Formula XX) (or a corresponding aluminum-subphthalocyanine) in an organic solvent (e.g., a polar protic or aprotic solvent, a high boiling point aromatic solvent) at an elevated temperature to produce the desired 2-R benzazoloporphyrazine compound. In some embodiments $R^2$ may represent another compound of formula III linked by a linker group as described above.

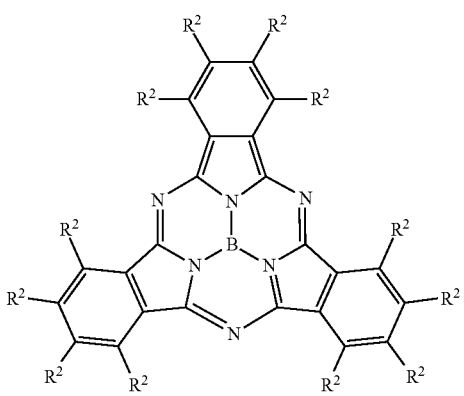

(XX)

where each $R^2$ is as given above, and where B has a suitable counterion such as a halide, triflate, tosylate, alkoxy or aryloxy group.

The present invention also provides a method of making a 2-R-benzazoloporphyrazine compound (including but not limited to those of Formula V above) by reacting a compound of Formula VI:

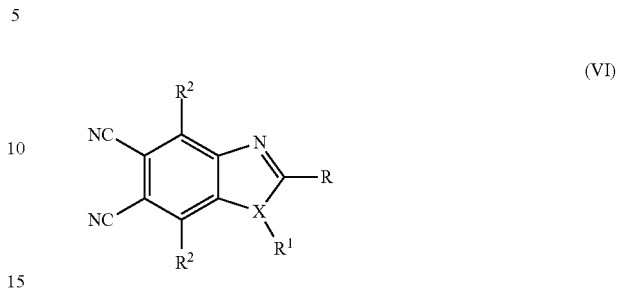

(VI)

wherein each of X, R, $R^1$ and $R^2$ is as given above with a compound of Formula VII:

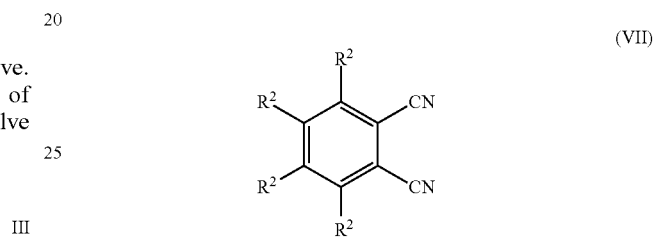

(VII)

wherein each $R^2$ is as given above. The reaction is generally carried out in an alcohol (e.g., butanol, pentanol, hexanol, or mixtures thereof) in the presence of an alkyl amine or metal base such as DBU, and optionally in the presence of a metal halide such as $MgCl_2$ or $ZnCl_2$, to produce the desired compound. In some embodiments $R^2$ may represent another compound of formula VII linked by a linker group as described in connection with formula III above.

The present invention further provides tetrakis(2-R-benzazolo)porphyrazine compounds having four substituents R at each 2 position of each azolo group thereof, wherein R is a surface attachment group or cross-coupling group. Examples of such compounds include but are not limited to compounds of Formula VIIIa-d:

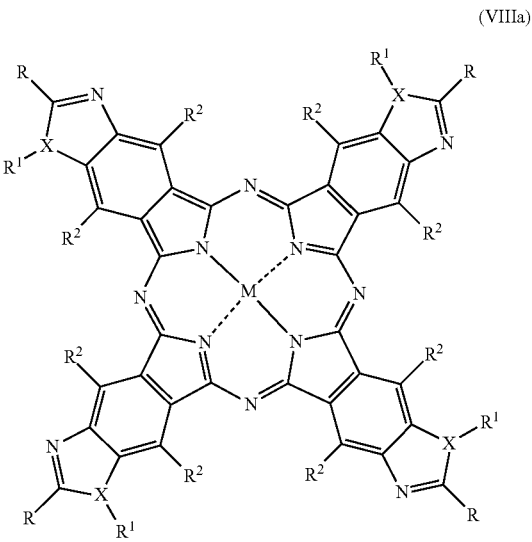

(VIIIa)

-continued (VIIIb)

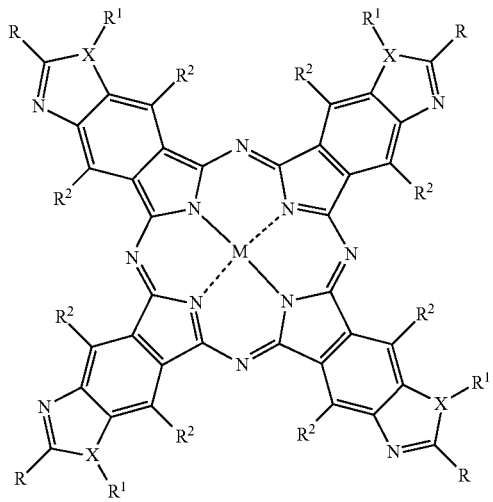

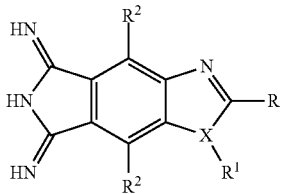

in a polar protic solvent at an elevated temperature to produce the tetrakis compound. In some embodiments $R^2$ may represent another compound of formula III linked by a linker group as described above.

Another method of making a tetrakis(2-R benzazolo)porphyrazine (including but not limited to compounds of Formulas VIIIa-d above) is carried out by reacting a compound of Formula VI:

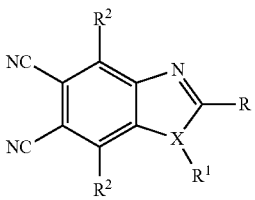

(wherein each of X, R, $R^1$ and $R^2$ is as given above). The reaction is generally carried out in an alcohol (e.g., butanol, pentanol, hexanol, or mixtures thereof) in the presence of an alkyl amine such as DBU or metal base such as sodium hydroxide, and optionally in the presence of a metal halide such as $MgCl_2$ or $ZnCl_2$, to produce the desired compound. In some embodiments $R^2$ may represent another compound of formula VI linked by a linker group as described above.

Compound of Formula III:

(VIIIc)

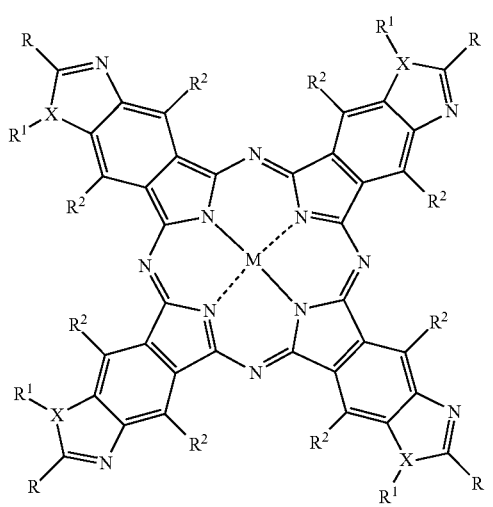

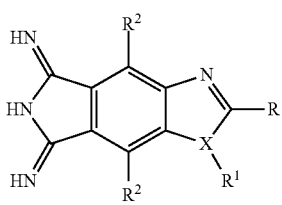

wherein each of X, R, $R^1$ and $R^2$ is as given above can be made by reacting a compound of Formula VI:

(VIIId)

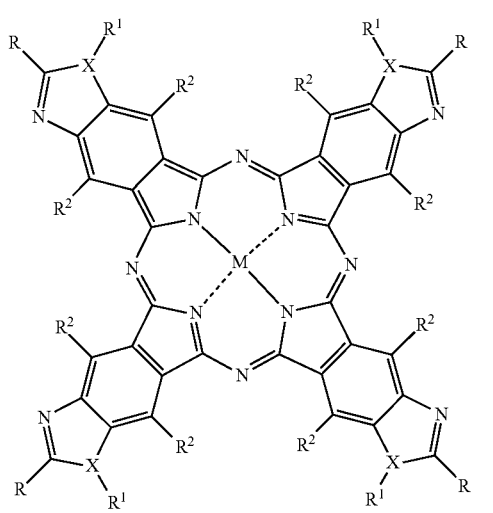

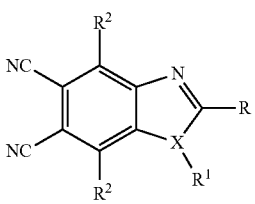

wherein each of M, X, R, $R^1$ and $R^2$ are as given above. Methods of making such compounds may be carried out by tetramerizing a compound of Formula III:

(wherein each of X, R, $R^1$ and $R^2$ is as given above) in either (a) a polar protic solvent such as methanol (optionally with a cosolvent such as THF) with an alkoxide base (such as NaOMe) and ammonia gas at an elevated temperature, or (b) in a polar aprotic solvent such as DMF with NaNH$_2$, to produce the compound of Formula III.

The compound of Formula VI as given above can in turn be made by reacting a compound of Formula IX:

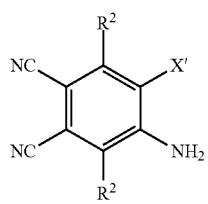

IX (where X' is NH$_2$, SH, OH, or SeH), with an aldehyde of the formula RCHO (where R is as given above) in a polar aprotic solvent (typically a high boiling point alcohol or polar aprotic solvent such as ethanol or acetonitrile) in the presence of an oxidant (preferably O$_2$) to produce a reaction product; and then optionally (but preferably when X is N as in the case with Formula IX above) reacting the reaction product with a compound of the formula R$^1$X$^5$, where R$^1$ is as given above and X$^5$ is halo, tosyl, or triflate, to produce said compound of Formula VI.

When it is desired to produce compounds of Formula VI where X is other than N, the general route to compounds of Formula IX can be utilized as shown below, and the compounds of Formula IX (where X is other than N) can be cyclized by reaction with RCHO in like manner as described above.

A general route to:

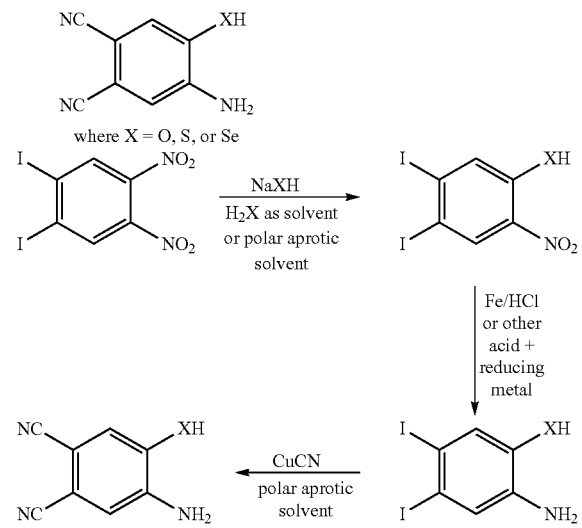

Compounds of Formula IX where X is N can be made in accordance with known techniques or by reacting a compound of Formula X:

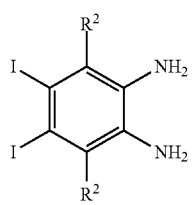

X in a polar aprotic solvent with a cyanation reagent to produce said compound of Formula IX One example of such a reaction is shown in Scheme 1 below. The reaction is typically carried out in a polar aprotic solvent, DMF and/or DMSO, preferably at an elevated temperature (e.g., greater than 100° C. but preferably less than 140° C.). Any suitable cyanation reagent can be used, such as: 1) Stoichiometric (or excess) CuCN in polar aprotic solvent (a) Rosenmund, K. W.; Struck, E. *Chem. Ber.* 1919, 52, 1749; b) von Braun, J.; Manz, G. *Liebigs Ann. Chem.* 1931, 488, 111); 2) Catalytic copper in nonpolar solvent, with catalytic KI and excess NaCN (a) anon, J.; Klapars, A.; Buchwald, S. L. *J. Am. Chem. Soc.* 2003, 125, 2891-2892); 3) Catalytic Palladium reagents (a) [Pd(acetate)$_2$ or Pd(CN)$_2$; with excess KCN; in DMF] Takagi K.; Okamoto, T.; Sakakibara, Y.; Oka, S. *Chem. Lett.* 1973, 471-474; b) [Pd(PPh$_3$)$_4$; with excess KCN; in THF] Sekiya, A.; Ishiwara, N. *Chem. Lett.* 1975, 277-278; c) [Pd(PPh$_3$)$_4$; with excess Zn(CN)$_2$; in THF] Tschaen, D. M.; Desmond, R.; King, A. O.; Fortin, M. C.; Pipik, B.; King, S.; Verhoeven, T. R. *Synth. Commun.* 1994, 24, 887-890; d) [Pd(PPh$_3$)$_4$; with excess trimethylsilylcyanide (TMSCN); in triethylamine] Chatani, N.; Hanafusa, T. *J. Org. Chem.*, 1986, 51, 4714-4716; e) [Pd(acetate)$_2$, with added (1,5-bis(diphenylphosphino)pentane); with excess KCN; in toluene] Sundermeier, M.; Zapf, A.; Beller, M.; Sans, J. *Tetrahedron Lett.* 2001, 42, 6707-6710); 4) Catalytic Nickel reagents such as a) [Ni(PPh$_3$)$_4$ or Ni(P(cyclohexyl)$_3$)$_4$; with excess NaCN; in EtOH] Cassar, L. *J. Organometal. Chem.* 1973, 54, C57-058; b) [Ni(PPh$_3$)$_4$; with excess KCN; in hexamethylphosphoramide (HMPA)] Sakakibara, Y.; Ido, Y.; Sasaki, K.; Sakai, M.; Uchino, N. *Bull. Chem. Soc. Jpn.* 1993, 66, 2776-2778; etc.

Metals and metalation. Benzazoloporphyrazines of the invention may be metalated with any suitable metal in accordance with known metalation techniques concurrently with or subsequent to their formation. See, e.g., U.S. Pat. No. 6,208,553. Suitable metals include but are not limited to 2Li(I), Pd(II), Pt(II), Mg(II), Zn(II), Al(III), Ga(III), In(III), Sn(IV), Cu(II), Ni(II), and Si(IV). Where the metal is trivalent or tetravalent a counterion or (if necessary a substituent R$^2$ as in the case of an alkoxy group on Ga(III)) is included as necessary, also in accordance with known techniques.

C. Surface Attachment Groups

As noted above, benzazolopoprhyrazines of the invention can be substituted at the 2 position of an azolo group thereof with a surface attachment group, which may be in protected or unprotected form. A surface attachment group may be a reactive group coupled directly to the azolo group, or coupled to the azolo group by means of an intervening linker. Linkers L can be aryl, alkyl, heteroaryl, heteroalkyl (e.g., oligoethylene glycol), peptide, polysaccharide, etc. Examples of surface attachment groups (with the reactive site or group in unprotected form) include but are not limited to:

4-carboxyphenyl,
carboxymethyl,
2-carboxyethyl,
3-carboxypropyl,
2-(4-carboxyphenyl)ethynyl,
4-(2-(4-carboxyphenyl)ethynyl)phenyl,
4-carboxymethylphenyl,
4-(3-carboxypropyl)phenyl,
4-(2-(4-carboxymethylphenyl)ethynyl)phenyl;
4-hydroxyphenyl,
hydroxymethyl,
2-hydroxyethyl,
3-hydroxypropyl,
2-(4-hydroxyphenyl)ethynyl,
4-(2-(4-hydroxyphenyl)ethynyl)phenyl,
4-hydroxymethylphenyl,
4-(2-hydroxyethyl)phenyl,
4-(3-hydroxypropyl)phenyl, 4-(2-(4-hydroxymethylphenyl)ethynyl)phenyl;
4-mercaptophenyl,
mercaptomethyl,
2-mercaptoethyl,
3-mercaptopropyl,
2-(4-mercaptophenyl)ethynyl,
4-(2-(4-mercaptophenyl)ethynyl)phenyl,
4-mercaptomethylphenyl,
4-(2-mercaptoethyl)phenyl,
4-(3-mercaptopropyl)phenyl,
4-(2-(4-mercaptomethylphenyl)ethynyl)phenyl;
4-selenylphenyl,
selenylmethyl,
2-selenylethyl,
3-selenylpropyl,
2-(4-selenylphenyl)ethynyl,
4-selenylmethylphenyl,
4-(2-selenylethyl)phenyl,
4-(3-selenylpropyl)phenyl,
4-selenylmethylphenyl,
4-(2-(4-selenylphenyl)ethynyl)phenyl;
4-tellurylphenyl,
tellurylmethyl,
2-tellurylethyl,
3-tellurylpropyl,
2-(4-tellurylphenyl)ethynyl,
4-(2-(4-tellurylphenyl)ethynyl)phenyl,
4-tellurylmethylphenyl,
4-(2-tellurylethyl)phenyl,
4-(3-tellurylpropyl)phenyl,
4-(2-(4-tellurylmethylphenyl)ethynyl)phenyl;
4-(dihydroxyphosphoryl)phenyl,
(dihydroxyphosphoryl)methyl,
2-(dihydroxyphosphoryl)ethyl,
3-(dihydroxyphosphoryl)propyl,
2-[4-(dihydroxyphosphoryl)phenyl]ethynyl,
4-[2-[4-(dihydroxyphosphoryl)phenyl]ethynyl]phenyl,
4-[(dihydroxyphosphoryl)methyl]phenyl,
4-[2-(dihydroxyphosphoryl)ethyl]phenyl,
4-[2-[4-(dihydroxyphosphoryl)methylphenyl]ethynyl]phenyl;
4-(hydroxy(mercapto)phosphoryl)phenyl,
(hydroxy(mercapto)phosphoryl)methyl,
2-(hydroxy(mercapto)phosphoryl)ethyl,
3-(hydroxy(mercapto)phosphoryl)propyl,
2-[4-(hydroxy(mercapto)phosphoryl)phenyl]ethynyl,
4-[2-[4-(hydroxy(mercapto)phosphoryl)phenyl]ethynyl] phenyl,
4-[(hydroxy(mercapto)phosphoryl)methyl]phenyl,
4-[2-(hydroxy(mercapto)phosphoryl)ethyl]phenyl,
4-[2-[4-(hydroxy(mercapto)phosphoryl)methylphenyl]ethynyl]phenyl;
4-cyanophenyl,
cyanomethyl,
2-cyanoethyl,
3-cyanopropyl,
2-(4-cyanophenyl)ethynyl,
4-[2-(4-cyanophenyl)ethynyl]phenyl,
4-(cyanomethyl)phenyl,
4-(2-cyanoethyl)phenyl,
4-[2-[4-(cyanomethyl)phenyl]ethynyl]phenyl;
4-cyanobiphenyl;
4-aminophenyl,
aminomethyl,
2-aminoethyl,
3-aminopropyl,
2-(4-aminophenyl)ethynyl,
4-[2-(4-aminophenyl)ethynyl]phenyl,
4-aminobiphenyl;
4-formylphenyl,
4-bromophenyl,
4-iodophenyl,
4-vinylphenyl,
4-ethynylphenyl,
4-allylphenyl,
4-[2-(trimethylsilyl)ethynyl]phenyl,
4-[2-(triisopropylsilyl)ethynyl]phenyl,
4-(4,4,5,5-tetramethyl-1,3,2-dioxaborolan-2-yl)phenyl;
formyl,
bromo,
iodo,
bromomethyl,
chloromethyl,
ethynyl,
vinyl,
allyl;
4-(ethynyl)biphen-4'-yl,
4-[2-(triisopropylsilyl)ethynyl]biphen-4'-yl,
3,5-diethynylphenyl;
4-(bromomethyl)phenyl, and
2-bromoethyl.

In addition to the monodentate linker-surface attachment groups described above, multidentate linkers can be employed [Nikitin, K. *Chem. Commun.* 2003, 282-283; Hu, J.; Mattern, D. L. *J. Org. Chem.* 2000, 65, 2277-2281; Yao, Y.; Tour, J. M. *J. Org. Chem.* 1999, 64, 1968-1971; Fox, M. A. et al. *Langmuir,* 1998, 14, 816-820; Galoppini, E.; Guo, W. *J. Am. Chem. Soc.* 2001, 123, 4342-4343; Deng, X. et al. *J. Org. Chem.* 2002, 67, 5279-5283; Hector Jr., L. G. et al. *Surface Science,* 2001, 494, 1-20; Whitesell, J. K.; Chang, H. K. *Science,* 1993, 261, 73-76; Galoppini, E. et al. *J. Am. Chem. Soc.* 2002, 67, 7801-7811; Siiman, O. et al. *Bioconjugate Chem.* 2000, 11, 549-556]. Tripodal linkers bearing thiol, carboxylic acid, alcohol, or phosphonic acid units are particularly attractive for firmly anchoring a molecular device on a planar surface. Specific examples of such linkers are built around the triphenylmethane or tetraphenylmethane unit, including the following:
1,1,1-tris[4-(S-acetylthiomethyl)phenyl]methyl,
4-{1,1,1-tris[4-(S-acetylthiomethyl)phenyl]methyl}phenyl,
1,1,1-tris[4-(dihydroxyphosphoryl)phenyl]methyl, 4-{1,1,1-tris[4-(dihydroxyphosphoryl)phenyl]methyl}phenyl,
1,1,1-tris[4-(dihydroxyphosphorylmethyl)phenyl]methyl,
4-{1,1,1-tris[4-(dihydroxyphosphorylmethyl)phenyl] methyl}phenyl.

All as described in Balakumar, Muthukumaran and Lindsey, U.S. patent application Ser. No. 10/867,512 (filed Jun. 14, 2004). See also Lindsey, Loewe, Muthukumaran, and Ambroise, US Patent Application Publication No. 20050096465 (Published May 5, 2005), particularly paragraph 51 thereof. Additional examples of multidentate linkers include but are not limited to: Alkene surface attachment groups (2, 3, 4 carbons) such as:
3-vinylpenta-1,4-dien-3-yl,
4-(3-vinylpenta-1,4-dien-3-yl)phenyl,
4-(3-vinylpenta-1,4-dien-3-yl)biphen-4'-yl,
4-allylhepta-1,6-dien-4-yl,
4-(4-allylhepta-1,6-dien-4-yl)phenyl,
4-(4-allylhepta-1,6-dien-4-yl)biphen-4'-yl,
5-(1-buten-4-yl)nona-1,8-dien-5-yl,
4-[5-(1-buten-4-yl)nona-1,8-dien-5-yl]phenyl,
4-[5-(1-buten-4-yl)nona-1,8-dien-5-yl]biphen-4'-yl, etc.
Alkyne surface attachment groups (2, 3, 4 carbons) such as:
3-ethynylpenta-1,4-diyn-3-yl, 4-(3-ethynylpenta-1,4-diyn-3-yl)phenyl,
4-(3-ethynylpenta-1,4-diyn-3-yl)biphen-4'-yl,
4-propargylhepta-1,6-diyn-4-yl,
4-(4-propargylhepta-1,6-diyn-4-yl)phenyl,
4-(4-propargylhepta-1,6-diyn-4-yl)biphen-4'-yl,
5-(1-butyn-4-yl)nona-1,8-diyn-5-yl,
4-[5-(1-butyn-4-yl)nona-1,8-diyn-5-yl]phenyl,
4-[5-(1-butyn-4-yl)nona-1,8-diyn-5-yl]biphen-4'-yl,
Alcohol surface attachment groups (1, 2, 3 carbons), such as:
2-(hydroxymethyl)-1,3-dihydroxyprop-2-yl,
4-[2-(hydroxymethyl)-1,3-dihydroxyprop-2-yl]phenyl,
4-[2-(hydroxymethyl)-1,3-dihydroxyprop-2-yl]biphen-4'-yl,
3-(2-hydroxyethyl)-1,5-dihydroxypent-3-yl,
4-[3-(2-hydroxyethyl)-1,5-dihydroxypent-3-yl]phenyl,
4-[3-(2-hydroxyethyl)-1,5-dihydroxypent-3-yl]biphen-4'-yl,
4-(3-hydroxypropyl)-1,7-dihydroxyhept-4-yl,
4-[4-(3-hydroxypropyl)-1,7-dihydroxyhept-4-yl]phenyl,
4-[4-(3-hydroxypropyl)-1,7-dihydroxyhept-4-yl]biphen-4'-yl, etc.,
Thiol surface attachment groups (1, 2, 3 carbons) such as:
2-(mercaptomethyl)-1,3-dimercaptoprop-2-yl,
4-[2-(mercaptomethyl)-1,3-dimercaptoprop-2-yl]phenyl,
4-[2-(mercaptomethyl)-1,3-dimercaptoprop-2-yl]biphen-4'-yl,
3-(2-mercaptoethyl)-1,5-dimercaptopent-3-yl
4-[3-(2-mercaptoethyl)-1,5-dimercaptopent-3-yl]phenyl,
4-[3-(2-mercaptoethyl)-1,5-dimercaptopent-3-yl]biphen-4'-yl,
4-(3-mercaptopropyl)-1,7-dimercaptohept-4-yl,
4-[4-(3-mercaptopropyl)-1,7-dimercaptohept-4-yl]phenyl,
4-[4-(3-mercaptopropyl)-1,7-dimercaptohept-4-yl]biphen-4'-yl etc.,
Selenyl surface attachment groups (1, 2, 3 carbons), such as:
2-(selenylmethyl)-1,3-diselenylprop-2-yl,
4-[2-(selenylmethyl)-1,3-diselenylprop-2-yl]phenyl,
4-[2-(mercaptomethyl)-1,3-dimercaptoprop-2-yl]biphen-4'-yl,
3-(2-selenylethyl)-1,5-diselenylpent-3-yl,
4-[3-(2-selenylethyl)-1,5-diselenylpent-3-yl]phenyl,
4-[3-(2-selenylethyl)-1,5-diselenylpent-3-yl]biphen-4'-yl,
4-(3-selenylpropyl)-1,7-diselenylhept-4-yl,
4-[4-(3-selenylpropyl)-1,7-diselenylhept-4-yl]phenyl,
4-[4-(3-selenylpropyl)-1,7-diselenylhept-4-yl]biphen-4'-yl, etc.
Phosphono surface attachment groups (1, 2, 3 carbons), such as:
2-(phosphonomethyl)-1,3-diphosphonoprop-2-yl,
4-[2-(phosphonomethyl)-1,3-diphosphonoprop-2-yl]phenyl,
4-[2-(phosphonomethyl)-1,3-diphosphonoprop-2-yl]biphen-4'-yl,
3-(2-phosphonoethyl)-1,5-diphosphonopent-3-yl,
4-[3-(2-phosphonoethyl)-1,5-diphosphonopent-3-yl]phenyl,
4-[3-(2-phosphonoethyl)-1,5-diphosphonopent-3-yl]biphen-4'-yl,
4-(3-phosphonopropyl)-1,7-diphosphonohept-4-yl,
4-[4-(3-phosphonopropyl)-1,7-diphosphonohept-4-yl]phenyl,
4-[4-(3-phosphonopropyl)-1,7-diphosphonohept-4-yl]biphen-4'-yl, etc., and
Carboxylic acid surface attachment groups (1, 2, 3 carbons), such as:
2-(carboxymethyl)-1,3-dicarboxyprop-2-yl,
4-[2-(carboxymethyl)-1,3-dicarboxyprop-2-yl]phenyl,
4-[2-(carboxymethyl)-1,3-dicarboxyprop-2-yl]biphen-4'-yl,
3-(2-carboxyethyl)-1,5-dicarboxypent-3-yl,
4-[3-(2-carboxyethyl)-1,5-dicarboxypent-3-yl]phenyl,
4-[3-(2-carboxyethyl)-1,5-dicarboxypent-3-yl]biphen-4'-yl,
4-(3-carboxypropyl)-1,7-dicarboxyhept-4-yl,
4-[4-(3-carboxypropyl)-1,7-dicarboxyhept-4-yl]phenyl,
4-[4-(3-carboxypropyl)-1,7-dicarboxyhept-4-yl]biphen-4'-yl, etc.

D. Cross-Coupling Groups and Polymers

Compounds of the present invention, as individual ring systems or as sandwich coordination compounds thereof, can be linked as linear polymers in like manner as described in U.S. Pat. No. 6,777,516 to Li, Gryko and Lindsey. Examples of cross-coupling groups include but are not limited to groups $J^2$ and $J^3$ below, which may be linked directly to the compound of the invention or by an intervening linker L. Linkers L can be aryl, alkyl, heteroaryl, heteroalkyl (e.g., oligoethylene glycol), peptide, polysaccharide, etc. The cross-coupling group may be simply a reactive attachment group or moiety (e.g., —R' where R' is a reactive group such as bromo), or may comprise a combination of an intervening linker group coupled to a reactive group (e.g., —R"R', where R' is a reactive group and R" is an intervening group such as a hydrophilic group).

Particular examples of linkers between porphyrazines include, but are not limited to, 4,4'-diphenylethyne, 4,4'-diphenylbutadiyne, 4,4'-biphenyl, 1,4-phenylene, 4,4'-stilbene, 1,4-bicyclooctane, 4,4'-azobenzene, 4,4'-benzylideneaniline, and 4,4"-terphenyl.

Dyads. The synthesis of dyads of triple deckers can proceed via several different types of reactions. The reactions of interest include Glaser (or Eglinton) coupling of two identical triple deckers (generating a butadiyne linker), Cadiot-Chodkiewicz coupling of two different triple deckers (generating a butadiyne linker), Sonogashira coupling of two different triple deckers (generating an ethyne linker), Heck or Wittig reactions of two different triple deckers (generating an alkene linker), Suzuki coupling of two different triple deckers (generating a phenylene or biphenyl linker), etc. Other reactions can also be employed.

| $J^1$—L—TD—L $J^2$ + $J^3$—L—TD—L—$J^4$ | | |
|---|---|---|
| $J^2$ | $J^3$ | Reaction Type |
| —B(OH)$_2$ | —Cl, —Br, —I | Suzuki |
| —≡—H | —Cl, —Br, —I | Sonogashira |
| —≡—H | —≡—H | Glaser |
| —≡—H | —≡—X | Cadiot-Chodkiewicz |
| —CHO | —Br, —I | Wittig |
| —HC=CH$_2$ | —Br, —I | Heck |

Polymers. The methods for synthesis of polymeric arrays of triple deckers include but are not restricted to use of the following types of reactions:
  Glaser (or Eglinton) coupling of a monomeric triple decker (generating a butadiyne linker)
  Cadiot-Chodkiewicz coupling of two different triple deckers (generating a butadiyne linker joining a block copolymer)
  Sonogashira coupling of two different triple deckers (generating an ethyne linker joining a block copolymer)

Heck or Witting reactions of two different triple deckers (generating an alkene linker joining a block copolymer)

Suzuki coupling of two different triple deckers (generating a phenylene or biphenyl linker joining a block copolymer)

We also can polymerize triple deckers bearing substituents such as two or more thiophene groups (generating an oligothiophene linker) or two or more pyrrole groups (generating a polypyrrole linker).

The synthesis of the polymers can be performed using stepwise methods or using polymerization methods. Both methods generally require two reactive groups attached to the triple decker in order to prepare a polymer where the triple deckers are integral components of the polymer backbone. (An alternative design yields pendant polymers where the triple deckers are attached via one linkage to the polymer backbone.) The stepwise synthetic method generally requires the use of protecting groups to mask one reactive site, and one cycle of reactions then involves coupling followed by deprotection. In the polymerization method no protecting groups are employed and the polymer is prepared in a one-flask process.

The polymerizations can take place in solution or can be performed with the polymer growing from a surface. The polymerization can be performed beginning with a solid support as in solid-phase peptide or DNA synthesis, then removed, purified, and elaborated further for specific applications. The polymerization can also be performed with the nascent polymer attached to an electroactive surface, generating the desired electronic material in situ.

Gradient polymers. Polymers can be created that are composed of identical units, or dissimilar units as in block copolymers or random copolymers. Alternatively, the polymerization can be performed to create a linear array where the composition of different triple deckers is organized in a gradient. This latter approach affords the possibility of creating a molecular capacitor where the potential of stored charge increases (or decreases) in a systematic manner along the length of the array. The gradient polymers are created in the following manner. A polymerizable unit (triple decker or linker) is attached to a surface (solid resin as for solid-phase syntheses, or an electroactive surface). The first triple decker ($TD^1$) is added and the coupling reagents are added in order to perform the polymerization (e.g., a Glaser coupling). Then the solid-phase is washed to remove the coupling reagents (copper reagents in the case of the Glaser coupling) and any unreacted $TD^1$. Then the second triple decker ($TD^2$) is added followed by coupling reagents and the polymerization is allowed to continue. The same wash procedure is performed again and then the third triple decker ($TD^3$) is added followed by coupling reagents and the polymerization is allowed to continue. Repetition of this process enables the systematic construction of a linear array of triple deckers with graded oxidation potentials. The final polymer is then cleaved from the solid phase (if the resin is employed for synthesis) or used directly (if the synthesis is performed on an electroactive surface). The polymerizable groups can be any of the type described above using the various name reactions (Glaser, Sonogashira, Cadiot-Chodkiewicz, Heck, Wittig, Suzuki, etc.). The final polymeric product is comprised of domains of the various triple deckers $[(TD^i)_n]$ joined via linkers in a linear array.

Additional information on specific reaction types is provided below.

Glaser Coupling. This coupling reaction, discovered by Glaser over a century ago (Glaser, C. Ber. 1869, 2, 422), is still very commonly used to prepare symmetrical butadiynes by the coupling of terminal ethynes. A variety of conditions can be employed.

(1) Copper reagent. Originally the organic cuprous derivative was isolated first and then oxidized. Later, it was found that the cuprous derivative can be formed in situ. The portion of cuprous salt which could be employed successfully may vary from 0.2 to 600% of the theoretical amount. Catalytic quantities (0.2%-0.5%) of cuprous salts are employed mostly with hydrophilic ethynes. Generally, the ratio of ethyne to $Cu^+$ should be kept higher than 1. Ammonium or amine compounds should also be present (Cameron, M. D.; Bennett, G. E. J. Org. Chem. 1957, 22, 557).

(2) Oxidizing agents. Air and oxygen are most frequently employed as oxidizing agents. Other oxidizing agents such as potassium ferricyanide, hydrogen peroxide, and cupric salts have also been employed (Viehe, H. G. Ed: Chemistry of Acetylene, Marcel Dekker, New York, 1969, p. 597). It has been proved, however, in all cases, that the cupric ion is the true oxidizing agent (Eglinton, G.; McCrae, W. Adv. Org. Chem. 1963, 4, 225).

(3) Time and temperature. In general, room temperature is sufficient and also convenient. The reaction time varies between minutes and hours.

(4) Solvents. Pyridine is a good solvent for ethynes and their cuprous derivatives. Tertiary amides are also excellent solvents and increase the coupling speed with a stoichiometric quantity of cuprous salt. However, many kinds of solvents have been successfully employed for the individual ethynes.

(5) Ethynes. The method is applicable to almost all symmetrical couplings, no matter what the functional groups are. Yields are good and appear to be limited mostly by the instability of the butadiyne-linked materials formed in the reaction. However, this coupling method cannot be applied to ethynes with strongly complexing functional groups (such as phosphine), or certain metal derivatives, which are unstable under these reaction conditions (Bohlmann, F. Ber. 1951, 84, 545).

This conventional self-coupling of terminal ethynes has been modified by (1) Pd(0)-CuI catalyzed self-coupling in the presence of chloroacetone and benzene (Rossi, R.; Carpita, A.; Bigelli, C. Tetrahedron Lett. 1985, 523), (2) Pd(II)-Cu(I) catalyzed self-coupling in the presence of stoichiometric iodine (Liu, Q.; Burton, D. J.; Tetrahedron Lett. 1997, 38, 4371), (3) Reaction of lithium dialkyl diarylborates with iodine (Pelter, A.; Smith, K.; Tabata, M. J. Chem. Soc. Chem. Commun. 1975, 857).

Eglinton Coupling. This method was based on the fact that in Glaser couplings, the true oxidizing agents are cupric salts. In 1956, Eglinton and Galbraith proposed the method which involves a cupric salt oxidation in pyridine (Eglinton, G.; Galbraith, A. R. Chem. Ind. 1956, 737). This condition was modified by Breslow in the middle 1980s (O'Krongly, D.; Denmeade, S. R.; Chiang, M. Y.; Breslow, R. J. Am. Chem. Soc. 1985, 107, 5544), which employed cupric/cuprous couples in oxygen free pyridine. This method is very commonly used today. Pyridine has been mostly employed as a good solubilizing and buffering agent. Other amines can also be employed, such as morpholine and tetramethylethylenediamine. In addition, other solvents can also be added. The reaction speed increases with the acidity of the acetylenic proton; alkyl ethynes react slower than aryl ethynes and butadiynes as in Glaser coupling. The cuprous derivative does not form in significant quantities but appears to be the reaction intermediate.

Straus Coupling. Under conditions of Glaser coupling in acidic media, an enyne can be formed, as first demonstrated by Straus in 1905 (Straus, F. *Liebigs Ann.* 1905, 342, 190). The original experimental process consists of refluxing for a few hours, then an acetic acid solution of a dry cuprous derivative is added under an inert gas. The only enyne formed is head-to-tail coupled, whereas the head-to-head coupled enyne could never be detected.

Cadiot-Chodkiewicz Coupling. For the preparation of unsymmetrical butadiynes, Glaser coupling of two different terminal ethynes inevitably gives a mixture of butadiynes. The Cadiot-Chodkiewicz coupling method, proposed in 1957 (Chodkiewicz, W. *Ann. Chim.* 1957, 2, 819), provides a directed route to couple two different ethyne units. The Cadiot-Chodkiewicz coupling method consists of the condensation of ethynes with halogenated ethynes in the presence of cuprous salt and a suitable amine. It is noteworthy that under the reaction conditions, 1-halogenoethynes can undergo a self-coupling to the corresponding symmetrical butadiynes (Chodkiewicz, W. *Ann. Chim.* 1957, 2, 819):

(1) Cuprous Salt. The cuprous ethyne derivative is assumed to be the reactive intermediate. The cuprous species is regenerated in the condensation and can be employed in catalytic amounts (about 1-5%). This low concentration of cuprous ion reduces almost entirely the self-coupling of the halogenoethynes.

(2) Basic Agent. This reaction does not occur in acid media. A base is necessary to neutralize the acid resulting from the condensation. Amines are good solvents which hinder the self-coupling reaction as well as oxidation of the reaction medium. The efficiency of amines decreases as follows: primary>secondary>tertiary.

(3) Solvent. Good solubility of the terminal ethyne in the reaction medium is required. A minimum solubility of the cuprous derivative is also essential. Alcohols are frequently employed for aryl ethynes. Ethers can be used with scarcely soluble compounds. Tertiary amides are very good solvents for terminal ethynes and for cuprous derivatives, and are often employed with scarcely soluble compounds.

(4) Nature of the 1-halogenoacetylene. Among chloro-, bromo- and iodo-derivatives the 1-bromoethynes are the most suitable. Generally the 1-bromoethynes are sufficiently reactive toward derivatives. At the other extremes, 1-iodoethynes are strongly oxidizing toward the cuprous ion and favor the self-coupling reaction, while 1-chloroethynes exhibit low reactivity.

Suzuki Coupling. Suzuki cross coupling of aryl halides with arylboronic acids has emerged as an extremely powerful tool to form biaryl compounds (For reviews, see: (a) Miyaura, N.; Suzuki, A. *Chem. Rev.* 1995, 95, 2457. (b) Suzuki, A. *J. Organomet. Chem.* 1999, 576, 147). This methodology has been extensively studied with respect to palladium sources, ligands, additives, solvents etc. (Littke, A. F.; Fu, G. C. *Angew. Chem., Int. Ed.* 1998, 37, 3387). To date, the compounds containing a biaryl linkage could be prepared under very mild conditions in very good yield with a wide range of substituents under the respective coupling conditions.

Oligomers and/or polymers containing triple decker units with biaryl linkages under Suzuki coupling conditions may be prepared. These kinds of polymers are expected to display interesting optical and/or electronic properties and thus find applications as functional materials. We have prepared various triple decker building blocks bearing aryl halide groups, while the stable nature of boronic acids (thermally, air and moisture stable) makes it feasible to prepare the corresponding triple decker building blocks bearing boronic acid groups. The triple decker monomers containing halides and boronic acid groups are thus treated under Suzuki coupling conditions to afford the desired molecular architecture.

Sonogashira coupling. The Sonogashira coupling of an ethyne and an aryl halide affords the corresponding ethyne-linked compound. The Sonogashira reaction can be performed using $Pd(PPh_3)_2Cl_2$ and CuI in dilute solution in toluene and triethylamine under mild temperatures (35° C.), or using $Pd_2(dba)_3$ with tri-o-tolylphosphine in toluene and triethylamine under mild temperatures (35° C.). Other amine-containing solvents can be employed as well.

Wittig reaction. The Wittig reaction involves the coupling of an alkyl halide and an aldehyde or ketone, generating an alkene. This is one of the most powerful methods of carbon-carbon bond formation and involves treatment of the alkyl halide with a phosphine (e.g., triphenylphosphine) followed by treatment with a strong base (e.g., n-butyl lithium) and reaction with the carbonyl compound.

Polymers of the present invention may be represented by Formula XX:

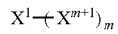

wherein:

m is at least 1 (e.g., 1, 2, or 3 to 10, 20, 50 or 100 or more); and $X^1$ through $X^{m+1}$ are sandwich coordination compounds (each of which may be the same or different).

Specific examples of polymers of Formula I are polymers of Formula XXI:

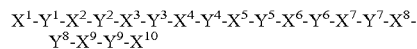

wherein:

$X^1$ through $X^{10}$ are each independently selected sandwich coordination compounds;

$Y^1$ through $Y^9$ are independently selected linking groups or linkers; and $X^3$ through $X^{10}$ (and $Y^3$ through $Y^9$) may each independently or consecutively be present or absent (e.g., to provide a polymer of anywhere from 2 to 10 sandwich coordination compounds)

Articles of manufacture of the present invention may be represented by Formula XXII:

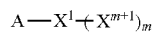

wherein:

A is a substrate (e.g., a conductor, a semiconductor, an insulator, or a composite thereof);

m is at least 1 (e.g., 1, 2, or 3 to 10, 20, 50 or 100 or more); and $X^1$ through $X^{m+1}$ are sandwich coordination compounds (each of which may be the same or different).

Specific examples of articles of manufacture of Formula XXII are articles of Formula XXIII:

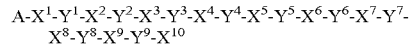

wherein:

A is a substrate (e.g., a conductor, a semiconductor, an insulator, or a composite thereof);

$X^1$ through $X^{10}$ are each independently selected sandwich coordination compounds;

$Y^1$ through $Y^9$ are independently selected linking groups or linkers; and $X^3$ through $X^{10}$ (and $Y^3$ through $Y^9$) may each independently or consecutively be present or absent (e.g., to provide a polymer of anywhere from 2 to 10 sandwich coordination compounds).

E. Memory Devices and Other Articles of Manufacture

Benzazoloporphyrazines of the invention are useful, among other things, for the production of polymers thereof which may be immobilized or coupled to a substrate and used as light harvesting rods, light harvesting arrays, and solar cells, as described for example in U.S. Pat. No. 6,407,330 to Lindsey et al. or U.S. Pat. No. 6,420,648 to Lindsey. Benzazoloporphyrazines are also useful immobilized to a substrate for making charge storage molecules and information storage devices containing the same. Such charge storage molecules and information storage devices are known and described in, for example, U.S. Pat. Nos. 6,208,553 to Gryko et al.; 6,381,169 to Bocian et al.; and 6,324,091 to Gryko et al. The compounds can be coupled to substrates to form molecular batteries, molecular capacitors and electrochromic displays as described in U.S. Pat. No. 6,777,516 to Li et al. The benzazoloporphyrazine may comprise a member of a sandwich coordination compound in the information storage molecule, such as described in U.S. Pat. No. 6,212,093 to Li et al., U.S. Pat. No. 6,451,942 to Li et al., or U.S. Pat. No. 6,777,516 to Li et al.

In one particular embodiment, this invention provides an apparatus for storing data (e.g., a "storage cell"). The storage cell includes a fixed electrode electrically coupled to a "storage medium" comprising a compound or polymer as described above, the polymer having a plurality of different and distinguishable oxidation states where data is stored in the (preferably non-neutral) oxidation states by the addition or withdrawal of one or more electrons from said storage medium via the electrically coupled electrode.

In preferred storage cells, the storage medium stores data at a density of at least one bit, and preferably at a density of at least 2 bits. Thus, preferred storage media have at least 2, and preferably at least 4, 8 or 10 or more different and distinguishable oxidation states. In particularly preferred embodiments, the bits are all stored in non-neutral oxidation states. In a most preferred embodiment, the different and distinguishable oxidation states of the storage medium can be set by a voltage difference no greater than about 5 volts, more preferably no greater than about 2 volts, and most preferably no greater than about 1 volt.

The storage medium is electrically coupled to the electrode(s) by any of a number of convenient methods including, but not limited to, covalent linkage (direct or through a linker), ionic linkage, non-ionic "bonding", simple juxtaposition/apposition of the storage medium to the electrode(s), or simple proximity to the electrode(s) such that electron tunneling between the medium and the electrode(s) can occur. The storage medium can contain or be juxtaposed to or layered with one or more dielectric material(s). Preferred dielectric materials are imbedded with counterions (e.g. Nafion® fluoropolymer). The storage cells of this invention are fully amenable to encapsulation (or other packaging) and can be provided in a number of forms including, but not limited to, an integrated circuit or as a component of an integrated circuit, a non-encapsulated "chip", etc. In some embodiments, the storage medium is electronically coupled to a second electrode that is a reference electrode. In certain preferred embodiments, the storage medium is present in a single plane in the device. The apparatus of this invention can include the storage medium present at a multiplicity of storage locations, and in certain configurations, each storage location and associated electrode(s) forms a separate storage cell. The storage medium may be present on a single plane in the device (in a two dimensional or sheet-like device) or on multiple planes in the device (in a three-dimensional device). Virtually any number (e.g., 16, 32, 64, 128, 512, 1024, 4096, etc.) of storage locations and storage cells can be provided in the device. Each storage location can be addressed by a single electrode or by two or more electrodes. In other embodiments, a single electrode can address multiple storage locations and/or multiple storage cells.

In preferred embodiments, one or more of the electrode(s) is connected to a voltage source (e.g. output of an integrated circuit, power supply, potentiostat, microprocessor (CPU), etc.) that can provide a voltage/signal for writing, reading, or refreshing the storage cell(s). One or more of the electrode(s) is preferably connected to a device (e.g., a voltammetric device, an amperometric device, a potentiometric device, etc.) to read the oxidation state of said storage medium. In particularly preferred embodiments, the device is a sinusoidal voltammeter. Various signal processing methods can be provided to facilitate readout in the time domain or in the frequency domain. Thus, in some embodiments, the readout device provides a Fourier transform (or other frequency analysis) of the output signal from said electrode. In certain preferred embodiments, the device refreshes the oxidation state of said storage medium after reading said oxidation state.

Particularly preferred methods and/or devices of this invention utilize a "fixed" electrode. Thus, in one embodiment, methods and/or devices in which the electrode(s) are moveable (e.g. one or more electrodes is a "recording head", the tip of a scanning tunneling microscope (STM), the tip of an atomic force microscope (AFM), or other forms in which the electrode is movable with respect to the storage medium) are excluded. Similarly in certain embodiments, methods and/or devices and/or storage media, in which the storage molecules are responsive to light and/or in which the oxidation state of a storage molecule is set by exposure to light are excluded.

In another embodiment, this invention provides an information storage medium. The information storage medium can be used to assemble storage cells and/or the various memory devices described herein. In a preferred embodiment the storage medium comprises one or more different storage molecules including a compound as described herein. When different species of storage molecule are present, the oxidation state(s) of each species is preferably different from and distinguishable from the oxidation state(s) of the other species of storage molecule comprising the storage medium.

This invention also provides methods of storing data. The methods involve i) providing an apparatus, e.g., comprising one or more storage cells as described herein; and ii) applying a voltage to the electrode at sufficient current to set an oxidation state of said storage medium (the storage medium comprising one or more storage cells). In preferred embodiments, the voltage range is less than about 5 volts, more preferably less than about 2 volts, and most preferably less than about 1 or less than about 0.5 volts. The voltage can be the output of any convenient voltage source (e.g. output of an integrated circuit, power supply, logic gate, potentiostat, microprocessor (CPU), etc.) that can provide a voltage/signal for writing, reading, or refreshing the storage cell(s).

The method can further involve detecting the oxidation state of the storage medium and thereby reading out the data stored therein. The detection (read) can optionally involve refreshing the oxidation state of the storage medium. The read (detecting) can involve analyzing a readout signal in the time or frequency domain and can thus involve performing a Fourier transform on the readout signal. The detection can be by any of a variety of methods including, but not limited to a voltammetric method.

This invention additionally provides the memory devices of this invention (e.g. memory cells) in a computer system. In addition computer systems utilizing the memory devices of this invention are provided. Preferred computer systems include a central processing unit, a display, a selector device, and a memory device comprising the storage devices (e.g. storage cells) of this invention.

The present invention is explained further in the following non-limiting Examples. As used herein, DBU=1,8-diazabicyclo[5.4.0]undec-7-ene; DBN=1,5-diazabicyclo[4.3.0]non-5-ene; and NMP=N-methylpyrrolidinone.

Examples 1-30

Synthesis of a trans-$A_2B_2$ Phthalocyanine Motif for the Preparation of Rod-Like Phthalocyanine Polymers The inherent geometry of phthalocyanines is an important consideration in approaches to linear phthalocyanine polymers. In FIG. 1, two possible ABAB phthalocyanines are shown, having 2,16- and 2,17-substitution patterns. The substituents of the 2,17 isomer are at a 120° angle with respect to each other, whereas those of the 2,16-isomer are parallel but not collinear. This is the result of the fact that each of the peripheral substituents shown in these structures is offset with respect to one of the central N—N axes by a 30° angle (see FIG. 1 for definition of the N—N axis). A polymer prepared from a mixture of these isomers could not be expected to afford a linear alignment. Even a polymer produced solely from the 2,17-isomer would be unlikely to hold a 180° alignment over long range due to rotation about the bonds between the phthalocyanines and their linkages.

A modification of the core pigment scaffold such that substituents are collinear with the N—N axes of the macrocycles should result in a monomer suitable for rod-like polymers. Such an architecture can be achieved with phthalocyanines bearing five-membered outer rings, either in place of the standard benzo rings, or by extra-annulation. Since a five-membered all-carbon ring would break the aromaticity of the macrocycle, the outermost ring must be heterocyclic. There are reported syntheses for phthalocyanines bearing diverse five-membered heterocyclic outer rings (Stuzhin, P. A.; Ercolani, C. In *The Porphyrin Handbook*, Kadish, K. M., Smith, K. M., Guilard, R., Eds., Academic Press: San Diego, 2003; Vol. 15, pp 263-364). Some are obtained by the use of heterocyclic building blocks, whereas others are achieved by peripheral modification of substituted phthalocyanines. Those that permit substitution at the outermost position include pyrrole, indole, imidazole, and thiophene. From this shortened list, the extra-annulated imidazole appeared the most accessible in terms of numbers and types of synthetic steps. Phthalocyanines bearing this motif have been previously termed imidazophthalocyanines, as well as benzimidazoloporphyrazines (Note that a tetrabenzoporphyrazine is synonymous with a phthalocyanine.) This report uses the term benzimidazoporphyrazines, a slight abbreviation of the previous moniker, and still unambiguous with respect to the motif.

These examples describe the synthesis of a linear, trans-substituted phthalocyanine analogue, based on the benzimidazoporphyrazine scaffold. The development of new synthetic methodology for benzimidazoporphyrazines (BzImPAs) is presented as a stepping-stone toward the desired trans-BzImPA(s). The structural properties and photochemical behavior have been compared with those of well-known phthalocyanines.

Synthesis. All of the published reports of benzimidazoporphyrazines have employed 5,6-dicyanobenzimidazoles as the key building blocks ((Pardo, C.; Yuste, M.; Elguero, J. *J. Porphyrins Phthalocyanines* 2000, 4, 505-509; (a) Kudrik, E. V.; Shaposhnikov, G. P. *Mendeleev Commun.* 1999, 85-86. (b) Kudrik, E. V.; Shaposhnikov, G. P.; Balakirev, A. E. *Russ. J. Gen. Chem.* 1999, 69, 1321-1324. (c) Balakirev, A. E.; Kudrik, E. V.; Shaposhnikov, G. P. *Russ. J. Gen. Chem.* 2002, 72, 1616-1619)). Kudrik and coworkers showed the utility of dicyanophenylenediamine 3 (Scheme 1) as a precursor to 2-alkyl-5,6-dicyanobenzimidazoles. Their synthesis of 3 required seven steps, with an overall yield of ~7% (see: (a) Zharnikova, M. A.; Balakirev, A. E.; Maizlish, V. E.; Kudrik, E. V.; Shaposhnikov, G. P. *Russ. J. Gen. Chem.* 1999, 69, 1870-1871. (b) Shishkina, O. V.; Maizlish, V. E.; Shaposhnikov, G. P.; Lyubimtsev, A. V.; Smirnov, R. P.; Baran'ski, A. *Russ. J. Gen. Chem.* 1997, 67, 842-845. (c) Elvidge, J. A.; Golden, J. H.; Linstead, R. P. *J. Chem. Soc.* 1957, 2466-2469; Levy, L. F.; Stephen, H. *J. Chem. Soc.* 1931, 79-82)).

The preparation of 3 by Mitzel and coworkers, with a 14% yield over four steps, is the best reported route to date (Mitzel, F.; Fitzgerald, S.; Beeby, A.; Faust, R. *Chem. Eur. J.* 2003, 9, 1233-1241; Cheeseman, G. W. H. *J. Chem. Soc.* 1962, 1170-1176; Acheson, R. M. *J. Chem. Soc.* 1956, 4731-4735; Elderfield, R. C.; Meyer, V. B. *J. Am. Chem. Soc.* 1954, 1887-1891; Mørkved, E. H.; Neset, S. M.; Bjørlo, O.; Kjøsen, H.; Hvistendahl, G.; Mo, F. *Acta Chem. Scand.* 1995, 49, 658-662). Scheme 1 shows a new synthesis of 3, with a 14% yield over three steps.

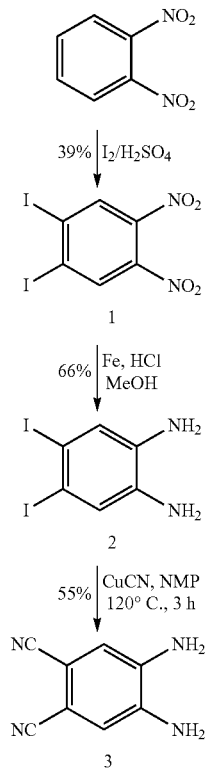

Scheme 1

The iodination of dinitrobenzene uses $I_3^+$, formed by mixture of iodine with oleum (Arotsky, J.; Butler, R.; Darby, A. C. *J.*

Chem. Soc. (C) 1970, 1480-1485). The reconstitution of $I_2$ as a product of the ensuing iodination reaction allows the $I_3^+$ intermediate to reform continuously, and thus makes atom-economic use of the halogen starting material. However, even this efficiency does not explain the original reported yield of 56% for diiodination when using only a half-equivalent of $I_2$. Attempts to repeat the reaction as reported consistently gave yields of 19-20%. The yield was improved to 39% by lowering the temperature of the reaction from 180° C. to 120° C., shortening the time to 75 min, and increasing the iodine to the stoichiometric requirement (1 equiv of $I_2$ for diiodination). The low yield of the reaction is compensated by its amenity to high scale (see Experimental Section). The reduction of 1 to the corresponding diamino compound 2 using Sn/HCl has been reported by Whitesides and coworkers, although no specific procedure or yield was provided (Schwiebert K. E.; Chin, D. N.; MacDonald, J. C.; Whitesides, G. M. J. Am. Chem. Soc. 1996, 118, 4018-4029). The use of Fe/HCl gave the compound in 66% yield and avoids the voluminous tin salts which are typical of Sn reductions. The diamine 2 complexes readily with the iron salts formed from the reaction, requiring treatment of the hot mixture with an aqueous solution of EDTA to recover the product. The cyanation of 2 proceeds at lower temperature (120 vs. 140° C.) more quickly (3 vs. 15 h) and in greater yield (55 vs. 25%) than for the corresponding dibromophenylenediamine (Mitzel, F.; Fitzgerald, S.; Beeby, A.; Faust, R. Chem. Eur. J. 2003, 9, 1233-1241). Complexation of the product with the copper salts left over at the end of the reaction is again avoided by treatment of the hot crude mixture with an aqueous solution of EDTA.

Dicyanobenzimidazoles have previously been prepared from 3 and carboxylic acids (Kudrik, E. V.; Shaposhnikov, G. P. Mendeleev Commun. 1999, 85-86; Kudrik, E. V.; Shaposhnikov, G. P.; Balakirev, A. E. Russ. J. Gen. Chem. 1999, 69, 1321-1324; Balakirev, A. E.; Kudrik, E. V.; Shaposhnikov, G. P. Russ. J. Gen. Chem. 2002, 72, 1616-1619). However, in these reports, the carboxylic acids have been of low molecular weight (e.g., formic to hexanoic acid) and were used neat, thereby serving as reagent, solvent, and Brönsted acid catalyst. In contrast, benzimidazole syntheses using substituted benzoic acids with o-phenylenediamine have typically employed strong hygroscopic acids such as conc. HCl and polyphosphoric acid as the solvent/catalyst (a) Kudrik, E. V.; Shaposhnikov, G. P. Mendeleev Commun. 1999, 85-86. (b) Kudrik, E. V.; Shaposhnikov, G. P.; Balakirev, A. E. Russ. J. Gen. Chem. 1999, 69, 1321-1324. (c) Balakirev, A. E.; Kudrik, E. V.; Shaposhnikov, G. P. Russ. J. Gen. Chem. 2002, 72, 1616-1619). The oxidative cyclization yielding benzimidazoles from phenylenediamines and aldehydes is a milder technique. Originally developed by Weidenhagen using $Cu(OAc)_2$ (Weidenhagen, R. Chem. Ber. 1936, 69, 2263-2272; Weidenhagen, R.; Weedon, U. Chem. Ber. 1938, 71, 2347-2360), this method has evolved in recent years to the more environmentally benign use of $O_2$, with $FeCl_3$ as a catalytic oxidant ((a) Weidenhagen, R. Chem. Ber. 1936, 69, 2263-2272; Weidenhagen, R.; Weedon, U. Chem. Ber. 1938, 71, 2347-2360; Singh, M. P.; Sasmal, S.; Lu, W.; Chatterjee, M. N. Synthesis 2000, 1380-1390). Scheme 2 shows the oxidative cyclizations using 3 and selected aldehydes 4a-d. Yields of 58% and 81% were obtained for benzimidazoles 5a and 5d, respectively. The reactions required longer times than those previously reported, perhaps due to the more electron-poor quality of 3 compared to o-phenylenediamine. Benzimidazole 5d was also prepared directly from 2, taking advantage of the copper salts left over from the cyanation reaction (Scheme 1), by adding aldehyde 4c and bubbling $O_2$ through the crude reaction mixture containing 3. This procedure was considerably faster than the $FeCl_3$ method, due to the large quantity of copper salts present, and gave 5d in 41% yield. It was however, not successful for 5a. Due to the poor solubility of compounds 5b and 5c, the cyclization reaction mixture was carried forward directly to alkylation at the 1-position, giving 6b and 6c.

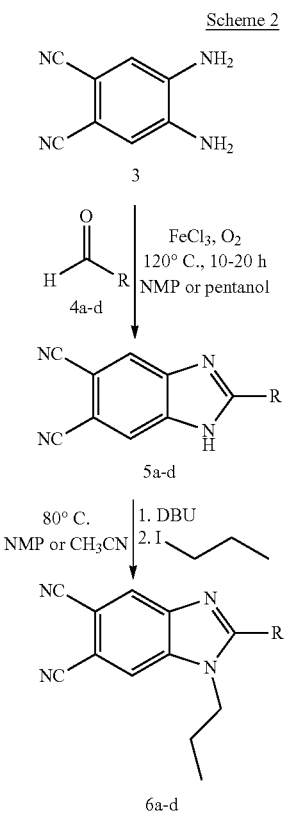

Scheme 2

Alkylation of the 1-position of these dicyanobenzimidazoles with the relatively small propyl group was predicated on the intent to use the resulting benzimidazoporphyrazines as components in materials where the macrocycles would be closely packed. Larger alkyl groups, although perhaps helpful for the solubility of the benzimidazoporphyrazines, would prohibit the close packing of the macrocycles. Benzimidazoles 5a and 5d proved unreactive to iodopropane in the absence of a base, even at elevated temperature. Deprotonation could be effected with DBU, and subsequent alkylation with iodopropane (bp 101° C.) succeeds at 80° C. in acetonitrile or NMP (N-methylpyrrolidinone). The initial yield of the alkylation reaction is low, but by using successive rounds of addition of the base and electrophile in the reaction, acceptable yields were obtained. The use of excess base did not raise the yield of the reaction. Propyl-dicyanobenzimidazoles 6a-d were obtained in 35-76% yield from diamine 3. The swallowtail benzimidazole 5a gave better results in the alkylation reaction (94%) compared to the 2-arylbenzimidazoles, suggesting some influence of the 2-substituent on the basicity/nucleophilicity of the benzimidazole.

The swallowtail- and phenyl-benzimidazoles 6a and 6b were chosen as benchmark motifs for 2-alkyl- and 2-aryl-5,6-benzimidazoporphyrazines, respectively. In principle, a wide variety of aldehyde-bearing groups can be installed at the 2-position. This versatility is limited by the stability of a given aldehyde-bearing group under the conditions of the oxidative cyclization and alkylation reactions. Groups that might interfere with or be affected by these two steps, such as ferrocenyl or pyridyl, can be transformed to dicyanobenzimidazoles by cross-coupling to the p-iodophenyl-benzimidazole 6c. The protected ethynylphenyl-benzimidazole 6d was prepared as a building block for trans-diethynyl-benzimidazoporphyrazines.

The previous reports of $A_4$-type benzimidazoporphyrazines report UV-Vis absorption spectra in DMF and sulfuric acid (Pardo, supra; Kudrik, supra, Balakirev, supra). Benzimidazoporphyrazines 7 and 8 (Scheme 3), as well as the corresponding zinc and magnesium chelates, were prepared to investigate the photochemical properties of these macrocycles ($\in$, $\lambda_{abs}$, $\lambda_{em}$, $\Phi_f$) in common organic solvents. This allows a comparison of the effects of the extra-annular imidazole ring with the corresponding benzo rings of naphthalocyanine (vide infra), without the complicating effects of low symmetry in the target trans-substituted macrocycle. The yields of the DBU-mediated reactions of 6a increase according to the presence and type of metal salt in the order Fb<Mg<Zn, in accord with known results for phthalocyanine formation using DBU with and without metal salts (Tomoda, H.; Saito, S.; Ogawa, S.; Shiraishi, S. *Chem. Lett.* 1980, 1277-1280; Tomoda, H.; Saito, S.; Shiraishi, S. *Chem. Lett.* 1983, 313-316). The corresponding reactions with 6b do show an improvement in the yields for the metallo-derivatives compared to the free base, but the DBU-mediated reaction was slightly better than that using lithium pentoxide, and the yields of Mg-8 and Zn-8 are within experimental variation. The $^1$H NMR spectrum of Fb-8 shows the usual evidence of the aromatic ring current, with the core protons found at −3.13 ppm, whereas in Fb-7 the core protons are found at 0.30-0.50 ppm. Whether this latter result is due to a steric or electronic effect is not known. The general structure shown in Scheme 3 depicts a macrocycle have $C_{4h}$ symmetry, but the $A_4$ benzimidazoporphyrazines can have up to four regioisomers resulting from the placement of the propyl groups. As a result, the $^1$H NMR spectra of the zinc and free base forms of 7 and 8 exhibited broad signals for most of the expected resonances. However, the $^1$H NMR signatures for Mg-7 and Mg-8 were far less complex, indicating a possibly monodisperse product. The effect of metal templating on the distribution of regioisomers in phthalocyanine-forming reactions has been previously detailed (Rager, C.; Schmid, G.; Hanack, M. *Chem.*

*Eur. J.* 1999, 5, 280-288). All of the $A_4$ benzimidazoporphyrazines are green in solid form as well as in solution.

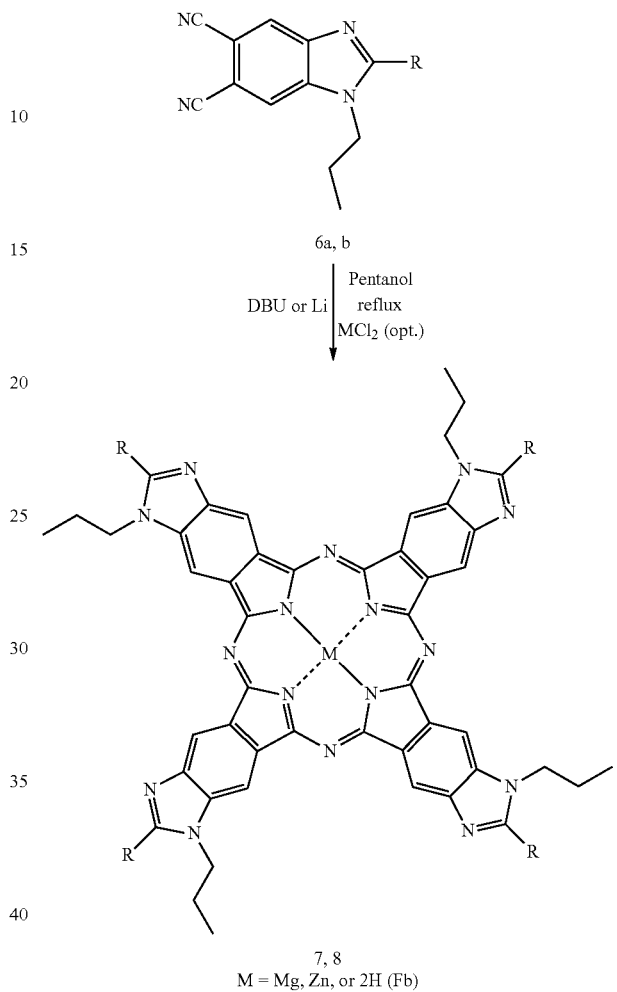

Initial attempts to prepare a trans-diethynyl-benzimidazoporphyrazine from macrocyclization of mixtures of dicyanobenzimidazoles were plagued by the inseparability of the resulting products. Analysis of the product mixture from the reaction of 6a and 6d (Scheme 4) by laser desorption mass spectrometry (LD-MS) indicated that all possible products had been formed, but no successful separation could be effected by either adsorption chromatography (silica or alumina) or size exclusion chromatography. The same circumstances were encountered for the reaction between 6d and diheptylphthalonitrile 10 (Scheme 4). The reaction of 6d with dicyanobenzene (Scheme 5) was more successful, allowing the separation of the smaller macrocyclic products ($A_4$, $A_3B$, and $A_2B_2$) from the larger ones ($AB_3$ and $B_4$) by size exclusion chromatography. The smaller macrocycles were then further separated by adsorption chromatography. The larger macrocycles were not isolated. Compound 6b appeared to be slightly more reactive than 1,2-dicyanobenzene, and a 1:1 ratio of the two reactants (respectively) gave a product mixture favoring the $AB_3$ and $B_4$ products. A corresponding ratio of 1:1.5 gave a more even mixture of the possible products. The recovered samples of the trans-diethynyl-benzimidazoporphyrazine Zn-13 and the cis-isomer Zn-12 displayed similar $^1$H NMR spectra, but were easily distinguished by their respective UV-Vis absorption spectra (vide infra). Zn-11 was easily separated in the initial size exclusion column. This compound is a blue solid, but takes on a blue-green color in solution. The $A_2B_2$ compounds are also blue solids, but appear green in solution.

Scheme 4

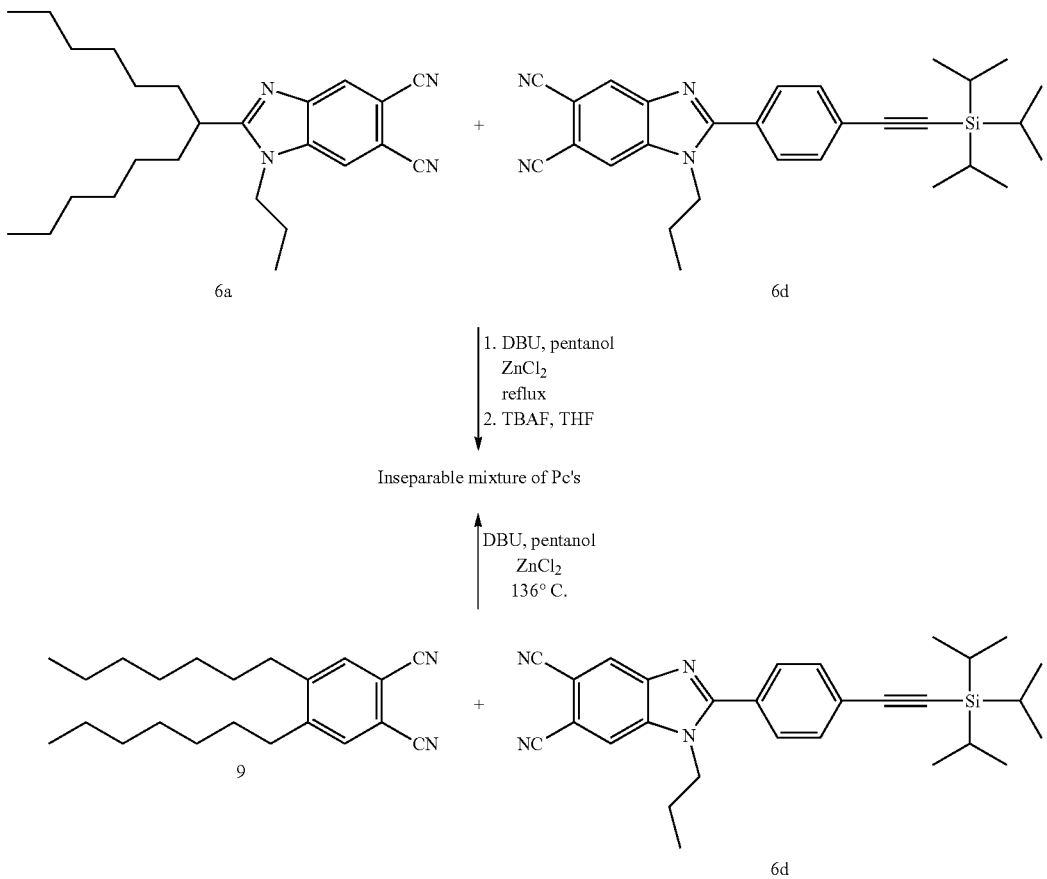

Scheme 5

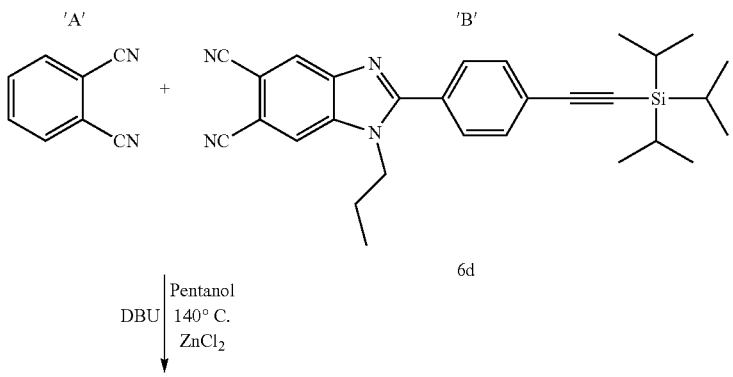

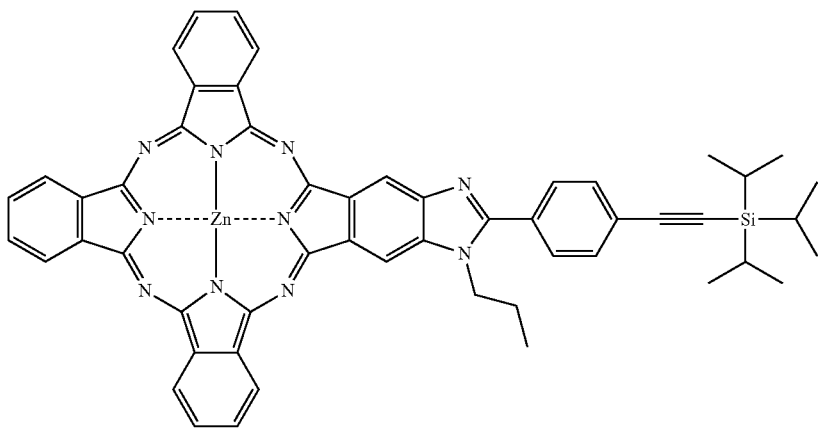

Zn-11 + other Pc's

| Pc | Compound | Yield |
| --- | --- | --- |
| A$_4$ | Zn-10 | 4% |
| A$_3$B | Zn-11 | 22% |
| A$_2$B$_2$-cis | Zn-12 | 14% |
| A$_2$B$_2$-trans | Zn-13 | 1% |

Dicyanobenzimidazole 6d was transformed into the corresponding diiminoisoindoline 14 in 76% yield using a well-known procedure (Scheme 6) (Brach, P. J.; Grammatica, S. J.; Ossanna, O. A.; Weinberger, L. *J. Heterocyc. Chem.* 1970, 7, 1403-1405). The product did not fully crystallize from the reaction as is usually reported, but the quantity of recovered solid could be amplified by concentrating the mixture using a stream of argon. The crystals obtained were greenish-white needles that turned deep green upon melting. The melted sample was recovered from the capillary and was found to exhibit a UV-Vis absorption profile analogous to that of Fb-8.

Scheme 6

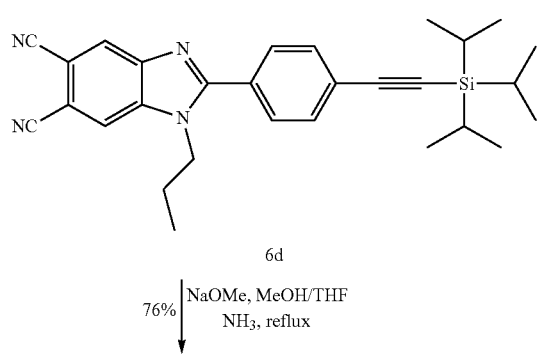

6d

76% | NaOMe, MeOH/THF
NH$_3$, reflux

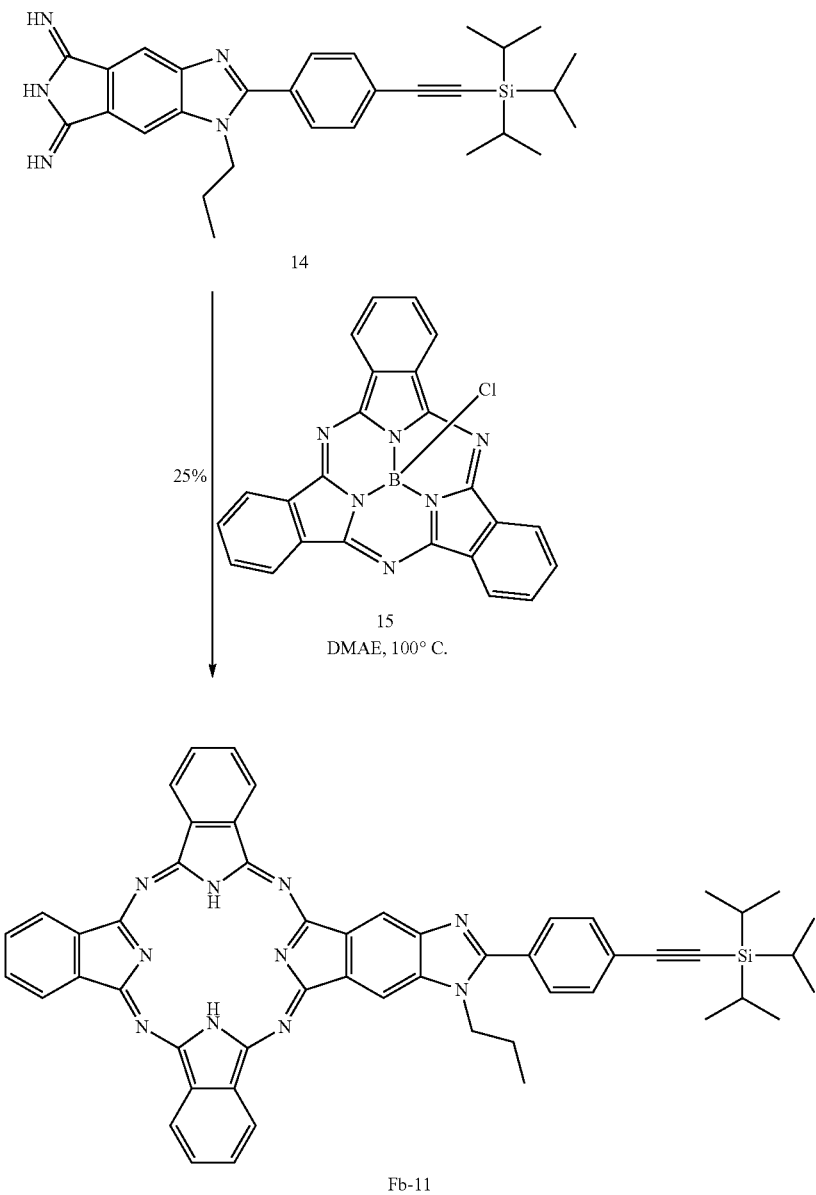

Diiminoisoindoline 14 was reacted with boron-subphthalocyanine (15) to prepare the $A_3B$ compound Fb-11 (Scheme 6). Due to the reactivity of 14, the subPc 15 had to be employed at four times the stoichiometric ratio in order to suppress the formation of products having more than one benzimidazole moiety. The reaction yield was highest when conducted at 100° C. Higher temperatures gave the product more quickly but in lower yield, whereas lower temperatures were ineffective. Fb-11 exhibits poor solubility, but is marginally more soluble than the large quantity of unsubstituted phthalocyanine that is also formed. The desired product could be largely separated from the unsubstituted phthalocyanine by Soxhlet extraction of the solid residue of the reaction using chloroform, followed by size-exclusion chromatography. Although the yield is modest (25%), the alternative route to Fb-11 would be the demetalation of Zn-11, which is not possible under mild conditions. (Zinc-porphyrins can be demetalated in the presence of TFA at room temperature, but this is ineffective for zinc phthalocyanines.) There is no published report of the demetalation of a zinc-phthalocyanine. Fb-11 was colored very similarly to Zn-11, blue in solid form and slightly more greenish blue in solution.

The trans-diethynyl-benzimidazoporphyrazine Fb-13 was prepared in 9% yield by cross-condensation of diiminoisoindoline 14 with trichloroisoindolenine 16 (Scheme 7), following the procedure reported by Young and Onyebuagu (Young, J. G.; Onyebuagu, W. *J. Org. Chem.* 1990, 55, 2155-2159) A trace quantity of an AB$_3$ byproduct was formed in the reaction, as previously observed (Stihler, P.; Hauschel, B.; Hanack, M. *Chem. Ber.* 1997, 130, 801-806). The yield of the trans-A$_2$B$_2$ product dropped to 4% when ZnCl$_2$ was used as a templating agent in the reaction. The compound Zn-13 was more accessible by metalation of Fb-13 using Zn(OAc)$_2$·2H$_2$O. There are two possible regioisomers of the trans-A$_2$B$_2$ structure, of C$_{2v}$ and C$_{2h}$ symmetries, owing to the position of the respective N$_{imidazo}$ substituents. For Fb-13 these regioisomers were not separable by chromatography on silica gel. The $^1$H NMR spectra of the isolated sample of Fb-13 had duplicate signals for each expected resonance, including the protons within the macrocycle. This result is similar to the NMR spectra for the free base and zinc metalated A$_4$ benzimidazoporphyrazines. Compound Fb-8 has a slightly broadened signal for the inner protons, but not the twinned peaks that are seen for Fb-13. Hanack and coworkers attributed the split appearance of the inner proton resonance to the different environments encountered by the NH protons in the tautomers of their trans-A$_2$B$_2$ structure (Stihler, P.; Hauschel, B.; Hanack, M. *Chem. Ber.* 1997, 130, 801-806). A variable temperature $^1$H NMR experiment in d$_8$-THF showed that the signals for the various duplicated resonances of Fb-13 did approach one another at high temperatures (up to 55° C.), but the signals never merged, and the usual broadening associated with exchange-equilibrium behavior was not observed. Given the rather low temperature limit of the solvent, this result is not conclusive as to the origin of the twinned resonances.

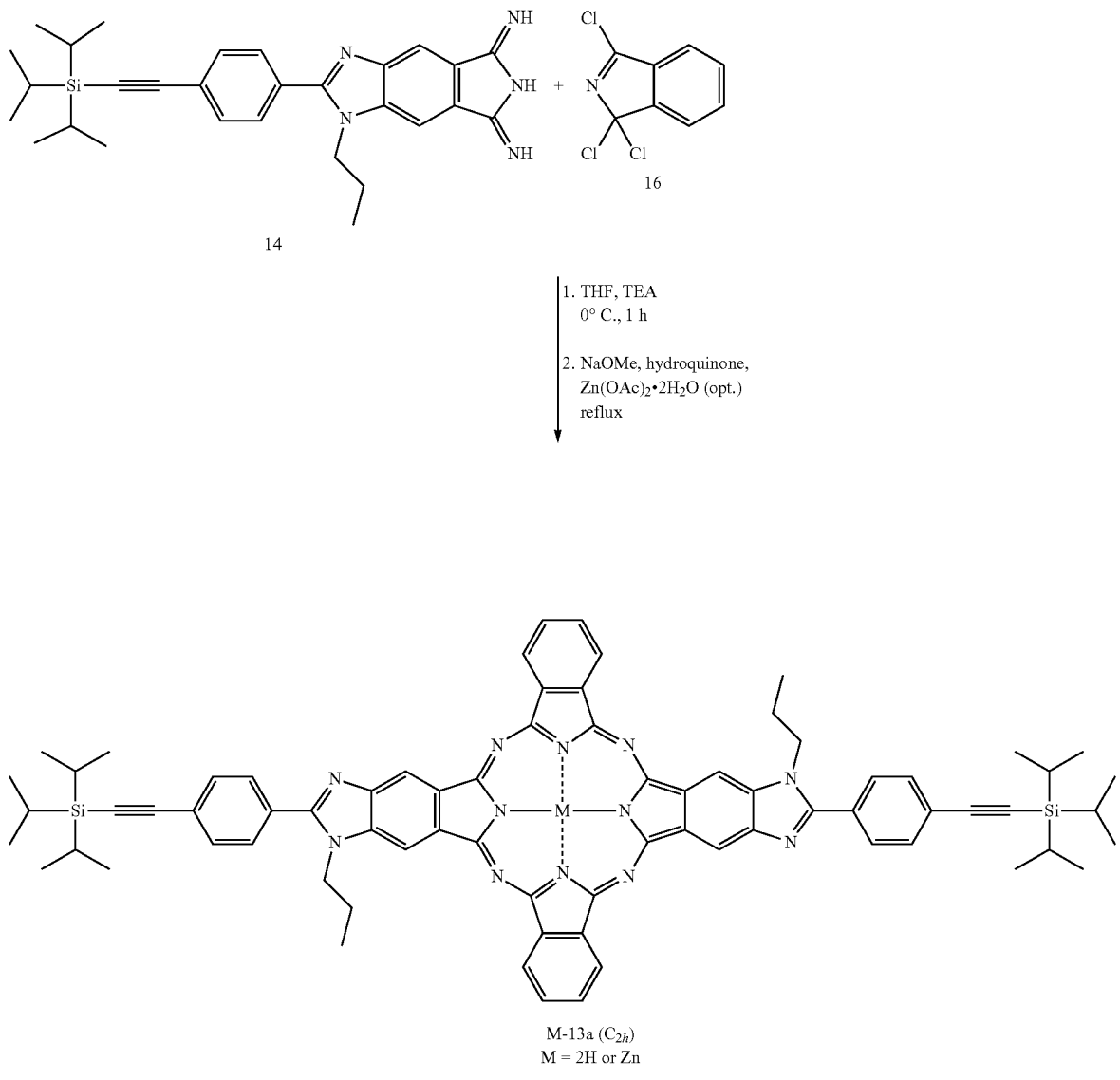

-continued

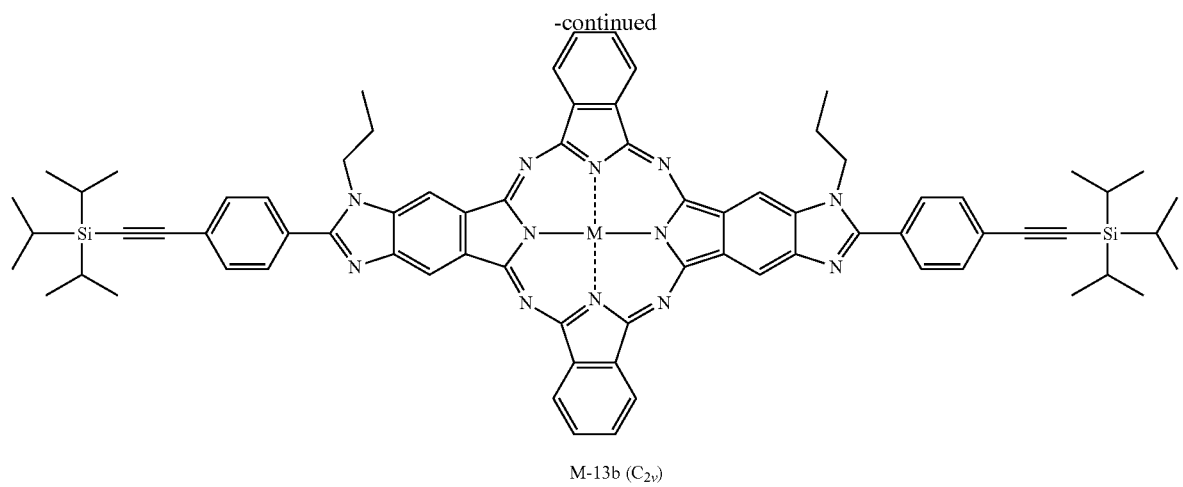

M-13b ($C_{2v}$)

| Compound | Yield |
|---|---|
| Fb-13 (a + b) | 9% |
| Zn-13 (a + b) | 4% |

Zn(OAc)$_2$·2H$_2$O, dioxane/DMF, reflux (90%)

The $^1$H NMR spectrum of a sample of Zn-13 having both regioisomers was far less complex than the corresponding signature of the free base compound. Only the aromatic region showed more complexity than would be expected for a monodisperse sample. Although this supports the hypothesis that the duplicate set of signals observed for Fb-13 is the result of tautomerism, the simplicity of the spectrum of Zn-13 can also be interpreted as the coincidental overlapping of several signatures. Fortunately, the regioisomers of Zn-13 were separable by chromatography on silica gel, and exhibited distinct patterns in the aromatic region of the $^1$H NMR spectrum, enabling assignment. The first eluting species, Zn-13a, exhibits an ABCD splitting pattern for the protons on the benzo rings, consistent with the assignment of $C_{2h}$ symmetry. The second eluting species, Zn-13b, shows multiplets that resemble typical AA'BB' splitting patterns, corresponding to the structure assigned to $C_{2v}$ symmetry. COSY NMR analyses were performed to confirm the coupling patterns that support these assignments of the regioisomers. As with the A$_2$B$_2$ products from the reaction of 6d with dicyanobenzene, all of the trans-A$_2$B$_2$ compounds were blue in solid form but deeply green in solution.

The deprotection of Zn-13a and Zn-13b proceeded smoothly using TBAF in dichloromethane, but the compounds proved to be surprisingly polar during chromatography (Scheme 8).

Scheme 8

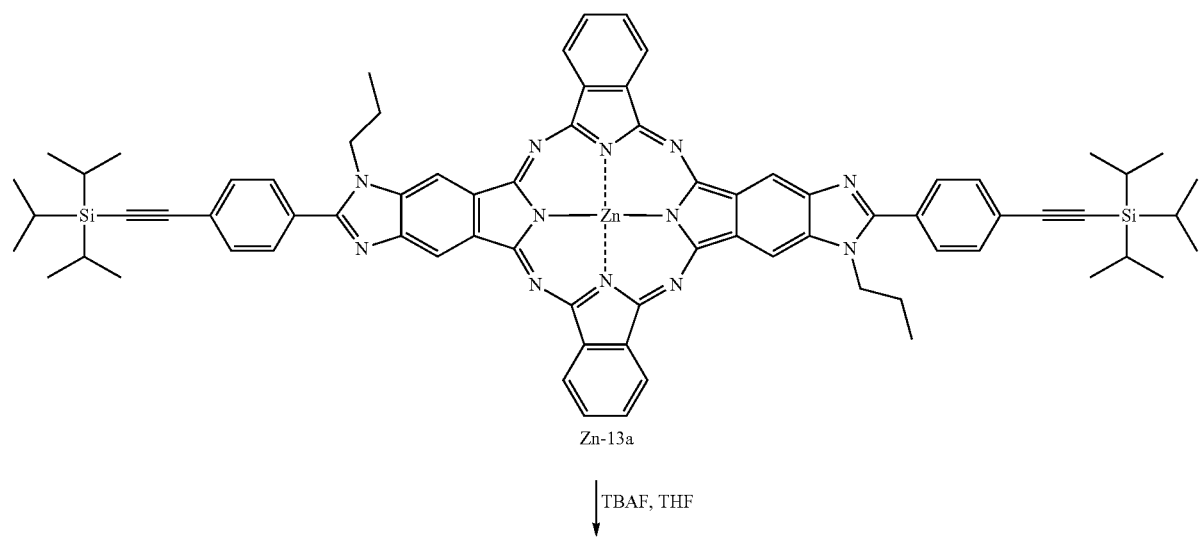

Zn-13a

TBAF, THF

-continued

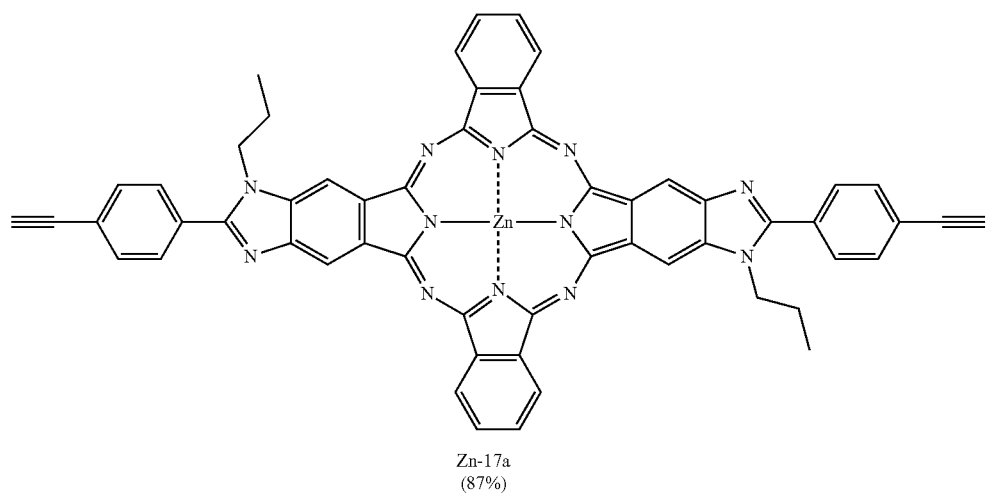

Zn-17a
(87%)

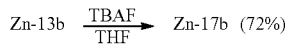 Zn-17b (72%)

Loss of the triisopropylsilyl groups also adversely affected the solubility of the resulting diethynyl compounds. Whereas Zn-13a/b are soluble in chlorinated solvents and very soluble in THF, the products Zn-17a/b slowly precipitated from the eluent upon exiting the chromatography column, and are then only weakly soluble in chlorinated solvents, and moderately soluble in THF. This low solubility makes the prospect of chemical (e.g., Pd mediated) polymerization of the diethynyl monomer more challenging. Other polymerization options exist, such as the thermal polymerization of diethynyl porphyrins (Liu, Z.; Schmidt, I.; Thamyongkit, P.; Loewe, R. S.; Syomin, D.; Diers, J. R.; Zhao, Q.; Misra, V.; Lindsey, J. S., Bocian, D. F. Chem. Mater. 2005, in press)

The procedures developed for this route typically gave moderate to low yields, but are each amenable to higher scale. The biggest losses are incurred at the initial synthesis of compound 1 and the cross-condensation synthesis of Fb-13. The quantities of the isolated diethynyl-trans-benzimidazoporphyrazines are small (<10 mg), but sufficient for their full characterization and testing in exploratory polymerizations.

Figure 2:
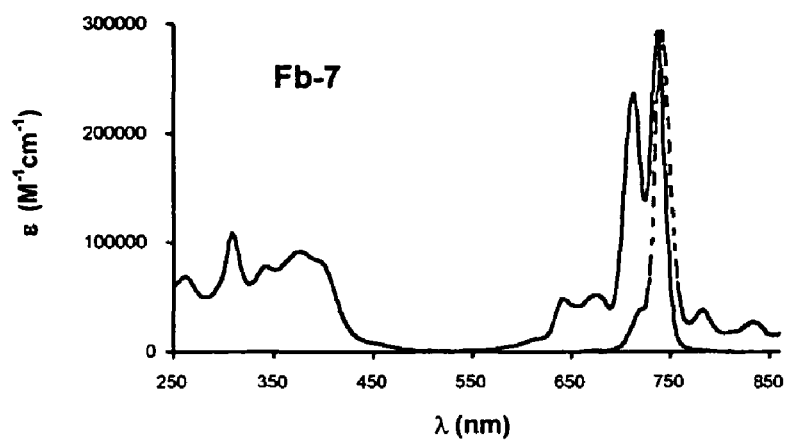
FIG. 2. Absorption and emission spectra for tetrasubstituted benzimidazo-porphyrazines.
Figure 2:
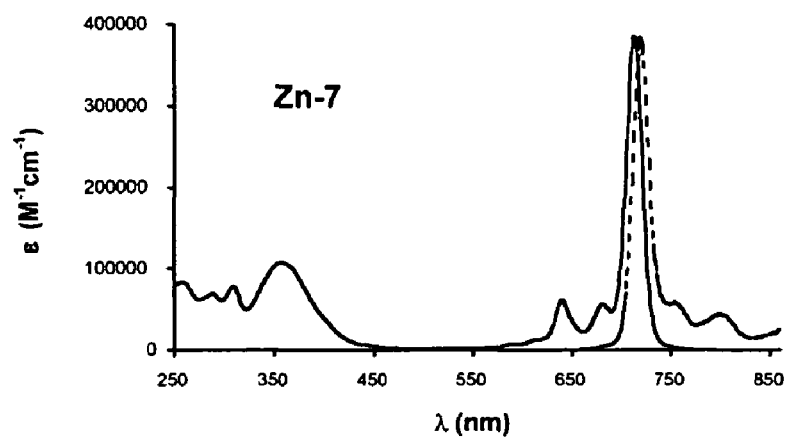
Figure 2:
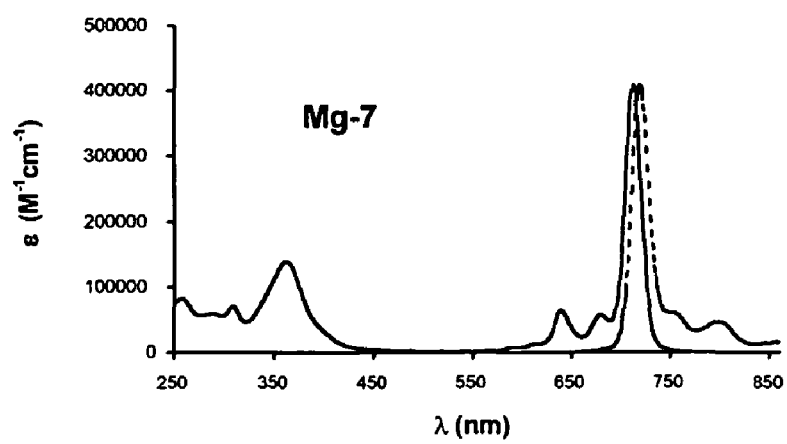

Photochemistry. The absorption and emission spectra of compounds Fb-7, Zn-7, and Mg-7 are shown in FIG. 2. The spectra for the phenyl-substituted M-8 series are closely matching to those of the alkyl series M-7, but are red-shifted by 2-4 nm (Table 1). The general appearance of the spectra is typical of phthalocyanines, with broad B bands in the 300-400 nm region, and sharper Q bands providing strong absorbance in the red/near-IR portion of the spectrum. Of all the benzimidazoporphyrazines in this study, only Fb-8 does not obey the Beer-Lambert law. For the others, no significant change is observed in the UV-Vis absorbance profile between solutions having maximal absorbance in the range 0.02-2.0 absorbance units. Fb-8 showed a 15% decrease in the ratio of the B band to the Q band between solutions at 0.02 and 2.0 absorbance units. The extinction coefficients are somewhat higher than the reported values for unsubstituted phthalocyanines and even the more soluble tetra-tert-butylphthalocyanines, but this may simply be an effect of the narrowness of the Q band maxima for the BzImPAs ((a) data for (t-Bu)$_4$H$_2$Pc and (t-Bu)$_4$MgPc: Teuchner, K.; Pfarrherr, A.; Stiel, H.; Freyer, W.; Leupold, D. Photochem. Photobiol. 1993, 57, 465-471. (b) additional data for (t-Bu)$_4$MgPc: Freyer, W.; Dähne, S.; Minh, L. Q.; Teuchner, K. Z. Chem. 1986, 26, 334-336. (c) data for (t-Bu)$_4$ZnPc: Tran-Thi, T.-H.; Desforge, C.; Thiec, C.; Gaspard, S. J. Phys. Chem. 1989, 93, 1226-1233).

The Q bands of the A$_4$ BzImPAs are red-shifted by ~35-50 nm compared to the corresponding free base or metallophthalocyanines. The Q band maxima for various phthalocyanine species in THF are as follows: zinc phthalocyanine (ZnPc, 665 nm),[45] Zn-7 (713 nm), and zinc naphthalocyanine (ZnNc, 756 nm)(Kobayashi, N.; Mack, J.; Ishii, K.; Stillman, M. J. Inorg. Chem. 2002, 41, 5350-5363). Thus, the difference between the excited-state energy gap of ZnPc and ZnNc is 1820 cm$^{-1}$; the excited-state energy gap of Zn-7 is 1015 cm$^{-1}$ greater than that of ZnPc, and 805 cm$^{-1}$ less than that of ZnNc. This is not surprising given the relative extent of π-conjugation in each species: ZnPc has a total of 42 π electrons, spread over 36 nuclei, while ZnNc has 54 π electrons that are spread out over 48 nuclei; the π-system of Zn-7 has the same number of electrons as ZnNc, but four fewer nuclei. This translates to four fewer molecular orbitals via the LCAO formalism, and explains why the BzImPAs are blue-shifted compared to naphthalocyanines. Another distinction of the imidazole annulation is that the moderate red-shift of the phthalocyanine electronic transitions comes without any sacrifice in the fluorescence quantum yield. Whereas the $\Phi_f$ of ZnNc (0.13) is reduced from that of ZnPc (0.32), the $\Phi_f$ of Zn-7 is higher (0.47).

Figure 3:
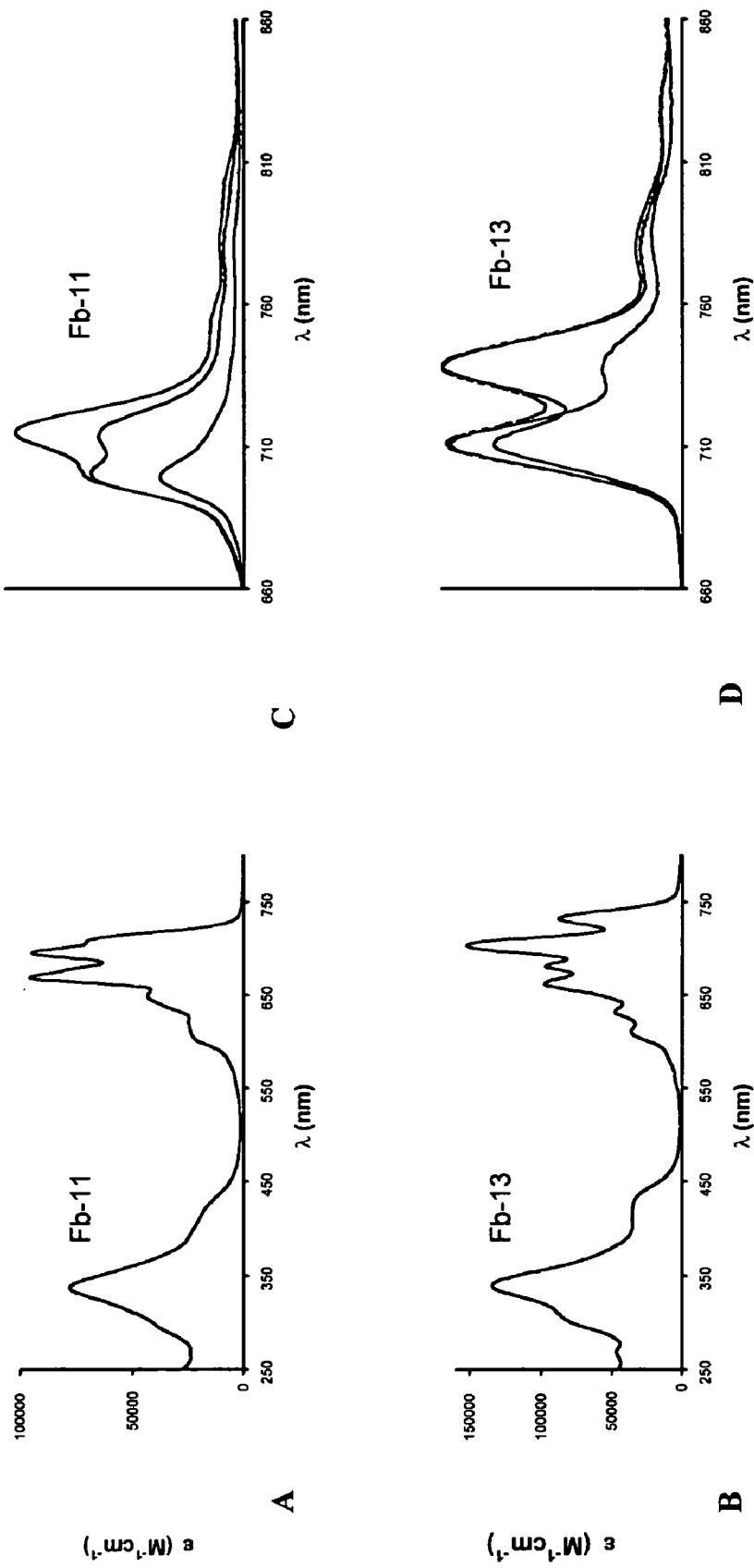
FIG. 3. (A) Absorption spectra for Fb-11. (B) Absorption spectra for Fb-13. (C) Emission spectra for Fb-11 (excitation at 435, 600, and 630 nm). (D) Emission spectra for Fb-13 (excitation at 435, 630, and 640 nm).
Figure 4:
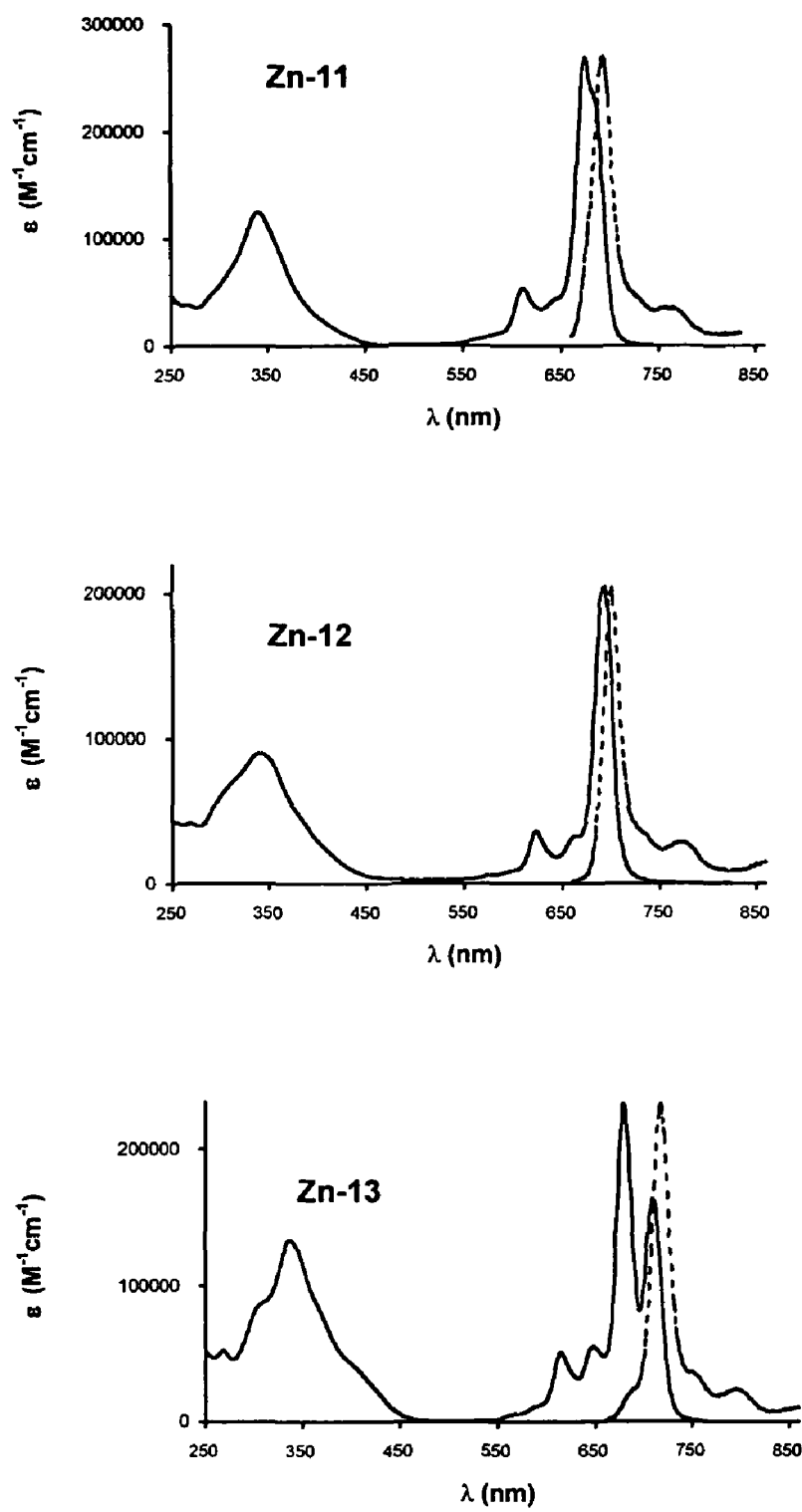
FIG. 4. Absorption and emission spectra for low symmetry zinc-benzimidazo-porphyrazines.

The lower symmetry of free base macrocycles Fb-11 (A$_3$B) and Fb-13 (trans-A$_2$B$_2$) results in very different behavior from the A$_4$ BzImPAs. FIG. 3 shows the absorption and emission profiles of the A$_3$B and trans-A$_2$B$_2$ compounds. The Q band maxima are more complex, the Q band intensity is dropped to roughly the same as the B band, and the fluorescence behavior shows dependence on the wavelength of excitation. The altered Q/B ratio is not the result of aggregation, as no difference was observed in the absorption profile between solutions having maximal absorptions of 0.02 and 2.0 absorbance units (a 100-fold change in concentration).

TABLE 1

Photochemical data for benzimidazoporphyrazines.

| Compound | B band $\lambda_{abs}$ (nm) [$\epsilon_{Log\ 10}$] | Q bands $\lambda_{abs}$ (nm) [$\epsilon_{Log\ 10}$] | Q/B$^a$ | $\lambda_{em}$ (nm) | $\Phi_f^b$ |
|---|---|---|---|---|---|
| Fb-7 | 376 [4.96] | 713 [5.37], 738 [5.47] | 3.2 | 742 | 0.59 |
| Fb-8 | 382 [4.96] | 718 [5.31], 740 [5.38] | 2.6 | 744 | 0.70 |
| Fb-11 | 337 [4.89] | 669 [4.98], 695 [4.98] | 1.2 | 700, 714$^c$ | 0.68 |
| Fb-13 | 340 [5.13] | 662 [4.99], 681 [4.99] 703 [5.18], 732 [4.94] | 1.1 | 711, 739$^c$ | 0.66 |
| Zn-7 | 357 [5.03] | 713 [5.58] | 3.6 | 720 | 0.47 |
| Zn-8 | 357 [5.08] | 717 [5.59] | 3.2 | 724 | 0.43 |
| Zn-11 | 340 [5.10] | 674 [5.43] | 2.2 | 692 | 0.47 |
| Zn-12 | 340 [4.95] | 693 [5.31] | 2.3 | 701 | 0.44 |
| Zn-13a | 338 [5.12] | 679 [5.37], 709 [5.21] | 1.75 | 717 | 0.32 |
| Zn-13b | 338 [5.11] | 679 [5.36], 709 [5.19] | 1.78 | 717 | 0.26 |
| Mg-7 | 363 [5.14] | 713 [5.61] | 3.0 | 720 | 0.69 |
| Mg-8 | 364 [5.12] | 717 [5.53] | 2.6 | 724 | 0.84 |

$^a$Ratios of intensities were calculated from absorbance data. Q value was chosen from the most intense Q band for a given compound.
$^b$The method for quantum yield determination is described in the Experimental Section.
$^c$The fluorescence profile of the sample was dependent upon the wavelength of excitation.

There are two transition dipole moments, one along the short axis of the molecule and one along the long axis of the molecule. In addition, for the free base $A_3B$ and trans-$A_2B_2$ BzImPAs, tautomerism of the inner NH protons can result in either N—N or NH—NH along the short axis, and NH—NH or N—N along the long axis. (By contrast, the standard free base phthalocyanine system also two distinct transition dipole moments owing to the N—N and NH—NH axes. The two transition dipole moments, normally labeled as $Q_x$ and $Q_y$, respectively, give rise to the two sets of peaks normally observed.) For the free base $A_3B$ and trans-$A_2B_2$ BzImPAs, the tautomerism of the core protons may give result in two photochemically distinct species, as the $Q_x$ and $Q_y$ dipoles will each give rise to distinct electronic transitions depending on their placement on the short or elongated axis of the macrocycle.

This hypothesis is supported by the fluorescence behavior of Fb-11 and Fb-13: each compound appears to have two strong fluorescence maxima and more than two accompanying vibronic bands at longer wavelengths. The two tautomers of a given low symmetry free base macrocycle may each be responsible for one emission maximum and accompanying vibronic bands. Thus the complex absorption profiles are not indicative of a single set of electronic transitions, but rather are each an overlay of the bands due to two photochemically distinct species. If these complex absorption and emission profiles were indeed the result of individual photochemical species, then the compounds would be in violation of Kasha's rule, which states that excited chromophores must always pass through the same lowest singlet excited state before returning to the ground state.

The zinc chelates Zn-11, Zn-12, and Zn-13, each show a single emission maximum. For Zn-12 (cis-$A_2B_2$ architecture) this is no surprise, as the two axes of the phthalocyanine are identical with respect to their extent of annulation. Zn-13 (trans-$A_2B_2$) shows the type of double Q band manifold normally expected for a free base BzImPA, due to the pronounced difference in the length of the two axes. Zn-11 has a tall shoulder on the longer wavelength side of the band, and may have two distinct transition dipole moments as in Zn-13, but the two dipole moments may overlap so extensively as to appear to be one band. The two regioisomers of Zn-13, of $C_{2h}$ and $C_2$, symmetry, show almost identical spectra. The extinction coefficients of Zn-13b are minutely smaller than those of Zn-13a, and the ratio of the intensity of the two Q bands to one another in Zn-13a is slightly lower (3%) than the corresponding ratio of Q bands in Zn-13b. The fluorescence quantum yields are slightly different, but both are still in an acceptable range for zinc phthalocyanine-type compounds. These two diethynyl constructs are essentially equivalent and their deprotected derivatives Zn-17a and Zn-17b should be of equal utility as polymerizable extra-annulated phthalocyanines.

General. $^1$H (400 MHz) and $^{13}$C (75 MHz) NMR spectra were obtained in $CDCl_3$ unless noted otherwise. Silica gel (Scientific Adsorbents, 40 µm average particle size) was used for column chromatography. Anhydrous $CH_2Cl_2$ was purchased from Aldrich. Aldehydes 4b and 4c were purchased from Aldrich and used as received. All other chemicals were reagent grade and were used as received. Benzimidazoles 5b and 5c were not isolated but were carried forward to the corresponding products 6b and 6c. Photochemical data were measured using THF as solvent. Fluorescence quantum yields were measured by comparison to tetra-tert-butylphthalocyanine, which was itself measured in both THF and $CHCl_3$ set at $\Phi_f$=0.70 in THF (by comparison to the reported $\Phi_f$ of 0.77 for tetra-tert-butylphthalocyanine in $CHCl_3$ with correction for the indices of refraction of the different samples).

Example 1

Noncommercial Compounds: Compounds 4a (Kato, M.; Komoda, K.; Namera, A.; Sakai, Y.; Okada, S.; Yamada, A.; Yokoyama, K.; Migita, E.; Minobe, Y.; Tani, T. *Chem. Pharm. Bull.* 1997, 45, 1767-1776), 4d (Rao, P. D.; Dhanalekshmi, S.; Littler, B. J.; Lindsey, J. S. *J. Org. Chem.* 2000, 65, 7323-7344), 9 (Nishi, H.; Azuma, N.; Kitahara, K. *J. Heterocyclic Chem.* 1992, 29, 475-477; Hanack, M.; Haisch, P.; Lehmann, H.; Subramanian, L. R. *Synthesis* 1993, 387-390), 15 (Claessens C. G.; Gonzalez-Rodriguez D.; del Rey B.; Torres T.; Mark G.; Schuchmann H. P.; von Sonntag C.; MacDonald J. G.; Nohr R. S. Eur. *J. Org. Chem.* 2003, 14, 2547-2551), and 16 (Farbenfabriken Bayer, U.S. Pat. No. 2,701,252; Feb. 1, 1955) were prepared according to the literature.

Example 2

1,2-Diiodo-4,5-dinitrobenzene (1). A three-necked 100 mL round-bottom flask was charged with oleum (38 mL of a 20% solution, 0.18 mol $SO_3$), and a magnetic stirring bar. The flask was fitted with a condenser and a bubbler and the spare necks were closed with glass stoppers. The flask was placed in an oil bath heated to 120° C. Iodine (6.86 g, 27.0 mmol) was added to the flask. After 20 min, o-dinitrobenzene (4.54 g, 27.0 mmol) was added to the reaction vessel, and the reaction was heated for 75 min, and then removed from heat and immediately poured into a 1 L conical flask filled with ice. The crude mixture was quenched with NaOH pellets until it was slightly alkaline to pH paper, with more ice added to keep the mixture cold. The mixture was then filtered through filter paper and the filtrate was extracted with $CHCl_3$. The organic layer of the extraction was washed with aqueous $Na_2S_2O_5$, water, and brine, dried over $Na_2SO_4$, filtered, and concentrated to dryness. The dark brown filter cake was stirred with 200 mL of hot water to which $Na_2S_2O_5$ was added until no further bubbling was observed. The mixture was then filtered and the filtrate was discarded. The filter cake and the residue from the extraction were recrystallized (EtOH/water) yielding dark brown crystals (4.47 g, 39%): mp 183-184° C.; $^1$H NMR δ 8.31 (s, 2H); $^{13}$C NMR δ 114.6, 134.8; Anal. Calcd for $C_6H_2I_2N_2O_4$: C, 17.16; H, 0.48; N, 6.67. Found: C, 17.44; H, 0.41, 6.61.

Scale-up: The above procedure was followed with the following quantities of reagents: oleum (200 mL), iodine (37.80 g), o-dinitrobenzene (25.0 g). To quench the large volume of $SO_2$ produced by the reaction, the evolved gas was bubbled through a solution of aqueous NaOH (5 M, 1 L), which was later used to quench the acidic crude reaction mixture over ice, along with an additional 125 g of NaOH, followed by $Na_2S_2O_5$ (18.5 g). The $CHCl_3$ extraction of the initial crude filtrate was omitted. Yield: 32%. Characterization data were consistent with the smaller scale reaction.

Example 3

1,2-Diamino-4,5-diiodobenzene (2). Following a literature procedure, a sample of 1 (17.42 g, 41.5 mmol) and a magnetic stirring bar were added to a 500 mL conical flask fitted with a jacketed condenser. EtOH (95%, 150 mL) and conc. aqueous HCl (68.6 mL, 0.83 mol) were added, and the mixture was stirred and heated to boiling. Fe (18.59 g, 0.332 mol) was added in portions, resulting in foaming of the mixture and accelerated refluxing of the EtOH, which would subside within a few minutes of each addition. The reaction was heated for an additional 45 min beyond the final addition of Fe. A hot solution of EDTA (156 g, 0.411 mol, in 300 mL $H_2O$) was added to the reaction mixture, and KOH pellets were added until the solution was alkaline to pH paper. The hot mixture was extracted twice with ethyl acetate and the extracts were combined, washed with water, followed by brine, dried over $Na_2SO_4$, filtered and concentrated to dryness. The residue was recrystallized (EtOH/water), giving tan needles (9.92 g, 66%): mp 135-136° C.; $^1$H NMR ($d_8$-THF) δ 4.21 (brs, 4H), 7.03 (s, 2H); $^{13}$C NMR ($d_8$-THF) δ 91.1, 124.5, 137.6; Anal. Calcd for $C_6H_6I_2N_2$: C, 20.02; H, 1.68; N, 7.78. Found: C, 20.19; H, 1.59, 7.71.

Example 4

1,2-Diamino-4,5-dicyanobenzene (3). A 50 mL round-bottom flask was charged with 2 (6.94 g, 19.3 mmol), and CuCN (6.91 g, 77.2 mmol, 4 eq), and a magnetic stirring bar. The vessel was capped with a septum and flushed with Ar for 10 min, and NMP (20 mL) was added. The vessel was heated to 120° C. for 3 h, then diluted with DMF (20 mL) and added to a hot aqueous solution of EDTA (88 g, 232 mmol, in 500 mL $H_2O$) in a 1 L conical flask. Oxygen was bubbled through the mixture as it was stirred and heated for 2 h. After 2 h of this treatment, the dark heterogeneous mixture turned to a homogeneous green solution. The hot green solution was extracted twice with ethyl acetate, and the extracts were washed with water, followed by brine, dried over $Na_2SO_4$, filtered, and concentrated to dryness. The residue was recrystallized (EtOH/water), giving tiny tan needles (1.66 g, 55%): mp 262-264° C.; NMR ($d_6$-acetone) δ 5.40 (br s, 4H), 7.04 (s, 2H); $^{13}$C NMR ($d_6$-acetone) δ 103.8, 117.1, 117.4, 139.4; FAB-MS obsd 158.0591, calcd 158.0592 ($C_6H_6N_4$).

Example 5

5,6-Dicyano-2-(undec-7-yl)benzimidazole (5a). A 100 mL round-bottom flask was charged with 3 (1.32 g, 8.37 mmol), pentanol (42 mL), 2-hexyl-1-octanal (1.77 g, 8.37 mmol), and a magnetic stirring bar. The flask was fitted with a Hickman still and placed in an oil bath heated to 120° C. NMP (4.0 mL) was added to fully dissolve the solid material. The mixture was heated and stirred for 2 h. Then $FeCl_3.6H_2O$ (113 mg, 0.42 mmol) was added to the reaction vessel and oxygen was bubbled through the mixture as it was heated and stirred for an additional 12 h. The reaction mixture was then removed from heat and added to 200 mL diethyl ether. The ether solution was washed three times with water, then washed with brine, dried over $Na_2SO_4$, filtered, and concentrated to dryness. The residue was chromatographed (silica, $CHCl_3$), yielding a tan solid (2.37 g, 81%): $^1$H NMR δ 0.82 (t, J=7.6 Hz, 6H), 1.10-1.30 (m, 16H), 1.77-1.87 (m, 2H), 2.90-3.04 (m, 1H), 8.07 (br s, 2H), 10.36 (br s, 1H); $^{13}$C NMR δ 14.2, 22.8, 27.7, 29.4, 31.8, 34.9, 41.3, 108.4, 117.0, 165.3; FAB-MS obsd 351.2551, calcd 351.2549 ($C_{22}H_{30}N_4$).

Example 6

5,6-Dicyano-2-(4-(triisopropylsilylethynyl)phenyl)benzimidazole (5d). A 25 mL round-bottom flask was charged with 3 (468 mg, 2.96 mmol), NMP (15 mL), 4d (847 mg, 2.96 mmol), and a magnetic stirring bar. The flask was fitted with a Hickman still, placed in an oil bath heated to 120° C., and stirred for 1 h. Then $FeCl_3.6H_2O$ (296 µL of a 100 mM solution, 30 µmol) was added to the reaction vessel and oxygen was bubbled through the mixture as it was heated and stirred for an additional 20 h. The reaction mixture was then removed from heat and added to ethyl acetate. The ethyl acetate solution was washed three times with water, then washed with brine, dried over $Na_2SO_4$, filtered, and concentrated to dryness. The residue was chromatographed (silica, $CHCl_3$, 2% ethyl acetate), yielding a colorless solid (732 mg, 58%). mp 347-348° C.; $^1$H NMR ($d_6$-acetone) δ 1.15-1.18 (m, 21H), 7.05 (d, J=8.4 Hz, 2H), 8.24-8.28 (m, 4H); $^{13}$C NMR ($d_6$-acetone) δ 11.5, 18.5, 93.5, 106.7, 108.4, 116.7, 118.4, 122.1 (br), 126.3, 127.6, 128.7, 132.7, 142.0 (br), 156.4; FAB-MS obsd 425.2161, calcd 425.2083 [(M+H), M=$C_{26}H_{28}N_4Si$].

Example 7

Synthesis of 5d directly from 2: A 2-necked 25 mL flask was charged with 2 (577 mg, 1.60 mmol), CuCN (573 mg, 6.40 mmol), and NMP (2 mL). The vessel was fitted with a bubbler and the sidearm was capped with a septum. The mixture was heated at 120° C. for 2 h, and then more NMP (8 mL) and 4d (458 mg, 1.60 mmol) were added and $O_2$ was bubbled through the mixture. After 40 min, TLC (silica, $CHCl_3$, 4% isopropanol) showed the desired product and no remaining 3 or 4d, so the mixture was transferred to a 500 mL conical flask containing a hot solution of aqueous EDTA (4.87 g, 12.8 mmol, in 200 mL) and the mixture was heated and stirred for 30 min, and then filtered. The filter cake was dried in vacuo and chromatographed (silica, $CH_2Cl_2$, 2% ethyl acetate), giving a colorless solid (280 mg, 41%). Characterization data were identical with the preparation from 3 above.

Example 8

5,6-Dicyano-1-propyl-2-(undec-7-yl)benzimidazole (6a). A 10 mL round-bottom flask was charged with 5a (743 mg, 2.12 mmol), and $CH_3CN$ (2.0 mL). The flask was capped with a septum and placed in an oil bath heated to 80° C. DBU (317 µL, 2.12 mmol) was added, and the mixture was stirred for 2 min. Then iodopropane (207 µL, 2.12 mmol) was added and the mixture was stirred for 20 min. A second dose of DBU (317 µL, 2.12 mmol), followed by iodopropane (207 µL, 2.12 mmol), was added, and 20 min later, a third identical round of DBU and iodopropane was again added. HPLC analysis of the reaction mixture (C-18 reverse phase, $CH_3CN$ as isocratic eluent) indicated that the yields of the reaction after the first, second, and third round of reagents were 60%, 78%, and 97%, respectively. After the third round of reagents was added and the mixture was stirred for 20 min, the reaction mixture was removed from heat and added to 200 mL diethyl ether. The ether solution was washed three times with water, then washed with brine, dried over $Na_2SO_4$, filtered, and concentrated to dryness. The residue was chromatographed (silica, hexanes/ethyl acetate 7:1, then hexanes/ethyl acetate 6:1), yielding a tan solid (786 mg, 94%): mp 52-53° C.; $^1$H NMR δ 0.81 (t, J=6.8 Hz, 6H), 1.02 (t, J=7.2 Hz, 3H), 1.05-1.13 (m, 16H), 1.72-1.82 (m, 6H), 2.88-2.98 (m, 1H), 4.15 (t, J=7.6 Hz, 2H); $^{13}$C NMR δ 11.6, 14.2, 14.2, 22.8, 23.8, 27.8, 29.5, 31.8, 35.2, 38.3, 45.9, 107.8, 108.4, 116.2, 116.9, 117.0, 125.8, 137.0, 145.3, 165.5; Anal. Calcd for $C_{25}H_{36}N_4$: C, 76.49; H, 9.24; N, 14.27. Found: C, 17.38; H, 9.36; N, 14.18.

Example 9

5,6-Dicyano-2-phenyl-1-propylbenzimidazole (6b). A 25 mL round-bottom flask was charged with 3 (316 mg, 2.00 mmol), NMP (10 mL), benzaldehyde, (202 μL, 2.00 mmol), and a magnetic stirring bar. The flask was fitted with a Hickman still, placed in an oil bath heated to 120° C., and stirred for 1 h. Then $FeCl_3 \cdot 6H_2O$ (27 mg, 0.10 mmol) was added to the reaction vessel and oxygen was bubbled through the mixture as it was heated and stirred for an additional 20 h. The reaction mixture was then removed from heat and added to ethyl acetate. The ethyl acetate solution was washed three times with water, then washed with brine, dried over $Na_2SO_4$, filtered, and concentrated to dryness. The residue (458 mg, 1.88 mmol) was dissolved in NMP (2 mL) and heated to 80° C. Then DBU (280 μL, 1.88 μmol) was added and the mixture was stirred for 2 min, and iodopropane (183 μL, 1.88 mmol) was added. After 20 min, the mixture was treated with a second round of DBU and iodopropane, and after an additional 20 min, a third round of reagents was added. After a final 20 min of heating, the mixture was transferred to ethyl acetate and washed three times with water, followed by brine. After drying the organic layer over $Na_2SO_4$, the mixture was filtered, concentrated to dryness, and chromatographed (silica, $CH_2Cl_2$, 3% ethyl acetate, 1% isopropanol), yielding an off-white solid (253 mg, 44%): mp 183-185° C.; $^1$H NMR ($CDCl_3$) δ 0.90 (t, J=7.6 Hz, 2H), 1.81-1.92 (m, 2H), 4.29 (t, J=7.6 Hz, 2H), 7.56-7.62 (m, 3H), 7.70-7.73 (m, 2H), 7.89 (s, 1H), 8.20 (s, 1H); $^{13}$C NMR ($CDCl_3$) δ 11.4, 23.5, 47.3, 108.7, 109.0, 116.7, 116.8, 116.9, 126.6, 128.8, 129.5, 129.5, 131.4, 137.8, 145.4, 159.5; FAB-MS obsd 287.1302, calcd 287.1297 [(M+H)$^+$; M=$C_{18}H_{14}N_4$]

Example 10

5,6-Dicyano-2-(4-iodophenyl)-1-propylbenzimidazole (6c). A 25 mL round-bottom flask was charged with 3 (340 mg, 2.15 mmol), NMP (10 mL), 4-iodobenzaldehyde, (499 mg, 2.15 mmol), and a magnetic stirring bar. The flask was fitted with a Hickman still, placed in an oil bath heated to 120° C., and stirred for 1 h. Then $FeCl_3 \cdot 6H_2O$ (29 mg, 0.11 mmol) was added to the reaction vessel and oxygen was bubbled through the mixture as it was heated and stirred for an additional 24 h. The reaction mixture was then removed from heat and added to ethyl acetate. The ethyl acetate solution was washed three times with water, then washed with brine, dried over $Na_2SO_4$, filtered, and concentrated to dryness. The residue (603 mg, 1.63 mmol) was suspended in $CH_3CN$ and heated to 80° C. Then DBU (243 μL, 1.63 μmol) was added and the mixture was stirred for 2 min, and iodopropane (159 μL, 1.63 mmol) was added. After 20 min, the mixture was treated with a second round of DBU and iodopropane, and after an additional 20 min, a third round of reagents was added. After a final 20 min of heating, the mixture was transferred to ethyl acetate and washed three times with water, followed by brine. After drying the organic layer over $Na_2SO_4$, the mixture was filtered, concentrated to dryness, and chromatographed (silica, $CHCl_3$, 5% ethyl acetate), giving a white solid (440 mg, 50%): mp 208-209° C.; $^1$H NMR ($CDCl_3$) δ 0.91 (t, J=7.6 Hz, 3H), 1.80-1.91 (m, 2H) 4.26 (t, J=7.6 Hz, 2H), 7.46 (d, J=8.0 Hz, 2H), 7.87 (s, 1H), 7.95 (d, J=8.0 Hz, 2H), 8.22 (s, 1H); $^{13}$C NMR ($CDCl_3$) δ 11.4, 23.6, 47.4, 98.4, 109.0, 109.3, 116.55, 116.62, 116.9, 126.7, 128.2, 130.9, 137.8, 138.7, 145.3, 158.4; Anal. Calcd for $C_{18}H_{13}IN_4$: C, 52.45; H, 3.18; N, 13.59. Found: C, 52.40; H, 3.06; N, 13.40.

Example 11

5,6-Dicyano-2-(4-(triisopropylsilylethynyl)phenyl)-1-propylbenzimidazole (6d). A 20 mL vial was charged with 5d (763 mg, 1.79 mmol), and NMP (10 mL). The vial was capped with a septum and placed in an oil bath heated to 120° C. DBU (267 μL, 1.79 mmol) was added, and the mixture was stirred for 2 min. Then iodopropane (175 μL, 1.79 mmol) was added and the mixture was stirred for 20 min. A second dose of DBU (267 μL, 1.79 mmol), followed by iodopropane (175 μL, 1.79 mmol), was added, and 20 min later, a third identical round of DBU and iodopropane was again added. After the third round of reagents was added and the mixture was stirred for 20 min, the reaction mixture was removed from heat and added to ethyl acetate. The solution was washed three times with water, then washed with brine, dried over $Na_2SO_4$, filtered, and concentrated to dryness. The residue was chromatographed (silica, $CHCl_3$), yielding a colorless solid (506 mg, 61%): mp 242-243° C.; $^1$H NMR ($d_6$-acetone) δ 0.89 (t, J=7.2 Hz, 3H), 1.17-1.19 (m, 21H), 1.86-1.96 (m, 2H), 4.53 (t, J=7.6 Hz, 2H), 7.75 (d, J=8.0 Hz, 2H), 7.91 (d, J=8.0 Hz, 2H), 8.36 (s, 1H), 8.50 (s, 1H); $^{13}$C NMR ($d_6$-acetone) δ 10.5, 11.3, 18.4, 23.2, 47.1, 93.1, 106.6, 108.1, 108.3, 116.8, 116.9, 118.3, 125.8, 126.3, 129.6, 129.9, 132.5, 138.5, 145.4, 158.4; Anal. Calcd for $C_{29}H_{34}N_4Si$: C, 74.63; H, 7.34; N, 12.01. Found: C, 74.75; H, 7.32; N, 12.01.

Example 12

Tetrakis(2-tridec-7-yl-1-propylbenzimidazo[5,6-b:5',6'-g:5'',6''-l:5''',6'''-q])porphyrazine (Fb-7). A 5 mL reaction vial was charged with 6a (150 mg, 382 μmol), pentanol (1.90 mL), and a magnetic stirring bar. The vial was capped and heated in a heating block set at 145° C. and then DBU (57 μL, 382 μmol) was added. Heating and stirring continued for 18 h. The vial was then removed from heat, and upon cooling to room temperature, the mixture was diluted with 18 mL of MeOH, and then centrifuged. The supernatant was removed and the pellet was resuspended in MeOH and centrifuged again. After removing the supernatant the second time, the pellet was redissolved in THF (2 mL) and precipitated by addition of MeOH (18 mL). The mixture was centrifuged, and upon removal of the supernatant, the pellet was dried in vacuo, revealing a green solid (17 mg, 11%): $^1$H NMR ($d_8$-THF) δ 0.30-0.50 (br s, 2H), 0.80-1.00 (m, 24H), 1.17-1.60 (m, 76H), 1.80-2.10 (m, 8H), 2.10-2.42 (m, 16H), 3.10-3.25 (m, 2H), 3.30-3.40 (m, 2H), 4.30-4.50 (m, 4H), 4.70-4.84 (m, 4H), 9.30-9.70 (m, 8H); LD-MS obsd 1570.8; FAB-MS obsd 1571.2178, calcd 1571.1916 ($C_{100}H_{146}N_{16}$); $\lambda_{abs}$ (nm) 309, 342, 376, 640, 676, 713, 737; $\lambda_{em}$, 742 nm; $\Phi_f$=0.59.

Example 13

Preparation of Fb-7 using Lithium pentoxide: A 5 mL reaction vial was charged with a magnetic stirring bar, pentanol (1.0 mL), and Li ribbon (23 mg, 3.3 mmol). The vial was capped, vented and warmed to 90° C. After all of the Li was consumed (40 min) the vial was removed from heat and allowed to cool to room temperature. Then a pentanol solution of 6a (150 mg, 0.382 mmol, in 1.0 mL) was added, and the vial was capped and heated to 140° C. for 4 h. The vial was then removed from heat and, upon cooling to room temperature, the reaction mixture was diluted into 18 mL of MeOH (2% $CH_3CO_2H$). The mixture was centrifuged, and the supernatant was removed. The supernatant was removed and the pellet was resuspended in MeOH and centrifuged again. After removing the supernatant the second time, the pellet was redissolved in THF (2 mL) and precipitated by addition of MeOH (18 mL). The mixture was centrifuged, and upon removal of the supernatant, the pellet was dried in vacuo, giving a green solid (74 mg, 49%). Characterization data were consistent with the material produced from the DBU-mediated reaction (vide supra).

Example 14

Tetrakis(2-tridec-7-yl-1-propylbenzimidazo[5,6-b:5',6'-g:5",6"-l:5''',6'''-q])porphyrazinatomagnesium(II) (Mg-7). A 5 mL reaction vial was charged with 6a (150 mg, 382 µmol), $MgCl_2$ (13 mg, 96 µmol), pentanol (1.90 mL), and a magnetic stirring bar. The vial was capped and heated in a heating block set at 145° C. and then DBU (57 µL, 382 µmol) was added. Heating and stirring continued for 18 h. The vial was then removed from heat, and upon cooling to room temperature, the mixture was diluted with 16 mL of MeOH and 2 mL of water, and then centrifuged. The supernatant was removed and the pellet was resuspended in MeOH/water (8:1), and centrifuged again. After removing the supernatant the second time, the pellet was redissolved in THF (2 mL) and precipitated by addition of MeOH (16 mL) and water (2 mL). The mixture was centrifuged, and upon removal of the supernatant, the pellet was dried in vacuo, giving a green solid (41 mg, 27%): $^1$H NMR ($d_8$-THF) δ 0.82-0.96 (m, 24H), 1.16-1.58 (m, 76H), 1.87-2.02 (m, 8H), 2.18-2.36 (m, 16H), 3.24-3.34 (m, 4H), 4.66-4.74 (m, 8H), 9.40 (s, 2H), 9.47 (s, 2H), 9.65 (s, 2H), 9.68 (s, 2H); LD-MS obsd 1592.7; FAB-MS obsd 1593.1650, calcd 1593.1610 ($C_{100}H_{144}MgN_{16}$); $\lambda_{abs}$ (nm) 310, 363, 640, 680, 713; $\lambda_{em}$ 720 nm; $\Phi_f$=0.69.

Example 15

Tetrakis(2-tridec-7-yl-1-propylbenzimidazo[5,6-b:5',6'-g:5",6"-l:5''',6'''-q])porphyrazinatozinc(II) (Zn-7). A 5 mL reaction vial was charged with 6a (150 mg, 382 mmol) and a magnetic stirring bar. The vial was then introduced into a glovebox under Argon atmosphere and $ZnCl_2$ (13 mg, 96 µmol) was added. The vial was capped and removed from the glove box, and pentanol (1.90 mL) was added. The vial was heated to 140° C. in a heating block and then DBU (57 µL, 382 µml) was added. The temperature of the heating block was raised to 145° C. and continued for 18 h. The vial was then removed from heat, and upon cooling to room temperature, the mixture was diluted with 16 mL of MeOH and 2 mL of water, and then centrifuged. The supernatant was removed and the pellet was resuspended in MeOH and centrifuged again. After removing the supernatant the second time, the pellet was redissolved in THF (2 mL) and precipitated by addition of MeOH (16 mL) and water (2 mL). The mixture was centrifuged, and upon removal of the supernatant, the pellet was dried in vacuo, giving a green solid (72 mg, 46%): NMR ($d_8$-THF) δ 0.82-0.95 (m, 24H), 1.20-1.60 (m, 76H), 1.88-2.05 (m, 8H), 2.17-2.35 (m, 16H), 3.20-3.35 (m, 4H), 4.60-4.80 (m, 8H), 9.45 (s, 2H), 9.50 (s, 2H), 9.64-9.74 (m, 4H); LD-MS obsd 1633.0; FAB-MS obsd 1633.1111, calcd 1633.1051 ($C_{100}H_{144}N_{16}Zn$); $\lambda_{abs}$ (nm) 309, 357, 640, 681, 713; $\lambda_{em}$ 724 nm; $\Phi_f$=0.47.

Example 16

Tetrakis(2-phenyl-1-propylbenzimidazo[5,6-b:5',6'-g:5",6"-l:5''',6'''-q])porphyrazine (Fb-8). A 5 mL reaction vial was charged with 6b (50.0 mg, 0.175 µmol), pentanol (875 µL) and a magnetic stirring bar. The vial was capped and heated in a heating block set to 145° C. and then DBU (26 µL, 175 µmol) was added. Heating and stirring continued for 18 h. The vial was then removed from heat, and upon cooling to room temperature, the mixture was diluted with 18 mL of MeOH, and then centrifuged. The supernatant was removed and the pellet was resuspended in MeOH and centrifuged again. This suspension-centrifugation procedure was repeated a third time. After removing the supernatant the third time, the pellet was redissolved in THF (4 mL) and precipitated by addition of MeOH (15 mL) and water (0.5 mL). The mixture was centrifuged, and upon removal of the supernatant, the pellet was dried in vacuo, giving a green solid (19 mg, 38%). The sample was found to be a regioisomeric mixture of products, which resulted in some $^1$H NMR resonances having non-integer integrations: $^1$H NMR ($d_8$-THF) δ −3.13 (br s, 2H), 1.02-1.25 (m, 12H), 2.04-2.34 (m, 8H), 4.18-4.56 (m, 8H), 7.50-7.70 (m 12H), 7.90-8.08 (m, 8H), 8.12-8.22 (br s, 1H), 8.28-8.77 (m, 5H), 8.90-8.96 (m, 0.5H), 9.00-9.12 (m, 1.5H); LD-MS obsd 1146.7; FAB-MS obsd 1147.5127, calcd 1147.5109 [(M+H)$^+$; M=$C_{72}H_{58}N_{16}$].

Example 17

Preparation of Fb-8 using Lithium pentoxide: A 5 mL reaction vial was charged with a magnetic stirring bar, pentanol (875 µL), and Li ribbon (10.0 mg, 1.44 mmol). The vial was capped, vented and warmed to 90° C. After all of the Li was consumed (1 h) the vial was removed from heat and allowed to cool to room temperature. Then 6b (50 mg, 175 mop was added, and the vial was and heated in a heating block set to 145° C. for 18 h. The vial was then removed from heat and, upon cooling to room temperature, the reaction mixture was diluted into 18 mL of MeOH (2% $CH_3CO_2H$). The mixture was centrifuged, and the supernatant was removed. The supernatant was removed and the pellet was resuspended in MeOH and centrifuged again. This suspension-centrifugation procedure was repeated a third time. After removing the supernatant the third time, the pellet was redissolved in THF (4 mL) and precipitated by addition of MeOH (15 mL) and water (0.5 mL). The mixture was centrifuged again, and upon removal of the supernatant, the pellet was dried in vacuo, giving a green solid (14 mg, 28%). Characterization data were consistent with the material produced from the DBU-mediated reaction (vide supra).

Example 18

Tetrakis(2-phenyl-1-propylbenzimidazo[5,6-b:5',6'-g:5",6"-l:5''',6'''-q])porphyrazinatomagnesium(II) (Mg-8). A 5 mL reaction vial was charged with 6b (50.0 mg, 0.175 µmol), $MgCl_2$ (4.2 mg, 44 µmol), pentanol (875 pt) and a magnetic stirring bar. The vial was capped and heated in a heating block set to 145° C. and then DBU (26 μL, 175 μmol) was added. Heating and stirring continued for 18 h. The vial was then removed from heat, and upon cooling to room temperature, the mixture was diluted with 18 mL of MeOH, and then centrifuged. The supernatant was removed and the pellet was resuspended in MeOH and centrifuged again. This suspension-centrifugation procedure was repeated a third time. After removing the supernatant the third time, the pellet was redissolved in THF (4 mL) and precipitated by addition of MeOH (15 mL) and water (0.5 mL). The mixture was centrifuged, and upon removal of the supernatant, the pellet was dried in vacuo, giving a green solid (33 mg, 65%): $^1$H NMR (dg-THF) δ 1.12-1.22 (m, 12H), 2.22-2.34 (m, 8H), 4.83-4.92 (m, 8H), 7.59-7.72 (m, 12H), 8.06-8.12 (m, 8H), 9.55 (br s, 2H), 9.63 (br s, 2H), 9.76-9.84 (m, 4H); LD-MS obsd, 1168.8; FAB-MS obsd 1168.4695, calcd 1168.4724 ($C_{72}H_{56}MgN_{16}$); $\lambda_{abs}$ (nm) 314, 364, 643, 684, 717; $\lambda_{em}$, 724 nm; $\Phi_f$=0.84.

Example 19

Tetrakis(2-phenyl-1-propylbenzimidazo[5,6-b:5',6'-g:5'',6''-l:5''',6'''-q])porphyrazinatozinc(II) (Zn-8). A 5 mL reaction vial was charged with 6b (50.0 mg, 0.175 μmol), and a magnetic stirring bar. The vial was then introduced into a glovebox under an argon atmosphere and $ZnCl_2$ (6.0 mg, 44 μmol) was added. The vial was capped and removed from the glove box, and pentanol (875 μL) was added. The vial was capped and heated in a heating block set to 145° C. and then DBU (26 μL, 175 μmol) was added. Heating and stirring continued for 18 h. The vial was then removed from heat, and upon cooling to room temperature, the mixture was diluted with 18 mL of MeOH, and then centrifuged. The supernatant was removed and the pellet was resuspended in MeOH and centrifuged again. This suspension-centrifugation procedure was repeated a third time. After removing the supernatant the third time, the pellet was redissolved in THF (4 mL) and precipitated by addition of MeOH (15 mL) and water (0.5 mL). The mixture was centrifuged, and upon removal of the supernatant, the pellet was dried in vacuo, giving a green solid (33 mg, 62%). The sample was found to be a regioisomeric mixture of products, which resulted in some $^1$H NMR resonances having non-integer integrations: $^1$H NMR (d$_8$-THF) δ 1.11-1.21 (m, 12H), 2.20-2.33 (m, 8H), 4.72-4.86 (m, 8H), 7.60-7.71 (m, 12H), 8.05-8.12 (m, 8H), 9.30-9.43 (m, 4H), 9.49 (s, 0.5H), 9.59, (br s, 1.5H), 9.66 (s, 0.5H), 9.71-9.74 (m, 1.5H); LD-MS obsd, 1208.6; FAB-MS obsd 1208.4205, calcd 1208.4165 ($C_{72}H_{56}N_{16}Zn$); $\lambda_{abs}$ (nm) 315, 357, 643, 685, 717; $\lambda_{em}$ 724 nm; $\Phi_f$=0.43.

Example 20

Preparative-scale macrocyclization reaction using 6d and 1,2-dicyanobenzene: A 2-necked 25 mL round-bottom flask was charged with 6d (317 mg, 0.679 mmol), dicyanobenzene (130 mg, 1.02 mmol, 1.5 equiv), and a magnetic stirring bar. The flask was fitted with a condenser and a bubbler, and a septum for the second neck. The apparatus was flushed for 20 min with a stream of argon, and then briefly opened to add $ZnCl_2$ (58 mg, 0.43 mmol). Then pentanol (8.5 mL) and the mixture was gradually heated to reflux. When the mixture was homogeneous, DBU (254 μL, 1.70 mmol) was added. Heating and stirring at reflux temperature was continued overnight (12 h). The mixture was then cooled to room temperature, and diluted into MeOH (300 mL) and water (50 mL). The resulting precipitate was filtered, rinsed with EtOH, and dried in vacuo. The residue was then dissolved in THF and eluted through a short plug of silica gel in THF, and chromatographed over a column of Bio-Beads SX-3 in THF. The mixture separated into three bands. The first band (green) appeared (by HPLC-SEC analysis) to contain compounds containing two and more-than-two benzimidazoles. The second band (blue) contained Zn-11. The third band (blue) contained Zn-10. The fractions containing Zn-10 and Zn-11 were set aside, and the first band of green material was reconcentrated and chromatographed over a column of Bio-Beads SX-1. The mixture separated into two broad green bands. The first band, containing pigments having three and four benzimidazoles, could not be further purified by any chromatographic method, and was therefore discarded. The second green band contained a mixture of Zn-12 and Zn-13. The mixture was separated by chromatography (silica, $CHCl_3$, 2% isopropanol).

Example 21

Zinc Phthalocyanine (Zn-10, $A_4$). The compound was isolated as a blue band from chromatography on Bio-Beads SX-3 (vide supra). The THF solution was concentrated and the residue was chromatographed over a short column (silica, $CHCl_3$, 2% isopropanol). Fractions containing the product were concentrated, giving a blue solid (10 mg, 4%): $^1$H NMR (d$_8$-THF) δ 8.17-8.23 (m, 8H), 9.45-9.50 (m, 8H); LD-MS obsd, 576.3; FABMS obsd 576.0813, calcd 576.0789 ($C_{32}H_{16}N_8Zn$); $\lambda_{abs}$ 666 nm.

Example 22

Tribenzo[g,l,q]-(2-{4-(2-triisopropylsilylethynyl)phenyl}-1-propylbenzimidazo[5,6-b])porphyrazinatozinc(II) (Zn-11, $A_3B$). The compound was isolated as a blue band from chromatography on Bio-Beads SX-3 (vide supra). The THF solution was concentrated and the residue was chromatographed over a short column (silica, $CHCl_3$, 2% isopropanol). Fractions containing the product were concentrated, giving a blue solid (86 mg, 22%): $^1$H NMR (d$_8$-THF) δ 1.14 (t, J=7.2 Hz, 3H), 1.27 (s, 21H), 2.16-2.26 (m, 2H), 4.75 (t, J=7.6 Hz, 2H), 7.82 (d, J=8.0 Hz, 2H), 8.00-8.15 (m, 8H), 9.09 (s, 1H), 9.13 (d, J=7.6 Hz, 1H), 9.22-9.34 (m, 5H), 9.37 (s, 1H); LD-MS obsd, 914.7; FAB-MS obsd 914.2986, calcd 914.2968 ($C_{53}H_{46}N_{10}SiZn$); $\lambda_{abs}$ (nm): 340, 611, 674; $\lambda_{em}$ 692 nm; $\Phi_f$=0.47.

Example 23

Dibenzo[l,q]-(2-{4-(2-triisopropylsilylethynyl)phenyl}-1-propylbenzimidazo[5,6-b:5',3'-g])porphyrazinatozinc(II) (Zn-12, cis-$A_2B_2$). The compound was isolated from silica gel chromatography (vide supra) as the first green band and concentrated to give a green solid (74 mg, 14%): $^1$H NMR (d$_8$-THF) δ 1.09-1.20 (m, 6H), 2.15-2.30 (m, 4H), 4.81 (t, J=7.6 Hz, 4H), 7.76-7.84 (m, 4H), 8.06-8.19 (m, 8H), 9.12-9.50 (m, 5H), 9.63 (s, 1H), 9.70 (s, 1H); LD-MS obsd 1252.5; FAB-MS obsd 1252.5148, calcd 1252.5146 ($C_{74}H_{76}N_{12}Si_2Zn$); $\lambda_{abs}$ (nm): 340, 623, 693; $\lambda_{em}$ 701 nm; $\Phi_f$=0.44.

Example 24

Dibenzo[g,q]-(2-{4-(2-triisopropylsilylethynyl)phenyl}-1-propylbenzimidazo[5,6-b:5',6'-l])porphyrazinatozinc(II)-$C_{2v}$ (Zn-13b, trans-$A_2B_2$). The compound was isolated from chromatography as the second green band and concentrated to give a green solid (4 mg, 1%). Characterization data were consistent with the compound Zn-13b isolated from the metallation of Fb-13 (vide infra): $^1$H NMR (d$_8$-THF) δ 1.15 (t, J=7.2 Hz, 6H), 1.25 (s, 42H), 2.20-2.28 (m, 4H), 4.81 (t, J=7.2 Hz, 4H), 7.79 (d, J=8.4 Hz, 4H), 8.09 (d, J=8.4 Hz, 4H), 8.12-8.17 (m, 2H), 8.17-8.22 (m, 2H), 9.37 (s, 2H), 9.37-9.42 (m, 2H), 9.43-9.48 (m, 2H), 9.60 (s, 2H); LD-MS obsd 1252.6, calcd 1252.5 (C$_{74}$H$_{76}$N$_{12}$Si$_2$Zn); $\lambda_{abs}$ (nm): 335, 679, 708; FAB-MS and fluorescence data were not separately obtained for this sample, but were obtained for the sample reported from the metallation of Fb-13.

Example 25

Tribenzo[g,l,q]-(2-{4-(2-triisopropylsilylethynyl)phenyl}-1-propylbenzimidazo[5,6-b])porphyrazine (Fb-11, A$_3$B). A 20 mL reaction vial was charged with 14a (40.0 mg, 83 mmol), boron subphthalocyanine 15 (143 mg, 332 µmol, 4 equiv), DMAE (4 mL), and a magnetic stirring bar. The vial was capped and heated in an oil bath maintained at 100° C. Periodically, a few microliters of the reaction mixture were removed, diluted into THF, and analyzed by UV-Vis spectroscopy. After the reaction had proceeded for 10 h, 15 could not be observed in the UV-Vis spectrum. The reaction was then cooled to room temperature and diluted with MeOH (50 mL) and water (30 mL). The mixture was filtered through paper, and the solid residue was rinsed with MeOH and air-dried. The filter paper containing the solid residue was then loaded into a Soxhlet thimble and the thimble was extracted with CHCl$_3$ for 20 h. Upon cooling the apparatus, most of the extracted pigment precipitated out of the filtrate. The solvent was removed from the filtrate under reduced pressure and the solid material was resuspended in THF (20 mL) with sonication. The mixture was filtered through a cotton-plugged pipette and chromatographed over a column of Bio-Beads SX-3 in THF. The desired compound was recovered from the column as a dark blue-green band that eluted just after a faint green band and before a purple band. The faint green band was identified by UV-Vis as a mixture of benzimidazoporphyrazines having more than one benzimidazole, and was discarded. The purple band was identified by UV-Vis as a mixture of trace remaining subPc 15 and unsubstituted phthalocyanine and was discarded. The fractions containing the desired compound were concentrated and chromatographed over silica gel (CH$_2$Cl$_2$, 2% isopropanol, 2.5% THF, 2.5% ethyl acetate). Fractions containing the desired compound were concentrated, giving a blue solid (18 mg, 25%): $^1$H NMR δ –3.29 (br s, 2H), 1.17 (t, J=7.6 Hz, 3H), 1.32 (s, 21H), 2.10-2.25 (m, 2H), 4.45-4.60 (m, 2H), 7.68 (t, J=7.2 Hz, 1H), 7.75-7.94 (m, 4H), 7.87 (d, J=8.0 Hz, 4H), 8.11 (d, J=8.0 Hz, 4H), 8.24-8.32 (m, 1H), 8.52-8.66 (m, 3H), 8.68-8.82 (m, 4H); LD-MS obsd 852.5; FAB-MS obsd 853.3945, calcd 853.3911 [(M+H)$^+$; M=C$_{53}$H$_{48}$N$_{10}$Si] $\lambda_{abs}$ (nm) 337, 622, 649, 669, 695; $\lambda_{em}$ (nm) 700, 714; Φ$_f$=0.68.

Example 26

Dibenzo[g,q]-(2-{4-(2-triisopropylsilylethynyl)phenyl}-1-propylbenzimidazo[5,6-b:5',6'-l])porphyrazine (Fb-13, trans-A$_2$B$_2$). An oven-dried three-necked 300 mL round bottom flask was charged with 14 (465 mg, 0.96 mmol), and a magnetic stirring bar. The vessel was flushed with argon for 10 min and immersed in an ice bath. Freshly dried THF (70 mL) and freshly dried TEA (269 µL, 1.92 mmol, 2 equiv.) were added to the flask. A sample of 17 (212 mg, 0.96 mmol) was dissolved in dry THF (10 mL) and slowly added to the reaction vessel. The mixture was kept at 0-5° C. for 1 h, and then allowed to warm to room temperature overnight. Then the triethylammonium salt that had formed was removed by filtration of the mixture into an oven-dried two-necked 250 mL round bottom flask. The vessel was flushed with argon for 5 min and a solution of hydroquinone (106 mg, 0.96 mmol) in THF (10 mL) was added, followed by NaOMe (658 µL of a 25 wt % solution in MeOH, 2.88 mmol, 3 equiv). The mixture was refluxed for 6 h, then cooled to room temperature and poured into MeOH (20 mL), to which water (100 mL) was added. After standing for 1 h, the mixture was filtered and the solid residue was air dried, dissolved in CH$_2$Cl$_2$, and chromatographed (silica, CH$_2$Cl$_2$, 1% isopropanol, 5% ethyl acetate, 5% THF). The first green band (faint) was identified by LD-MS as the AB$_3$ macrocycle (LD-MS m/z 1526.0). The product was collected as the second (dark) green band (49 mg, 9%): NMR δ –4.32 (br s, 1H), –4.22 (br s, 1H), 1.02 (t, J=6.8 Hz, 3H), 1.10 (t, J=6.8 Hz, 3H), 1.34 (s, 42H), 1.82-2.10 (m, 4H), 4.10-4.38 (m, 4H), 7.29-7.37 (m, 1H), 7.47-7.64 (m, 4H), 7.74-7.83 (m, 4H), 7.83-7.90 (m, 1H), 7.91 (d, J=7.6 Hz, 2H), 7.95 (d, J=8.4 Hz, 2H), 7.99-8.15 (m, 4H), 8.17-8.24 (m, 1H), 8.29-8.47 (m, 1H); LDMS obsd 1190.7; FABMS obsd 1190.6040, calcd 1190.6011 (C$_{74}$H$_{78}$N$_{12}$Si$_2$); $\lambda_{abs}$ (nm): 340, 610, 631, 662, 681, 703, 732; $\lambda_{em}$ (nm): 711, 739; Φ$_f$=0.66.

Example 27

Dibenzo[g,q]-(2-{4-(2-triisopropylsilylethynyl)phenyl}-1-propylbenzimidazo[5,6-b:5',6'-l])porphyrazinatozinc(II) (Zn-13, trans-A$_2$B$_2$). From cross-condensation reaction: An oven-dried 20 mL reaction vial was charged with 14 (48 mg, 99 µmol), and a magnetic stirring bar. The vial was capped with a septum flushed with argon for 10 min and immersed in an ice bath. Freshly dried THF (8 mL) and freshly dried TEA (28 µL, 0.20 mmol, 2 equiv.) were added to the vial. A sample of 16 (22 mg, 99 µmol) was dissolved in dry THF (2 mL) and slowly added to the reaction vial. The mixture was kept at 0-5° C. for 1 h, and then allowed to warm to room temperature overnight. Then the triethylammonium salt that had formed was removed by filtration of the mixture into an oven-dried 25 mL round bottom flask. Hydroquinone (11 mg) was added and the vessel was flushed with argon for 5 min and NaOMe (69 µL of a 25 wt % solution in MeOH, 0.30 mmol, 3 equiv) was added. The mixture was refluxed for 6 h, then cooled to room temperature and poured into MeOH (50 mL), to which water (2 mL) was added. After standing for 1 h, the mixture was filtered and the solid residue was air dried, dissolved in CH$_2$Cl$_2$, and chromatographed (silica, CH$_2$Cl$_2$, 1% isopropanol, 2.5% ethyl acetate, 2.5% THF). The first green band (faint) was identified by LD-MS as the ZnAB$_3$ macrocycle (LD-MS m/e 1591.0). The product was collected as the second (dark) green band (5.0 mg, 4%): $^1$H NMR δ 1.15 (t, J=7.6 Hz, 6H), 1.28 (s, 42H), 2.13-2.25 (m, 4H), 4.69 (t, J=7.6 Hz, 4H), 7.80 (d, J=8.0 Hz, 4H), 8.02-8.20 (m, 4H), 8.09 (d, J=8.0 Hz, 4H), 9.06-9.13 (m, 1H), 9.18-9.24 (m, 2H), 9.29-9.43 (m, 5H); LD-MS obsd 1252.5; FAB-MS obsd 1252.5242, calcd 1252.5146 (C$_{74}$H$_{76}$N$_{12}$Si$_2$Zn); $\lambda_{abs}$ (nm): 338, 614, 648, 679, 709. Fluorescence data were not collected from this sample, but were collected for the separate regioisomers (vide infra).

From zinc-metalation of Fb-13: A 20 mL reaction vial was charged with Fb-13 (20 mg, 17 µmol), Zn(OAc)$_2$.2H$_2$O (7.4 mg, 34 µmol, 2 equiv), dioxane (2.0 mL), DMF (0.5 mL), and a magnetic stirring bar. The vial was kept in an oil bath heated to 100° C. for 2 h, upon which the UV-Vis absorbance analysis of a removed sample showed a spectrum for Zn-13 with no evidence of remaining starting material. The reaction mixture was cooled and diluted to 20 mL with MeOH. The mixture was filtered and the solid was air dried, then dissolved through the filter with THF, and concentrated to dryness. The residue was chromatographed (silica, toluene, 10% THF) to separate a trace of remaining Fb-13 that was too small to be detected in the mixture by UV-Vis analysis. The product eluted as the first (dark) green band (19 mg, 90%). A second chromatography (silica, $CH_2Cl_2$, 1% isopropanol, 5% ethyl acetate, 5% THF) separated the two regioisomeric products. The first green band was assigned as Zn-13a. Fractions containing the second green band were rechromatographed twice to separate all trace of the first eluting isomer. The second eluting species was assigned as Zn-13b. These two isomers, Zn-13a and Zn-13b, were determined by their COSY NMR data to be the $C_{2h}$ and $C_{2v}$ symmetric structures, respectively.

Data for Zn-13a ($C_{2h}$): yield=10.0 mg (47%); $^1$H NMR δ 1.16 (t, J=8.0 Hz, 6H), 1.28 (s, 42H), 2.14-2.26 (m, 4H), 4.71 (t, J=8.0 Hz, 4H), 7.81 (d, J=8.0 Hz, 4H), 8.02-8.14 (m, 4H), 8.08 (d, J=8.0 Hz, 4H), 8.88 (s, 2H), 9.13 (d, J=7.2 Hz, 2H), 9.22 (s, 2H), 9.23 (d, J=7.2 Hz, 2H); LD-MS obsd 1252.5; FAB-MS obsd 1252.5214, calcd 1252.5146 ($C_{74}H_{76}N_{12}Si_2Zn$); $\lambda_{abs}$ (nm): 338, 614, 648, 679, 709; $\lambda_{em}$ 717 nm; $\Phi_f$=0.32

Data for Zn-13b ($C_{2v}$): yield=9.0 mg (43%); $^1$H NMR δ 1.15 (t, J=7.6 Hz, 6H), 1.28 (s, 42H), 2.13-2.25 (m, 4H), 4.69 (t, J=7.6 Hz, 4H), 7.79 (d, J=7.6 Hz, 4H), 8.13 (d, J=7.6 Hz, 6H), 8.10-8.19 (m, 2H), 8.95 (s, 2H), 9.09-9.20 (m, 2H), 9.21-9.35 (m, 4H); LD-MS obsd 1252.6; FAB-MS 1252.5172, calcd 1252.5146 ($C_{74}H_{76}N_{12}Si_2Zn$); A. (nm): 338, 614, 648, 679, 709; $\lambda_{em}$ 717 nm; $\Phi_f$=0.26.

Example 28

2-(4-(2-(Triisopropylsilyl)ethynyl)phenyl)-1-propylimidazo[4,5-f]isoindole-1,3-diimine (14). A 25 mL round bottom flask was charged with 6d (606 mg, 1.30 mmol) and a magnetic stirring bar. The vessel was sealed with a condenser, a bubbler, and a septum for the second neck. The apparatus was flushed with argon for 15 min, and then anhydrous MeOH (14 mL), freshly dried THF (7 mL), and NaOMe (30 µL of a 25 wt % solution in MeOH, 130 µmol) were added. The reaction flask was heated in an oil bath at 70° C., and the mixture became homogeneous. The argon line was removed and ammonia gas was bubbled through the mixture as it refluxed for 6 h. The flask was then removed from heat and allowed to cool under ammonia atmosphere. When the mixture reached room temperature, the ammonia gas flow was stopped and the mixture was allowed to stand overnight under a slowly flowing stream of argon, during which time some greenish-white crystals formed in the vessel. The supernatant was drained off with a pipette and the crystals were washed with a few milliliters of anhydrous MeOH, and then dried in vacuo. Yield: 479 mg, 76%: mp 248-250° C., upon which the sample melted and turned deep green—the melting capillary was broken and the residue taken up in THF and analyzed by UV-Vis spectroscopy, which showed a spectrum similar to that of Fb-8; Due to the presence of tautomeric forms of the product, the NH signals do not all integrate to integers: $^1$H NMR ($d_8$-THF) δ 0.86 (t, J=7.2 Hz, 3H), 1.19 (s, 21H), 1.80-1.92 (m, 2H), 3.14 (br s, 0.5H), 4.30-4.44 (m, 2H), 7.48 (br s, 0.5H), 7.65 (d, J=8.0 Hz, 2H), 7.83 (d, J=8.0 Hz, 2H), 7.80-8.60 (m, 4H); Due to poor solubility, $^{13}$C NMR spectroscopy was not performed; IR (film): 3260, 3201, 2941, 2861, 2161, 1666, 1547, 1460, 1410, 1345, 1144, 1109, 1081, 1054, 994, 916, 882; Anal. Calcd for $C_{29}H_{37}N_5Si$: C, 72.01; H, 7.71; N, 14.48. Found: C, 69.90; H, 7.86; N, 13.91 (consistent with crystal inclusion of one molecule MeOH per molecule compound; FAB-MS obsd 484.2876, calcd 484.2896 [(M+H)$^+$; M=$C_{29}H_{37}N_5Si$].

Example 29

Dibenzo[g,q]-(2-{4-ethynylphenyl}-1-propylbenzimidazo[5,6-b:5',6'-l])porphyrazinatozinc(II)—$C_{2h}$ (Zn-17a, trans-$A_2B_2$). A 20 mL vial was charged with Zn-13a (9.5 mg, 7.6 µmol), $CH_2Cl_2$ (4 mL), and a magnetic stirring bar. Then TBAF (17 µL of a 1 M solution in THF, 17 µmol) was added, and the mixture was stirred at room temperature for 1.5 h. TLC analysis (silica, $CH_2Cl_2$, 1% isopropanol, 5% ethyl acetate, 5% THF) indicated that neither starting material nor intermediate remained, so the mixture was directly added to a short (15 cm) silica gel column packed in $CH_2Cl_2$. The product proved to be very polar, and the eluent ($CH_2Cl_2$, 1% isopropanol, 5% ethyl acetate, 5% THF) was changed to increasing amounts of THF (final eluent: $CH_2Cl_2$/THF, 1:4) to elute the product as a dark blue-green band (6.2 mg, 87%): $^1$H NMR ($d_8$-THF) δ 1.17 (t, J=7.2 Hz, 6H), 2.18-2.28 (m, 4H), 3.84 (s, 2H), 4.74 (t, J=8.0 Hz, 4H), 7.70 (d, J=8.4 Hz, 4H), 8.02-8.12 (m, 4H), 8.05 (d, J=8.4 Hz, 2H), 9.04 (br s, 2H), 9.21 (d, J=6.4 Hz, 2H), 9.26-9.32 (m, 4H); LD-MS obsd 940.8; FAB-MS obsd 940.2510, calcd 940.2477 ($C_{56}H_{36}N_{12}Zn$).

Example 30

Dibenzo[g,q]-(2-{4-ethynylphenyl}-1-propylbenzimidazo[5,6-b:5',6'-l])porphyrazinatozinc(II)-$C_{2v}$ (Zn-17b, trans-$A_2B_2$). The same procedure was followed as for Zn-17a, with the following quantities: Zn-13b (8.2 mg, 6.5 µmol), $CH_2Cl_2$ (4 mL), and TBAF (14 µL of a 1 M solution in THF, 14 mop. The chromatography procedure was followed similarly (final eluent: $CH_2Cl_2$, 30% THF), and the product eluted as a dark blue-green band (4.4 mg, 72%): $^1$H NMR ($d_8$-THF) δ 1.15 (t, J=6.8 Hz, 6H), 2.16-2.27 (m, 4H), 3.85 (s, 2H), 4.72 (t, J=7.6 Hz, 4H), 7.77 (d, J=7.6 Hz, 4H), 8.04 (d, J=7.6 Hz, 6H), 8.12-8.17 (m, 2H), 9.04 (s, 2H), 9.16-9.22 (m, 2H), 9.29-9.35 (m, 4H); LD-MS obsd 940.9; FAB-MS obsd 940.2490, calcd 940.2477 ($C_{56}H_{36}N_{12}Zn$).

Examples 31-38

Figure 5:
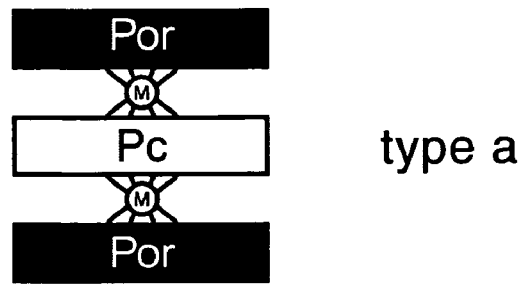
FIG. 5. Structures of three known types of heteroleptic triple decker lanthanide sandwich complexes.
Figure 5:
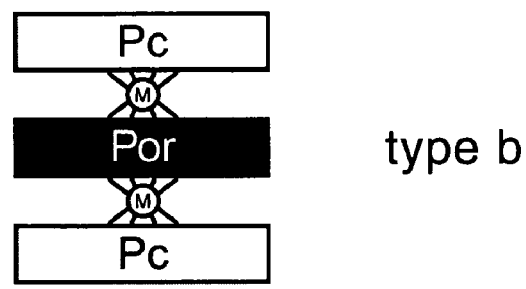
Figure 5:
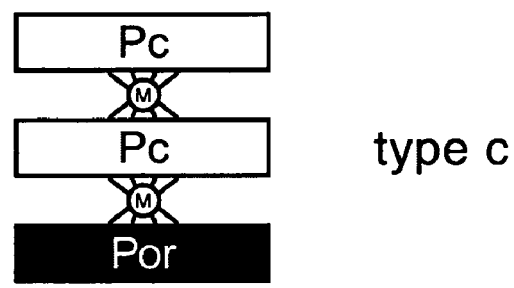

A Triple Decker Sandwich Complex Centered on a Tripodal Linker for High Density Coverage Upon Attachment to a Surface Three types of heteroleptic triple deckers composed of porphyrins and phthalocyanines are shown in FIG. 5. Type-c [(Pc)Ln(Pc)Ln(Por)], type-b [(Pc)Ln(Por)Ln(Pc)] and type-a [(Por)Ln(Pc)Ln(Por)] triple deckers differ in the number and layered arrangement of the respective porphyrin and phthalocyanine ligands. The term (Por) or (Pc) refers to the dianion of a generic porphyrin or phthalocyanine entity, respectively, in a sandwich architecture without regard to the nature of the substituents. Rational routes exist for the synthesis of type-a and type-c triple deckers (Chabach, D.; De Cian, A.; Fischer, J.; Weiss, R.; El Malouli Bibout, M. *Angew. Chem. Int. Ed. Engl.* 1996, 35, 898-899), whereas type-b triple deckers are only available by statistical reactions (Weiss, R.; Fischer, J. In *The Porphyrin Handbook*; Kadish, K. M., Smith, K. M., Guilard, R., Eds.; Academic Press: San Diego, Calif., 2003; Vol. 16, pp 171-246; Li, J.; Gryko, D.; Dabke, R. B.; Diers, J. R.; Bocian, D. F.; Kuhr, W. G.; Lindsey, J. S. *J. Org. Chem.* 2000, 65, 7379-7390).

Figure 6:
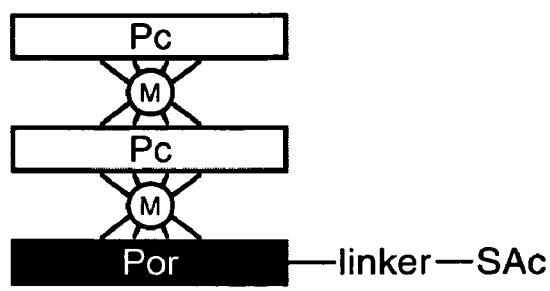
FIG. 6. A type-c triple decker bearing a tether for surface attachment.

Given the greater sophistication of synthetic control in porphyrin versus phthalocyanine chemistry we have almost exclusively employed type-c triple deckers in studies of molecular information storage (Lindsey, J. S. In *The Porphyrin Handbook*; Kadish, K. M., Smith, K. M., Guilard, R., Eds.; Academic Press: San Diego, Calif., 2000; Vol. 1, pp 45-118). Indeed, 14 type-c triple deckers bearing tethers attached to the porphyrin ligand have been prepared. The generic design is shown in FIG. 6. Dyads and oligomers also have been prepared bearing one or two surface attachment groups (Li, J.; Gryko, D.; Dabke, R. B.; Diers, J. R.; Bocian, D. F.; Kuhr, W. G.; Lindsey, J. S. *J. Org. Chem.* 2000, 65, 7379-7390; Schweikart, K.-H.; Malinovskii, V. L.; Diers, J. R.; Yasseri, A. A.; Bocian, D. F.; Kuhr, W. G.; Lindsey, J. S. *J. Mater. Chem.* 2002, 12, 808-828; Schweikart, K.-H.; Malinovskii, V. L.; Yasseri, A. A.; Li, J.; Lysenko, A. B.; Bocian, D. F.; Lindsey, J. S. *Inorg. Chem.* 2003, 42, 7431-7446). For the monomeric complexes illustrated in FIG. 6, the surface attachment groups have included aryl-SAc, benzyl-SAc, thiocyanate, benzyl alcohol, and tripodal benzyl-SAc (Gryko, D.; Li, J.; Diers, J. R.; Roth, K. M.; Bocian, D. F.; Kuhr, W. G.; Lindsey, J. S. *J. Mater. Chem.* 2001, 11, 1162-1180; Balakumar, A.; Lysenko, A. B.; Carcel, C.; Malinovskii, V. L.; Gryko, D. T.; Schweikart, K.-H.; Loewe, R. S.; Yasseri, A. A.; Liu, Z.; Bocian, D. F.; Lindsey, J. S. *J. Org. Chem.* 2004, 69, 1435-1443; Wei, L.; Padmaja, K.; Youngblood, W. J.; Lysenko, A. B.; Lindsey, J. S.; Bocian, D. F. *J. Org. Chem.* 2004, 69, 1461-1469). The alcohol groups enable attachment to Si, whereas the thioacetate groups (which undergo deprotection in situ) enable attachment to Au or Si.

Figure 7:
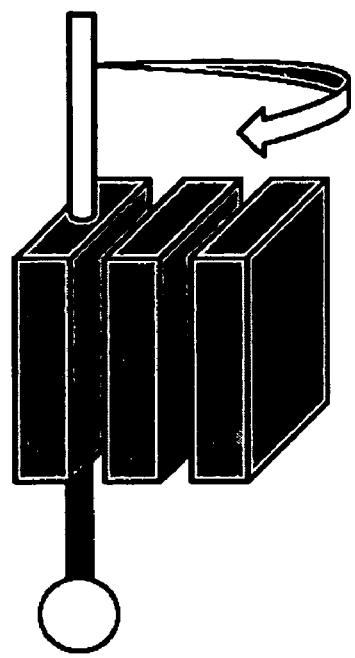
FIG. 7. Camshaft rotation of a type-c triple decker for surface attachment.

The triple decker monomers exhibited a rather low surface coverage ($2.5 \times 10^{-1}$ mol·cm$^{-2}$), corresponding to a large molecular footprint (~670 Å$^2$) (Wei, L.; Padmaja, K.; Youngblood, W. J.; Lysenko, A. B.; Lindsey, J. S.; Bocian, D. F. *J. Org. Chem.* 2004, 69, 1461-1469). Such a large area diminishes the surface charge density from the theoretical maximum. Achieving high surface charge density is a key objective of the molecular information storage approach. Because the tether is attached to the porphyrin, the triple decker in principle could rotate like a camshaft, sweeping out a large area (FIG. 7). In addition, the triple decker can tilt significantly on the surface. We felt that both the tilting and camshaft motions are the source of the substantial increase in molecular footprint and thereby diminished surface charge density.

In an effort to enforce an upright orientation of the triple decker, we prepared two triple deckers wherein each bears a tripodal tether (Wei, L.; Padmaja, K.; Youngblood, W. J.; Lysenko, A. B.; Lindsey, J. S.; Bocian, D. F. *J. Org. Chem.* 2004, 69, 1461-1469). The two triple deckers exhibited surface coverages of $~1 \times 10^{-1}$ mol·cm$^{-2}$, which are still less dense than possible upon close packing. A chief problem remained that the type-c triple decker could sweep out a large surface area by rotation about the tether axis.

We also prepared a phthalocyanine bearing the same trithiol tether. The phthalocyanine was substituted at one of the β-positions via an ethynyl unit. In this architecture, the cant angle of the phthalocyanine causes the macrocycle to sweep out a larger area than would be desirable. To eliminate the cant angle, a phthalocyanine architecture is needed that has peripheral substituents that are aligned with one of the N—N axes of the macrocycle (bisecting two opposite benzo rings and two inner nitrogen atoms). Phthalocyanines having such a diametrically aligned substitution geometry would facilitate information storage studies by enabling higher packing density in the monolayers.

We report herein the synthesis of a phthalocyanine containing one annulated imidazo group and three unsubstituted benzo units (i.e., a benzimidazoporphyrazine), and conversion of the phthalocyanine to a type-a triple decker, where the phthalocyanine (1) is sandwiched by two tetra-p-tolylporphyrin molecules and two cerium atoms, and (2) bears a compact all-carbon ("triallyl") tether. The triple decker lanthanide sandwich complex is centrally positioned on the tripod. The all-carbon tether has been employed with metalloporphyrins, affording high surface coverage upon attachment to Si(100) (Padmaja, K.; Wei, L.; Lindsey, J. S.; Bocian, D. F. *J. Org. Chem.* 2005, 70, submitted). This approach provides straightforward access to triple-decker architectures for high density surface coverage upon attachment to an electroactive surface.

Molecular Design and Synthesis Strategy. Lanthanide triple decker sandwich coordination compounds generally afford four cationic oxidation states (Buchler, J. W.; Ng, D. K. P. In *The Porphyrin Handbook*; Kadish, K. M., Smith, K. M., Guilard, R., Eds.; Academic Press: San Diego, Calif., 2000; Vol. 3, pp 245-294) Cerium was chosen as the lanthanide metal in both layers of the triple decker because each cerium undergoes a further oxidation (Ce$^{3+}$/Ce$^{4+}$), affording a total of six cationic oxidation states (Duchowski, J. K.; Bocian, D. F. *J. Am. Chem. Soc.* 1990, 112, 8807-8811). The availability of six oxidation states is attractive for multibit storage in a given memory cell. Although we have prepared such homonuclear cerium-containing triple deckers (Gross, T.; Chevalier, F.; Lindsey, J. S. *Inorg. Chem.* 2001, 40, 4762-4774), all of the tethered triple deckers prepared to date have contained europium or europium/cerium. The synthesis of the type-a triple decker is achieved by reaction of a dilithio-phthalocyanine and a porphyrin (Gross, supra). The synthesis of the imidazophthalocyanine bearing the tether at the 2-imidazo position and no substituents at the other benzo rings is best achieved by a ring-expansion reaction of a sub-phthalocyanine and the benzimidazo-diiminoisoindoline (Kobayashi, N.; Kondo, R.; Nakajima, S.; Osa, T. *J. Am. Chem. Soc.* 1990, 112, 9640-9641; Musluoglu, E.; Gürek, A.; Ahsen, V.; Bekaroglu, Ö. *Chem. Ber.* 1992, 125, 2337-2339; Sastre, A.; Torres, T.; Hanack, M. *Tetrahedron Lett.* 1995, 36, 8501-8504; Weitemeyer, A.; Kliesch, H.; Wörhle, D. *J. Org. Chem.* 1995, 60, 4900-4904; Kudrevich, S. V.; Gilbert, S.; van Lier, J. E. *J. Org. Chem.* 1996, 61, 5706-5707). We sought to construct the phthalocyanine bearing a compact all-carbon tether via a p-phenylene unit to the 2-position of the imidazo unit. This design required introduction of the tether at the earliest stage in the route to the diiminoisoindoline.

Synthesis. We recently developed a new synthesis of dicyanophenylenediamine 1 (Scheme 9), which upon reaction with a variety of aldehydes afforded the corresponding dicyanobenzimidazoles (see above) A p-substituted benzaldehyde bearing the all-carbon tether (2), obtained from the commercially available p-trifluoromethylaniline, was used in the synthesis of tripodal-tethered metalloporphyrins. The reaction of 1 and 2 proceeded via oxidative cyclization to form benzimidazole 3 in 57% yield, a yield consistent with our previous results for 2-aryl-dicyanobenzimidazoles. The alkylation of 3 with 1-iodopropane proceeded cleanly but incompletely, affording 4 in 62% yield accompanied by unreacted starting material (31% yield). The aminative cyclization of 4 was performed according to a previously published report (Brach, P. J.; Grammatica, S. J.; Ossanna, O. A.; Weinberger, L. *J. Heterocyclic Chem.* 1970, 7, 1403-1405), affording diiminoisoindoline 5 in 48% yield. Although this procedure typically affords yields >90%, the lower yield of 5 is attributed to incomplete recovery from the cooled methanolic reaction mixture.

The ring expansion reaction of subphthalocyanines such as 6 (Claessens, C. G.; Gonzalez-Rodriguez, D.; del Rey, B.; Tones, T.; Mark, G.; Schuchmann, H. P.; von Sonntag, C.; MacDonald, J. G.; Nohr, R. S. *Eur. J. Org. Chem.* 2003, 14, 2547-2551) has been reported under various procedures. We chose a procedure using the polar, reducing solvent 2-dimethylaminoethanol (DMAE) (Sastre, A.; Tones, T.; Hanack, M. *Tetrahedron Lett.* 1995, 36, 8501-8504). Due to the good reactivity of 5, four equivalents of 6 were required to suppress the formation of products bearing more than one imidazo moiety. After 8 h of reaction, the presence of reactant 6 was no longer evident and a substantial amount of unsubstituted phthalocyanine was formed in addition to the desired imidazophthalocyanine $H_2$-7. The macrocycles were separated from the DMAE by precipitation with MeOH. $H_2$-7 is sufficiently more soluble than the unsubstituted phthalocyanine to be largely separated by Soxhlet extraction using $CH_2Cl_2$. Complete purification required size exclusion chromatography and adsorption chromatography.

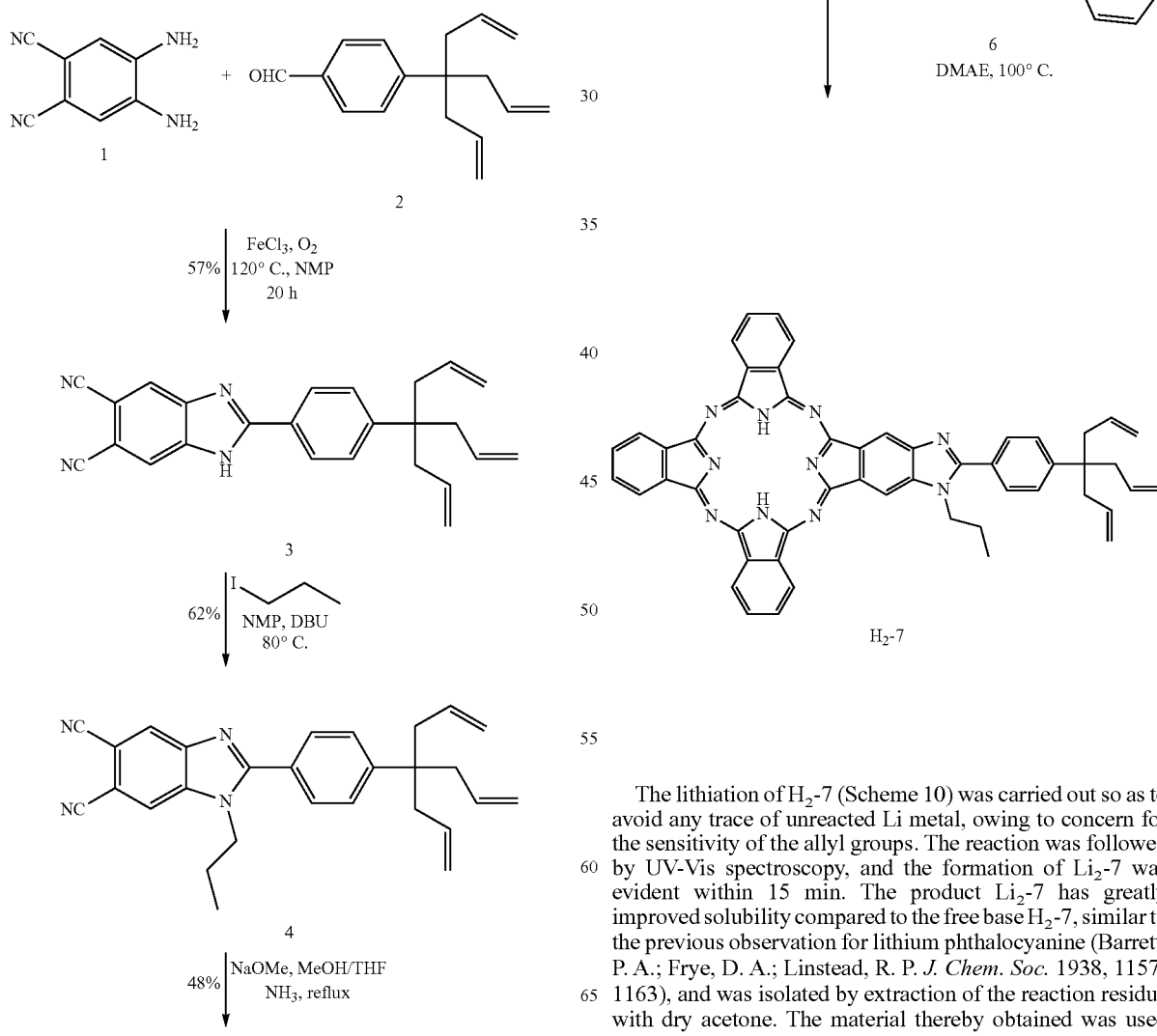

The lithiation of $H_2$-7 (Scheme 10) was carried out so as to avoid any trace of unreacted Li metal, owing to concern for the sensitivity of the allyl groups. The reaction was followed by UV-Vis spectroscopy, and the formation of $Li_2$-7 was evident within 15 min. The product $Li_2$-7 has greatly improved solubility compared to the free base $H_2$-7, similar to the previous observation for lithium phthalocyanine (Barrett, P. A.; Frye, D. A.; Linstead, R. P. *J. Chem. Soc.* 1938, 1157-1163), and was isolated by extraction of the reaction residue with dry acetone. The material thereby obtained was used directly without characterization.

Scheme 10

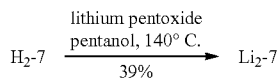

The preparation of triple decker 9 (Scheme 11) was performed according to a procedure we previously reported (Gross, T.; Chevalier, F.; Lindsey, J. S. *Inorg. Chem.* 2001, 40, 4762-4774). Thus, $CeI_3$ in bis(2-methoxyethyl)ether was treated with $LiN(SiMe_3)_2$ at reflux, affording the putative I—Ce[N(SiMe$_3$)$_2$]$_2$. The addition of tetra-p-tolylporphyrin (8) afforded the corresponding Ce-porphyrin half-sandwich complex, which was then treated with Li$_2$-7 at reflux for 10 h.

Analytical SEC showed the absence of starting materials and the presence of the target type-a triple decker 9. The good solubility of 9 allowed for purification by standard adsorption chromatography, and 9 was isolated in 30% yield. The $^1$H NMR analysis of 9 produced a complex signature due to the effects of the cerium atoms, with most of the resonances being broadened and located at unexpected chemical shifts, but the resonances corresponding to the triallyl moiety were clearly defined and found in the same portion of the spectrum as for H$_2$-7. LDMS analysis of 9 gave a clear signal at the expected mass range. In summary, the synthesis of triple decker 9 proceeded in a straightforward manner. The overall yield from the dicyanophenylenediamine 1 was low (0.6%), but valuable intermediates could be recovered from two of the intervening synthetic steps.

Scheme 11

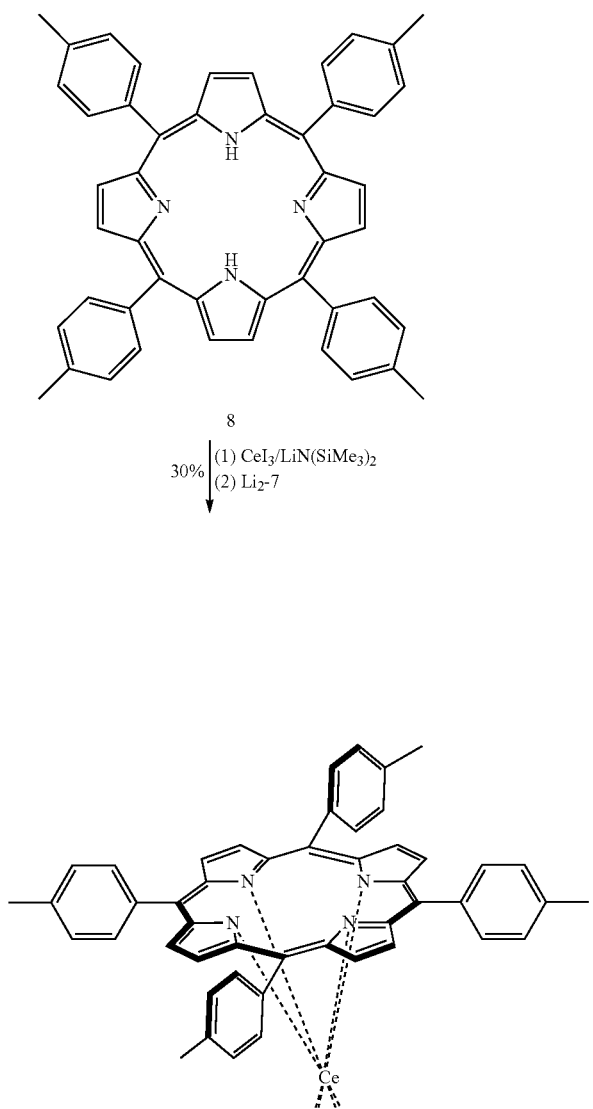

-continued

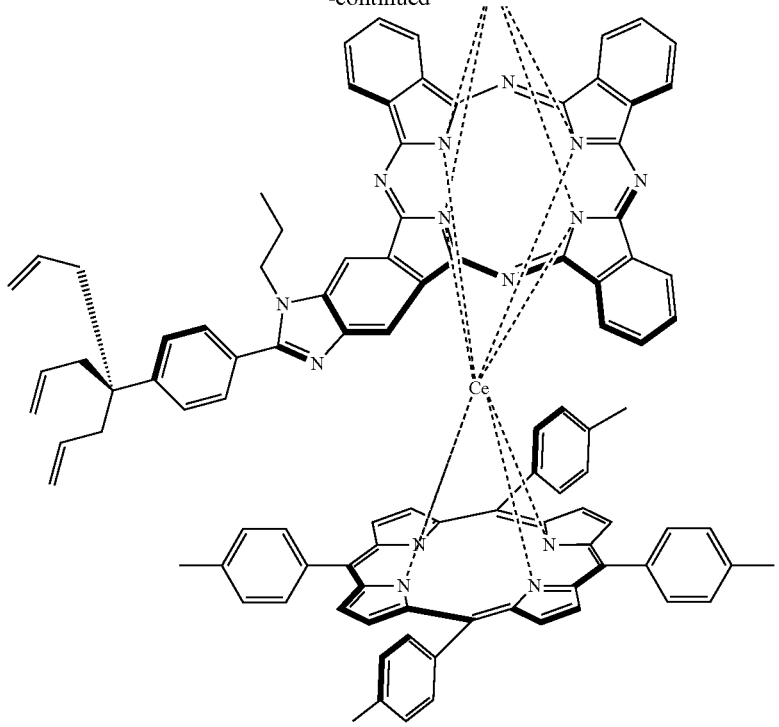

9

Figure 8:
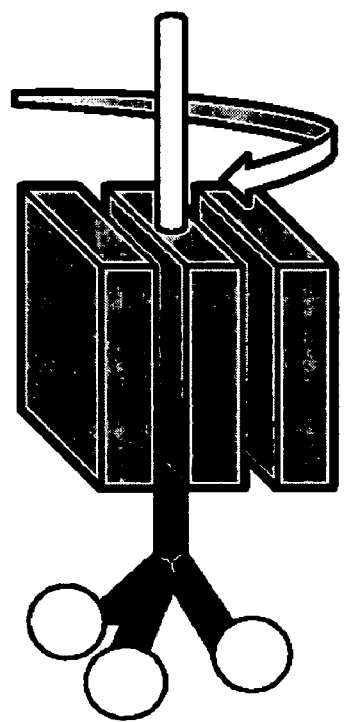
FIG. 8. Representation of the type-a triple decker bearing the compact all-carbon tether. The tripod is attached to the (central) phthalocyanine ligand and aligned along one of the N—N axes of the phthalocyanine.

Outlook. The architecture of the axially substituted phthalocyanine is shown in FIG. 8. Attachment of the tether to the central ligand of the triple deckers, using the new phthalocyanine substitution pattern, affords an axially symmetric triple decker. The resulting triple decker no longer has a camshaft rotation and should give a small molecular footprint and, thus, a high charge density upon attachment to an electroactive surface. A similar architecture would be available in a type-b triple decker via attachment to the central porphyrin, but rational methods for synthesis of type-b triple deckers are not yet available. The present strategy provides the first route wherein a triple decker is centrally disposed with respect to a linking substituent, which in this case is the all-carbon tripod for surface attachment.

General. $^1$H (400 MHz) and $^{13}$C (75 MHz) NMR spectra were obtained in CDCl$_3$ unless noted otherwise. Silica gel (40 μm average particle size) was used for column chromatography. Purified acetone was prepared from reagent grade acetone by distillation over potassium permanganate and the distillate was stored over anhydrous K$_2$CO$_3$ prior to use. Other solvents used as received commercially include N-methylpyrrolidinone (NMP=1-methyl-2-pyrrolidinone, anhydrous), DMAE (redistilled grade), and MeOH (anhydrous). NaOMe was employed as a 25 wt % solution in MeOH. All other chemicals were reagent grade and were used as received. Absorption and emission data were measured in THF. The fluorescence quantum yield of H$_2$-7 was measured by comparison to tetra-tert-butylphthalocyanine, which was itself measured in both THF and CHCl$_3$ set at $\Phi_f$=0.70 in THF (by comparison to the reported $\Phi_f$ of 0.77 for tetra-tert-butylphthalocyanine in CHCl$_3$ with correction for the indices of refraction of the different samples) (Teuchner, K.; Pfarrherr, A.; Stiel, H.; Freyer, W.; Leupold, D. *Photochem. Photobiol.* 1993, 57, 465-471).

Example 31

Noncommercial Compounds: Compounds 1 (compound 3 in examples 1-30), 6 (Claessens, C. G.; Gonzalez-Rodriguez, D.; del Rey, B.; Torres, T.; Mark, G.; Schuchmann, H. P.; von Sonntag, C.; MacDonald, J. G.; Nohr, R. S. *Eur. J. Org. Chem.* 2003, 14, 2547-2551), and 8 (Adler, A. D.; Longo, F. R.; Finarelli, J. D.; Goldmacher, J.; Assour, J.; Korsakoff, L. *J. Org. Chem.* 1967, 32, 476) were prepared according to the literature.

Example 32

4-(4-Allylhepta-1,6-dien-4-yl)aniline. Following a literature procedure (Lin, S.-Y.; Hojjat, M; Strekowski, L. *Synth. Commun.* 1997, 27, 1975-1980) at 80-fold larger scale, a 2 M solution of allyl magnesium chloride in THF (0.400 L, 0.800 mol) was diluted with additional THF (1.00 L) and then treated dropwise with a solution of 4-(trifluoromethyl)aniline (19.9 mL, 0.160 mol) in THF (210 mL) at −50° C. under argon. After complete addition the sides of the reaction flask were rinsed with additional THF (150 mL). The resulting solution was heated at reflux. The reaction was monitored by TLC for the complete consumption of 4-(trifluoromethyl) aniline. After 3.5 h, the mixture was concentrated and then CH$_2$Cl$_2$ was added. The organic solution was washed with water, dried (Na$_2$SO$_4$), and filtered. The filtrate was concentrated and chromatographed [silica, CH$_2$Cl$_2$/hexanes (2:1)], affording a pale yellow solid (31.7 g, 87%): $^1$H NMR δ 2.36-2.43 (m, 6H), 3.48-3.66 (br, 2H), 4.94-5.06 (m, 6H), 5.50-5.64 (m, 3H), 6.62-6.70 (m, 2H), 7.06-7.12 (m, 2H); $^{13}$C NMR δ 42.1, 42.6, 115.0, 117.5, 127.6, 135.0, 135.8, 144.1; FABMS obsd 228.1757, calcd 228.1752 [(M+H)$^+$, M=C$_{16}$H$_{21}$N].

1-(4-Allylhepta-1,6-dien-4-yl)-4-iodobenzene. A solution of conc. HCl/$H_2O$ (1:1 v/v, 44 mL) was added to a solution of 4-(4-allylhepta-1,6-dien-4-yl)aniline (11.4 g, 50.2 mmol) in THF (80 mL). The mixture was stirred at room temperature for 75 min, then cooled to 0-5° C. A chilled solution of $NaNO_2$ (7.99 g, 116 mmol) in water (80 mL) was added while maintaining the temperature of the reaction mixture below 5° C. Additional $H_2O$ (30 mL) was added. The reaction mixture was tested for the presence of nitrous acid with starch paper. A solution of KI (14.2 g, 85.5 mmol) in $H_2O$ (16 mL) cooled to ~5° C. was added, again maintaining the mixture at <5° C. throughout the addition. Additional $H_2O$ (24 mL) and THF (150 mL) were added. The reaction mixture was then gradually allowed to warm to room temperature. After ~6.5 h, the reaction mixture was neutralized with saturated aqueous $Na_2CO_3$ and then filtered. The filtrate was concentrated. The resulting residue was dissolved in $CH_2Cl_2$ and washed with water. The organic phase was dried ($Na_2SO_4$), concentrated and chromatographed (silica, hexanes) to afford a colorless liquid (4.73 g, 28%): $^1$H NMR (300 MHz) δ 2.38-2.50 (m, 6H), 4.94-5.12 (m, 6H), 5.44-5.64 (m, 3H), 7.00-7.12 (m, 2H), 7.58-7.70 (m, 2H); $^{13}$C NMR δ 41.8, 42.0, 43.5, 91.4, 117.8, 118.2, 129.1, 134.2, 137.3, 145.8.

4-(4-Allylhepta-1,6-dien-4-yl)benzonitrile. A mixture of 1-(4-allylhepta-1,6-dien-4-yl)-4-iodobenzene (5.07 g, 15.0 mmol), CuCN (2.03 g, 22.6 mmol) and DMF (50 mL) was heated over the course of 30 min until refluxing with continued reflux for 3 h. The reaction was monitored by TLC. The mixture was poured into a flask containing crushed ice and concentrated aqueous $NH_4OH$ (200 mL). The resulting mixture was bubbled with oxygen for 14 h. The resulting dark blue mixture was then filtered. The layers of the filtrate were separated and the aqueous layer was extracted with $CH_2Cl_2$. The combined organic layer was dried ($Na_2SO_4$), concentrated and chromatographed [silica, hexanes/ethyl acetate (19:1)] to afford a colorless liquid (3.17 g, 89%): IR ($CH_2Cl_2$) 2230 cm$^-$; $^1$H NMR (300 MHz) δ 2.40-2.54 (m, 6H), 4.94-5.12 (m, 6H), 5.40-5.62 (m, 3H), 7.36-7.48 (m, 2H), 7.56-7.68 (m, 2H); $^{13}$C NMR δ 41.6, 44.2, 109.8, 118.6, 119.1, 127.8, 132.0, 133.5, 151.7; FABMS obsd 238.1589, calcd 238.1596 [(M+H)$^+$, M=$C_{17}H_{19}$N].

4-(4-Allylhepta-1,6-dien-4-yl)benzaldehyde (2). A solution of 4-(4-allylhepta-1,6-dien-4-yl)benzonitrile (2.21 g, 9.32 mmol) in $CH_2Cl_2$ (25 mL) was cooled to 0° C. and was treated dropwise with a 1 M solution of DIBAL-H in hexanes (11.2 mL, 11.2 mmol). The solution was allowed to slowly warm to room temperature. The reaction was monitored by TLC. After 3 h, the reaction mixture was poured into a beaker containing crushed ice and 6 N HCl. The mixture was stirred for about 1 h. The layers were separated and the aqueous phase was extracted with $CH_2Cl_2$. The combined organic layer was washed with aqueous $NaHCO_3$ followed by water. The organic layer was dried ($Na_2SO_4$), concentrated and chromatographed [silica, hexanes/ethyl acetate (19:1)] to afford a colorless liquid (2.04 g, 91%): IR ($CH_2Cl_2$) 3078, 1705 cm$^{-1}$; $^1$H NMR (300 MHz) δ 2.44-2.59 (m, 6H), 4.94-5.14 (m, 6H), 5.44-5.66 (m, 3H), 7.45-7.58 (m, 2H), 7.80-7.93 (m, 2H), 9.99 (s, 1H); $^{13}$C NMR δ 41.8, 44.3, 118.4, 127.6, 129.6, 133.8, 134.4, 153.4, 192.0; FABMS obsd 241.1597, calcd 241.1592 [(M+H)$^+$, M=$C_{17}H_{20}$O].

Example 33

2-(4-(4-Allylhepta-1,6-dien-4-yl)phenyl)-5,6-dicyanobenzimidazole (3). A solution of 1 (198 mg, 1.25 mmol) in NMP (2.5 mL) and a solution of 2 (300 mg, 1.25 mmol) in NMP (3.5 mL) were combined in a flask fitted with a Hickman still. The mixture was heated at 120° C. and stirred for 2 h. Then $FeCl_3$·$6H_2O$ (17 mg, 63 μmol) was added and oxygen was bubbled through the mixture with continued heating and stirring for 20 h. The cooled reaction mixture was diluted with ethyl acetate. The organic solution was washed with water and brine. The organic layer was dried ($Na_2SO_4$), filtered, concentrated, and chromatographed (silica, $CH_2Cl_2$ w/ethyl acetate gradient of 0-5%). Fractions containing the desired compound were concentrated to give a reddish solid, which was chromatographed over a short plug of alumina ($CH_2Cl_2$ w/ethyl acetate gradient of 10-100%) yielding a colorless solid (268 mg, 57%): mp 264-266° C.; $^1$H NMR (d$_6$-acetone) δ 2.57 (d, J=7.2 Hz, 6H), 4.88-5.11 (m, 6H), 5.56-5.69 (m, 3H), 7.65 (d, J=8.8 Hz, 2H), 8.26 (d, J=8.8 Hz, 2H), 12.89 (brs, 1H); $^{13}$C NMR (d$_6$-acetone) δ 41.6, 44.0, 108.2, 116.9, 117.7, 126.4, 127.3, 128.0, 134.4, 150.2; FABMS obsd 379.1909, calcd 379.1923 ($C_{25}H_{22}N_4$).

Note: Chromatography of the reaction mixture is aided by the strong blue fluorescence of the product that is visible when illuminating the column with a hand-held long wave UV lamp.

Example 34

2-(4-(4-Allylhepta-1,6-dien-4-yl)phenyl)-5,6-dicyano-1-propylbenzimidazole (4). Following a reported procedure, a sample of 3 (265 mg, 0.70 mmol) in NMP (2.5 mL) was heated to 120° C. and treated with DBU (105 μL, 0.70 mmol). After stirring for 2 min, iodopropane (105 μL, 0.70 mmol) was added and the mixture was stirred for 15 min. A second dose of DBU (68 μL, 0.70 mmol), followed by iodopropane (68 μL, 0.70 mmol), was added, and 15 min later, a third identical round of DBU and iodopropane was again added. After the mixture was stirred for 15 min, the reaction mixture was allowed to cool and was diluted with ethyl acetate. The organic solution was washed with water and brine. The organic layer was dried ($Na_2SO_4$), filtered, concentrated, and chromatographed (silica, $CH_2Cl_2$ w/ethyl acetate gradient of 0-5%). Some starting material was recovered (83 mg, 31%), and fractions containing the product were concentrated to give a colorless solid (183 mg, 62%): mp 132-134° C.; $^1$H NMR δ 0.92 (t, J=8.0 Hz, 3H), 1.82-1.93 (m, 2H), 2.52 (d, J=8.8 Hz, 6H), 4.31 (t, J=7.6 Hz, 2H), 4.98-5.09 (m, 6H), 5.50-5.63 (3H), 7.53 (d, J=8.4 Hz, 2H), 7.70 (d, J=8.4 Hz, 2H), 7.88 (s, 1H), 8.19 (s, 1H); $^{13}$C NMR δ 11.4, 23.5, 41.9, 44.1, 47.3, 108.5, 109.0, 116.7, 116.8, 118.5, 126.1, 126.4, 127.9, 129.2, 134.0, 137.9, 145.4, 149.9, 159.4; Anal. Calcd for $C_{28}H_{28}N_4$: C, 79.97; H, 6.71; N, 13.32. Found: C, 79.93; H, 6.73; N, 13.35.

Example 35

2-(4-(4-Allylhepta-1,6-dien-4-yl)phenyl)-1-propylimidazo[4,5-f]isoindole-5,7(1H,6H)-diimine (5). A sample of 4 (105 mg, 0.25 mmol) in anhydrous MeOH (4 mL) under an argon atmosphere was heated at 70° C. When the mixture became homogeneous, NaOMe (6 μL of a 25 wt % solution in MeOH, 25 μmol) was added, the argon line was removed from the apparatus, and ammonia gas was bubbled through the mixture while the mixture refluxed for 3.5 h. During this time, additional MeOH (0.5 mL) was added at each half hour interval to prevent the reaction mixture from evaporating to dryness. The reaction flask was allowed to cool to room temperature under an atmosphere of ammonia, and then ammonia flow was stopped. The mixture was allowed to stand overnight under a slowly flowing stream of argon, whereupon most of the solvent evaporated and a white powder formed in the vessel. The mixture was taken up by pipette and filtered. The filtered material was washed with anhydrous MeOH and dried in vacuo (53 mg, 48%): mp 230-232° C. (upon which the sample melted and turned deep green). Due to the presence of tautomeric forms of the product, the NH signals do not all integrate to integers: $^1$H NMR (d$_8$-THF) δ 0.88 (t, J=7.2 Hz, 3H), 1.82-1.96 (m, 2H), 2.56 (d, J=7.2 Hz, 6H), 4.38 (t, J=7.6 Hz, 2H), 4.97-5.10 (m, 6H), 5.57-5.70 (m, 3), 7.57 (d, J=8.0 Hz, 2H), 7.80 (d, J=8.0 Hz, 2H), 7.84-8.40 (m, 4H); $^{13}$C NMR (d$_8$-THF) δ 10.6, 23.2, 41.8, 43.7, 46.4, 117.3, 127.2, 129.1, 134.5, 147.8; IR (film): 3397, 3276, 3200, 2958, 2927, 1536, 1432, 1149, 1121, 1077, 915.2; Anal. Calcd for $C_{28}H_{31}N_5$: C, 76.85; H, 7.14; N, 16.00. Found: C, 76.63; H, 7.21; N, 16.09.

Note: The title compound does not entirely precipitate from the cooled reaction mixture. The recovery is aided by gently concentrating the mixture under a stream of argon until only a small quantity of liquid remains. Once precipitated, 5 does not readily redissolve in dry methanol, but a more soluble yellow byproduct is observed that redissolved even in preparations wherein the reaction mixture had been evaporated fully to dryness. Analysis of this byproduct (obtained from the methanolic filtrate after separating the product) by $^1$H NMR confirmed that it was not 5, but its identity was not determined.

Example 36

Tribenzo[g,l,q]-(2-{4-(4-Allylhepta-1,6-dien-4-yl)phenyl}-1-propylbenzimidazo[5,6-b])porphyrazine ($H_2$-7). A 20 mL reaction vial was charged with 5 (43 mg, 98 µmol), 6 (169 mg, 392 µmol, 4 equiv), DMAE (5 mL), and a magnetic stirring bar. The vial was capped and heated in an oil bath maintained at 100° C. Periodically, a few microliters of the reaction mixture were removed, diluted into THF, and analyzed by UV-Vis spectroscopy. After 8 h, 6 was not observed in the UV-Vis spectrum. The reaction was then cooled to room temperature and diluted with MeOH (15 mL) and allowed to stand overnight. The mixture was centrifuged and the supernatant was removed. MeOH (20 mL) was added to the pellet and the mixture was sonicated and centrifuged again. After a third MeOH treatment and centrifugation, the pellet was dried in vacuo. The solid residue was suspended in THF (250 mL), sonicated, and filtered through celite. The filtrate was set aside. The celite was then added to a Soxhlet thimble and extracted with $CH_2Cl_2$ overnight. The $CH_2Cl_2$ and THF filtrates were combined and concentrated to dryness. The solid residue was redissolved in a minimum of THF and chromatographed over a column of Bio-Beads SX-3 in THF. The desired compound was recovered from the column as a dark blue-green band that was closely followed by a blue band (unsubstituted phthalocyanine) and a faint pink band (remaining 6). The fractions containing the desired compound were concentrated and rechromatographed over Bio-Beads SX-3 in THF a second time to remove all pigment impurities. The sample was then chromatographed (silica, $CH_2Cl_2$, 1% isopropanol, 5% THF, 5% ethyl acetate). Fractions containing the desired compound were concentrated to give a blue solid (25 mg, 32%): IR (KBr pellet): 2918, 1638, 1610, 1518, 1426, 1330, 1115, 1001, 912, 740; $^1$H NMR (d$_8$-THF) δ −3.56 (brs, 2H), 1.16 (t, J=8.0 Hz, 3H), 2.12-2.24 (m, 2H), 2.75 (d, J=Hz, 6H), 4.53 (t, J=8.0 Hz, 2H), 5.15-5.28 (m, 6H), 5.78-5.91 (m, 3H), 7.61 (t, J=7.2 Hz, 1H), 7.71 (t, J=Hz, 1H), 7.76-7.89 (m, 4H), 7.80 (d, J=8.4 Hz, 2H), 8.09 (s, 1H), 8.13 (d, J=8.4 Hz, 2H), 8.20 (d, J=6.8 Hz, 1H), 8.47-9.53 (m, 2H), 8.57 (s, 1H), 8.63-8.72 (m, 3H); LD-MS obsd, 807.0; FABMS obsd 807.3717, calcd 807.3672 [(M+H)$^+$; M=$C_{52}H_{42}N_{10}$]; $\lambda_{abs}$ (nm) 336, 651, 669, 695; $\lambda_{em}$ (nm) 700, 714; $\Phi_f$=0.56.

Example 37

(Li$_2$-7). A sample of Li ribbon (19 mg, 2.9 mmol) was added to pentanol (14.5 mL) and the mixture was refluxed until the Li was fully consumed (overnight). The mixture was cooled to room temperature and filtered through a pipette that was plugged with glass fiber filter paper. The filtrate was not titrated but was assumed to be ~0.2 M. Next a sample of $H_2$-7 (25 mg, 31 µmol) was added to pentanol (9.0 mL) and briefly refluxed to dissolve all solid. Then the sample was cooled to room temperature and the lithium pentoxide solution (1.0 mL) was added. The vessel was capped with a septum and placed in an oil bath at 140° C. As the mixture was refluxed, samples (~2 µL) were taken periodically, diluted into freshly dried THF (3 mL) and analyzed by UV-Vis spectroscopy to monitor the progress of the reaction. After 15 min from the start of refluxing, the UV-Vis spectrum of the removed sample had altered from the spectrum of the starting pigment (vide supra) to a new species having a more narrow Q band. The mixture was kept refluxing for a total of 90 min, although no further change was observed in the UV-Vis absorbance of the removed samples. The reaction mixture was cooled to room temperature and concentrated to dryness on a high-vacuum rotary evaporator. The residue was taken up in dry acetone and added to a thimble in a Soxhlet apparatus. The residue was extracted with dry acetone until no further color appeared from the thimble. The filtrate from the extraction was concentrated to dryness. The residue was dissolved in a minimum of dry acetone and decanted to a vial, taking care not to transfer any insoluble $H_2$-7 that may have formed during the extraction. The dark blue solution was then concentrated to dryness to give the product Li$_2$-7 as a blue solid (10 mg, 39%). Due to the sensitivity of the product to moisture, Li$_2$-7 was directly used in subsequent synthesis without characterization. The solids left behind in the evaporation flask and the Soxhlet thimble were combined to recover the starting material $H_2$-7 (15 mg, 60%): $\lambda_{abs}$ 602, 663, 671.

Example 38

(TTP)Ce(7)Ce(TTP) (9). A 250 mL Schlenk flask was charged with a magnetic stirring bar and introduced into an argon glove box. Cerium iodide (51 mg, 98 µmol) was added and the flask was sealed with a septum and removed from the glove box. The flask was connected to an argon source, and the septum was vented with a needle to allow the outflow of argon gas. The flask was then placed in an ice bath and bis(2-methoxy)ethyl ether (3.0 mL, freshly sparged with argon) was added. Then LiN(SiMe$_3$)$_2$ (312 µL of a 0.608 M solution freshly prepared in dry THF and sparged with argon) was added, and the mixture was stirred for 20 min, after which the flask was removed from the ice bath and stirring was continued while the mixture warmed to room temperature over 40 min. The mixture was then refluxed for 1 h by placing the flask in an oil bath at 170° C. The flask was then removed from the oil bath long enough for refluxing to subside, briefly opened to allow the addition of 8 ($H_2$TTP) (16 mg, 24 µmol), and closed again and returned to the bath to reflux for 3 h. Then the vessel was again allowed to cool and opened to remove a small sample for UV-Vis analysis. The sample was confirmed as the cerium-porphyrin half-sandwich, so Li$_2$-7 (10 mg, 12 µmol) was added as a slurry in bis(2-methoxyethyl)ether (1.0 mL) and the resulting mixture was refluxed for 10 h under argon. Then the mixture was allowed to cool to room temperature and concentrated on a high vacuum rotary evaporator. The residue was triturated with MeOH, centrifuged, and the supernatant was discarded. The residue was chromatographed (silica, neat $CH_2Cl_2$, then $CH_2Cl_2$ w/1% iPrOH, 5% THF, 5% ethyl acetate). The first band was collected and rechromatographed [silica, hexanes/$CH_2Cl_2$, (1:2)], and fractions containing the product were concentrated to give a green-black solid (9.0 mg, 30%): IR (KBr pellet): 2918, 1638, 1610, 1518, 1451, 1404, 1328, 1182, 1070, 986, 797, 740, 722; NMR δ (−2.45)−(−1.30) (m, 20H), 0.75-0.85 (m, 3H), 1.13 (s, 24H), 1.73 (d, J=7.2 Hz, 6H), 1.90-2.20 (m, 6H), 2.80-3.60 (m, 20H), 2.75 (d, J=Hz, 6H), 4.35-4.42 (m, 6H), 4.68-4.82 (m, 3H), 5.45-5.62 (m, 2H), 6.20-6.35 (m, 2H), 7.09 (s, 8H), 10.34 (s, 8H); LD-MS obsd, 2419.3; calcd 2420.74 ($C_{148}H_{112}Ce_2N_{18}$); $\lambda_{abs}$ (nm) 359, 419, 493, 549, 608.

The foregoing is illustrative of the present invention, and is not to be construed as limiting thereof. The invention is defined by the following claims, with equivalents of the claims to be included therein.

That which is claimed is:

1. An article of manufacture, comprising:
a substrate; and
a benzazoloporphyrazine bound to said substrate, with said benzazoloporphyrazine bound to said substrate by a bond through a surface attachment group, wherein the surface attachment group has a bond directly or through a linker to the 2 position of an azolo group of said benzazoloporphyrazine.

2. The article of manufacture of claim 1, said substrate comprising a material selected from the group consisting of conductors, semiconductors, insulators, and composites thereof.

3. The article of manufacture of claim 1, said substrate comprising a material selected from the group consisting of metals, metal oxides, organic polymers, and composites thereof.

4. The article of manufacture of claim 1, wherein said bond to said surface attachment group is a covalent bond.

5. The article of manufacture of claim 1, wherein said article is an electrochromic display.

6. The article of manufacture of claim 1, wherein said article is a molecular capacitor.

7. The article of manufacture of claim 1, wherein said article is a battery.

8. The article of manufacture of claim 1, wherein said article is a solar cell.

9. The article of manufacture of claim 1, wherein said article is a molecular memory device.

10. The article of manufacture of claim 1, wherein said benzazoloporphyrazine is a member of a sandwich coordination compound, said coordination compound selected from the group consisting of double-decker sandwich coordination compounds and triple-decker sandwich coordination compounds.

11. The article of manufacture of claim 10, each of said sandwich coordination compounds selected from the group consisting of heteroleptic sandwich coordination compounds and homoleptic sandwich coordination compounds.

12. The article of manufacture of claim 1, wherein said benzazoloporphyrazine is a member of a polymer of at least two linked benzazoloporphyrazines, with each of said benzazoloporphyrazines linked to an adjacent benzazoloporphyrazine by a bond through a linker having a bond to the 2 position of an azolo group thereof.

13. The article of manufacture of claim 1, wherein said benzazoloporphyrazine is selected from the group consisting of benzimidazoporphyrazines, benzoxazoporphyrazines, benzthiazoporphyrazines, and benzselenazoporphyrazines.

14. The article of manufacture of claim 1, wherein said benzazoloporphyrazine is selected from the group consisting of trans-bis-(2-R-benzazolo)porphyrazines, 2-R-benzazoloporphyrazines, and tetrakis (2-R-benzazolo)porphyrazines wherein R is an independently selected substituent.

15. The article of claim 1, said benzazoloporphyrazine compound having at least one independently selected substituent R at a 2 position of an azolo group thereof, wherein R is the surface attachment group or cross coupling group, and subject to the proviso that R is not H or $(CH_2)_nCH_3$ where n is 0-7.

16. The article of claim 15, wherein said benzazoloporphyrazine is selected from the group consisting of:
2-R-5,6-benzimidazoporphyrazines;
trans-bis(2-R-5,6-benzimidazo)porphyrazines;
tribenzo(2-R-5,6-benzimidazo)porphyrazines;
trans-dibenzo-bis(2-R-5,6-benzimidazo)porphyrazines;
tetrakis(2-R-5,6-benzimidazo)porphyrazines;
2-R-5,6-benzoxazoporphyrazines;
trans-bis(2-R-5,6-benzoxazo)porphyrazines;
tribenzo(2-R-5,6-benzoxazo)porphyrazines;
trans-dibenzo-bis(2-R-5,6-benzoxazo)porphyrazines;
tetrakis(2-R-5,6-benzoxazo)porphyrazines;
2-R-5,6-benzthiazoporphyrazines;
trans-bis(2-R-5,6-benzthiazo)porphyrazines;
tribenzo(2-R-5,6-benzthiazo)porphyrazines;
trans-dibenzo-bis(2-R-5,6-benzthiazo)porphyrazines;
tetrakis(2-R-5,6-benzthiazo)porphyrazines;
2-R-5,6-benzselenazoporphyrazines;
trans-bis(2-R-5,6-benzselenazo)porphyrazines;
tribenzo(2-R-5,6-benzselenazo)porphyrazines;
trans-dibenzo-bis(2-R-5,6-benzselenazo)porphyrazines; and
tetrakis(2-R-5,6-benzselenazo)porphyrazines.

17. The article of claim 15, wherein R comprises a cross-coupling group selected from the group consisting of halo, alkenyl, alkynyl, and amine cross-coupling groups, each of which is directly coupled to said compound or coupled to said compound by a linker group.

18. The article of claim 15, wherein R comprises the surface attachment group selected from the group consisting of: iodo, bromo, chloro, cyano, amino, alkenyl, alkynyl, hydroxy, mercapto, selenyl, telluro, S-acetylthio, Se-acetylseleno, and Te-acetyltelluro, each of which is directly coupled to said compound or coupled to said compound by a linker group.

19. The article of claim 15, wherein said benzazoloporphyrazine is selected from the group consisting of:
2-R-5,6-benzoxazoporphyrazines;
trans-bis(2-R-5,6-benzoxazo)porphyrazines;
tribenzo(2-R-5,6-benzoxazo)porphyrazines;
trans-dibenzo-bis(2-R-5,6-benzoxazo)porphyrazines;
tetrakis(2-R-5,6-benzoxazo)porphyrazines;
2-R-5,6-benzthiazoporphyrazines;
trans-bis(2-R-5,6-benzthiazo)porphyrazines;
tribenzo(2-R-5,6-benzthiazo)porphyrazines;
trans-dibenzo-bis(2-R-5,6-benzthiazo)porphyrazines;
tetrakis(2-R-5,6-benzthiazo)porphyrazines;
2-R-5,6-benzselenazoporphyrazines;
trans-bis(2-R-5,6-benzselenazo)porphyrazines;
tribenzo(2-R-5,6-benzselenazo)porphyrazines;
trans-dibenzo-bis(2-R-5,6-benzselenazo)porphyrazines; and
tetrakis(2-R-5,6-benzselenazo)porphyrazines.

20. An article of manufacture, comprising:
a substrate; and
a polymer bound to said substrate, said polymer comprising a plurality of covalently joined monomeric units, each of said monomeric units comprising an independently selected sandwich coordination compound;
with each of said monomeric units containing at least one benzazoloporphyrazine;
and with each of said benzazoloporphyrazines covalently joined to a benzazoloporphyrazine of an adjacent monomeric unit by a bond to a group, wherein the group has a bond directly or through a linker to the 2 position of the azolo groups of each benzazoloporphyrazine.

21. The article of manufacture of claim 20, said substrate comprising a material selected from the group consisting of conductors, semiconductors, insulators, and composites thereof.

22. The article of manufacture of claim 20, said substrate comprising a material selected from the group consisting of metals, metal oxides, organic polymers, and composites thereof.

23. The article of manufacture of claim 20, wherein said article is an electrochromic display.

24. The article of manufacture of claim 20, wherein said article is a molecular capacitor.

25. The article of manufacture of claim 20, wherein said article is a battery.

26. The article of manufacture of claim 20, wherein said article is a molecular memory device.

27. The article of manufacture of claim 20, wherein said benzazoloporphyrazine is selected from the group consisting of benzimidazoporphyrazines, benzoxazoporphyrazines, benzthiazoporphyrazines, and benzselenazoporphyrazines.

28. The article of manufacture of claim 20, wherein said benzazoloporphyrazine is selected from the group consisting of trans-bis(2-R-benzazolo)porphyrazines, 2-R-benzazoloporphyrazines, and tetrakis(2-R-benzazolo)porphyrazines wherein R is an independently selected substituent.

29. The article of claim 20, said benzazoloporphyrazine compound having at least one independently selected substituent R at a 2 position of an azolo group thereof, wherein R is a surface attachment group or cross coupling group, and subject to the proviso that R is not H or $(CH_2)_n CH_3$ where n is 0-7.

30. The article of claim 29, wherein said benzazoloporphyrazine is selected from the group consisting of:
2-R-5,6-benzimidazoporphyrazines;
trans-bis(2-R-5,6-benzimidazo)porphyrazines;
tribenzo(2-R-5,6-benzimidazo)porphyrazines;
trans-dibenzo-bis(2-R-5,6-benzimidazo)porphyrazines;
tetrakis(2-R-5,6-benzimidazo)porphyrazines;
2-R-5,6-benzoxazoporphyrazines;
trans-bis(2-R-5,6-benzoxazo)porphyrazines;
tribenzo(2-R-5,6-benzoxazo)porphyrazines;
trans-dibenzo-bis(2-R-5,6-benzoxazo)porphyrazines;
tetrakis(2-R-5,6-benzoxazo)porphyrazines;
2-R-5,6-benzthiazoporphyrazines;
trans-bis(2-R-5,6-benzthiazo)porphyrazines;
tribenzo(2-R-5,6-benzthiazo)porphyrazines;
trans-dibenzo-bis(2-R-5,6-benzthiazo)porphyrazines;
tetrakis(2-R-5,6-benzthiazo)porphyrazines;
2-R-5,6-benzselenazoporphyrazines;
trans-bis(2-R-5,6-benzselenazo)porphyrazines;
tribenzo(2-R-5,6-benzselenazo)porphyrazines;
trans-dibenzo-bis(2-R-5,6-benzselenazo)porphyrazines; and
tetrakis(2-R-5,6-benzselenazo)porphyrazines.

31. The article of claim 29, wherein R comprises a cross-coupling group selected from the group consisting of halo, alkenyl, alkynyl, and amine cross-coupling groups, each of which is directly coupled to said compound or coupled to said compound by a linker group.

32. The article of claim 29, wherein R comprises a surface attachment group selected from the group consisting of: iodo, bromo, chloro, cyano, amino, alkenyl, alkynyl, hydroxy, mercapto, selenyl, telluro, S-acetylthio, Se-acetylseleno, and Te-acetyltelluro, each of which is directly coupled to said compound or coupled to said compound by a linker group.

33. The article of claim 29, wherein said benzazoloporphyrazine is selected from the group consisting of:
2-R-5,6-benzoxazoporphyrazines;
trans-bis(2-R-5,6-benzoxazo)porphyrazines;
tribenzo(2-R-5,6-benzoxazo)porphyrazines;
trans-dibenzo-bis(2-R-5,6-benzoxazo)porphyrazines;
tetrakis(2-R-5,6-benzoxazo)porphyrazines;
2-R-5,6-benzthiazoporphyrazines;
trans-bis(2-R-5,6-benzthiazo)porphyrazines;
tribenzo(2-R-5,6-benzthiazo)porphyrazines;
trans-dibenzo-bis(2-R-5,6-benzthiazo)porphyrazines;
tetrakis(2-R-5,6-benzthiazo)porphyrazines;
2-R-5,6-benzselenazoporphyrazines;
trans-bis(2-R-5,6-benzselenazo)porphyrazines;
tribenzo(2-R-5,6-benzselenazo)porphyrazines;
trans-dibenzo-bis(2-R-5,6-benzselenazo)porphyrazines; and
tetrakis(2-R-5,6-benzselenazo)porphyrazines.

* * * * *

UNITED STATES PATENT AND TRADEMARK OFFICE
CERTIFICATE OF CORRECTION

PATENT NO. : 7,919,770 B2
APPLICATION NO. : 11/447219
DATED : April 5, 2011
INVENTOR(S) : Youngblood et al.

It is certified that error appears in the above-identified patent and that said Letters Patent is hereby corrected as shown below:

Column 33, Line 37: Please correct "$\epsilon$" to read -- $\varepsilon$ --

Column 47, line 65: Please correct "C2," to read -- C2v, --

Column 59, Line 24: Please correct "; A. (nm):" to read -- $\lambda$abs (nm): --

Signed and Sealed this
Twenty-ninth Day of November, 2011

David J. Kappos
*Director of the United States Patent and Trademark Office*